(12) United States Patent
Kremen

(10) Patent No.: US 7,027,081 B2
(45) Date of Patent: Apr. 11, 2006

(54) SYSTEM AND APPARATUS FOR RECORDING, TRANSMITTING, AND PROJECTING DIGITAL THREE-DIMENSIONAL IMAGES

(76) Inventor: Stanley H. Kremen, 4 Lenape La., East Brunswick, NJ (US) 08816

( * ) Notice: Subject to any disclaimer, the term of this patent is extended or adjusted under 35 U.S.C. 154(b) by 0 days.

(21) Appl. No.: 10/515,640

(22) PCT Filed: Dec. 8, 2004

(86) PCT No.: PCT/US2004/038231

§ 371 (c)(1),
(2), (4) Date: Dec. 8, 2004

(87) PCT Pub. No.: WO2005/065085

PCT Pub. Date: Jul. 21, 2005

(65) Prior Publication Data

US 2006/0038879 A1    Feb. 23, 2006

Related U.S. Application Data

(60) Provisional application No. 60/481,823, filed on Dec. 21, 2003.

(51) Int. Cl.
*H04N 13/02* (2006.01)
(52) U.S. Cl. ............... 348/51; 345/32; 345/419
(58) Field of Classification Search ............... 348/51, 348/42, 40, 49, 63, 91; 345/419, 139, 98, 345/4–6, 32; 378/50; 359/28
See application file for complete search history.

(56) References Cited

U.S. PATENT DOCUMENTS

| | | | |
|---|---|---|---|
| 279,878 A | 6/1883 | Muybridge | |
| 2,605,434 A | 7/1952 | Honrighous | |
| 2,756,313 A | 7/1956 | Wright | |
| 3,153,224 A | 10/1964 | Taylor | |
| 3,459,885 A | 8/1969 | Goldmark et al. | |
| 3,495,518 A | 2/1970 | Takagi et al. | |
| 3,602,702 A | 8/1971 | Warnock | |
| 3,621,214 A | 11/1971 | Romney | |
| 3,665,408 A | 5/1972 | Erdahl et al. | |
| 3,674,921 A | 7/1972 | Goldsmith | |
| 3,736,564 A | 5/1973 | Watkins | |
| 3,829,838 A | 8/1974 | Lewis et al. | |
| 3,852,524 A | 12/1974 | Ando et al. | |
| 3,878,329 A | 4/1975 | Brown | |
| 3,894,182 A | 7/1975 | Yamamoto et al. | |
| 3,932,699 A | 1/1976 | Tripp | |
| 4,007,481 A | 2/1977 | St. John | |
| 4,164,748 A | 8/1979 | Nagata | |
| 4,214,257 A | 7/1980 | Yamauchi et al. | |
| 4,290,083 A | 9/1981 | Collender | |
| 4,305,095 A | 12/1981 | Dallas | |
| 4,323,920 A | 4/1982 | Collender | |
| 4,429,328 A | 1/1984 | Jones, Jr. et al. | |
| 4,541,007 A | 9/1985 | Nagata et al. | |
| 4,571,616 A | 2/1986 | Haisma et al. | |
| 4,654,872 A | 3/1987 | Hisano et al. | |
| 4,700,398 A | 10/1987 | Mizuno et al. | |

(Continued)

*Primary Examiner*—Gims Philippe

(57) ABSTRACT

A system and method for recording and reconstructing uniformly magnified three-dimensional images from digital representations of integral photographs. Several camera and projector embodiments are provided along with a means for direct transmission without projection to a special screen that reconstructs the three-dimensional images. This invention is particulary applicable to showing non-stereoscopic three-dimensional motion pictures that reconstruct from integral photographs or holograms that may be viewed without the need for special glasses.

68 Claims, 36 Drawing Sheets

U.S. PATENT DOCUMENTS

| | | |
|---|---|---|
| 4,724,449 A | 2/1988 | Wright |
| 4,729,017 A | 3/1988 | Sayanagi et al. |
| 4,737,840 A | 4/1988 | Morishita |
| 4,743,965 A | 5/1988 | Yamada et al. |
| 4,751,660 A | 6/1988 | Hedley |
| 4,792,694 A | 12/1988 | Shioya et al. |
| 4,819,064 A | 4/1989 | Diner |
| 4,872,750 A | 10/1989 | Morishita |
| 4,894,776 A | 1/1990 | Dekel |
| 4,945,407 A | 7/1990 | Winnek |
| 4,957,351 A | 9/1990 | Shioji |
| 5,014,126 A | 5/1991 | Pritchard et al. |
| 5,049,987 A | 9/1991 | Hoppenstein |
| 5,124,914 A * | 6/1992 | Grangeat .................... 378/50 |
| 5,129,054 A | 7/1992 | Alstad et al. |
| 5,220,441 A | 6/1993 | Gerstenberger |
| 5,309,522 A | 5/1994 | Dye |
| 5,521,724 A | 5/1996 | Shires |
| 5,566,280 A | 10/1996 | Fukui et al. |
| 5,598,515 A | 1/1997 | Shashua |
| 5,613,048 A | 3/1997 | Chen et al. |
| 5,647,019 A | 7/1997 | Iino et al. |
| 5,671,157 A | 9/1997 | Saito |
| 5,680,171 A | 10/1997 | Lo et al. |
| 5,680,474 A | 10/1997 | Iijima et al. |
| 5,710,875 A | 1/1998 | Harashima et al. |
| 5,717,453 A | 2/1998 | Wohlstadter |
| 5,719,620 A * | 2/1998 | Allio .......................... 348/49 |
| 5,742,289 A | 4/1998 | Naylor et al. |
| 5,745,164 A | 4/1998 | Faris |
| 5,760,827 A | 6/1998 | Faris |
| 5,760,933 A | 6/1998 | Aritake et al. |
| 5,764,236 A | 6/1998 | Tanaka et al. |
| 5,764,871 A | 6/1998 | Fogel |
| 5,790,086 A * | 8/1998 | Zelitt ......................... 345/32 |
| 5,808,599 A | 9/1998 | Allio |
| 5,808,792 A | 9/1998 | Woodgate et al. |
| 5,905,593 A | 5/1999 | Lo et al. |
| 5,936,607 A | 8/1999 | Allio |
| 5,946,027 A | 8/1999 | Allio |
| 5,946,424 A | 8/1999 | Oshima |
| 6,005,607 A | 12/1999 | Uomori et al. |
| 6,005,987 A | 12/1999 | Nakamura et al. |
| 6,009,188 A | 12/1999 | Cohen et al. |
| 6,052,124 A | 4/2000 | Stein et al. |
| 6,061,083 A | 5/2000 | Aritake et al. |
| 6,081,269 A | 6/2000 | Quarendon |
| 6,094,198 A | 7/2000 | Shashua |
| 6,108,029 A | 8/2000 | Lo et al. |
| 6,163,337 A | 12/2000 | Azuma et al. |
| 6,177,953 B1 | 1/2001 | Vachette et al. |
| 6,191,808 B1 | 2/2001 | Katayama et al. |
| 6,198,852 B1 | 3/2001 | Anandan et al. |
| 6,201,541 B1 | 3/2001 | Shalom et al. |
| 6,219,444 B1 | 4/2001 | Shashua et al. |
| 6,226,396 B1 | 5/2001 | Marugame |
| 6,233,004 B1 | 5/2001 | Tanaka et al. |
| 6,246,412 B1 | 6/2001 | Shum et al. |
| 6,259,450 B1 | 7/2001 | Chiabrera et al. |
| 6,304,263 B1 | 10/2001 | Chiabrera et al. |
| 6,329,963 B1 | 12/2001 | Chiabrera et al. |
| 6,329,987 B1 | 12/2001 | Gottfried et al. |
| 6,353,457 B1 | 3/2002 | Uomori et al. |
| 6,366,281 B1 | 4/2002 | Lipton et al. |
| 6,380,970 B1 | 4/2002 | Minamikawa |
| 6,417,880 B1 | 7/2002 | Uomori et al. |
| D529,418 | 4/2003 | Kremen |

* cited by examiner

FOCUSED LINES OF LIGHT

FOCUSED LINES OF LIGHT

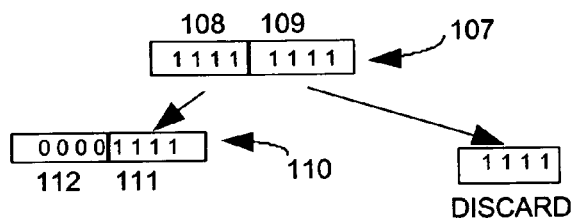
FIG.26(a)
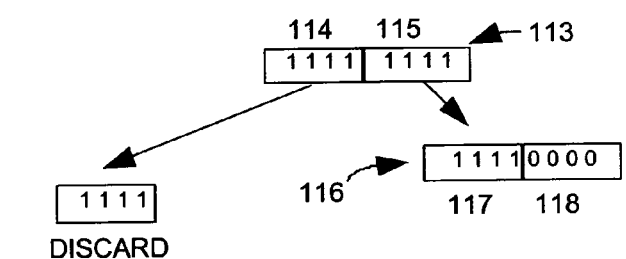
FIG.26(b)
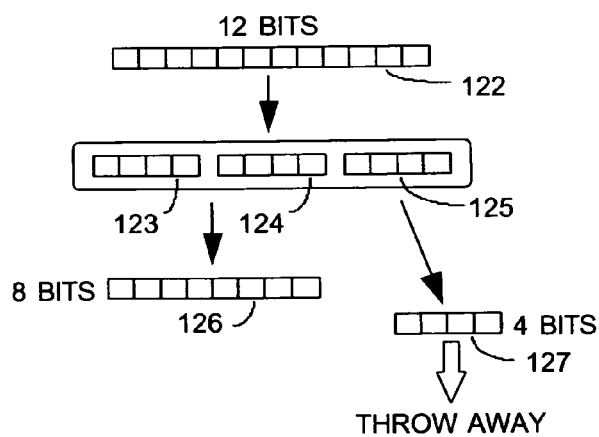
FIG.27
FIG.28

FIG.35
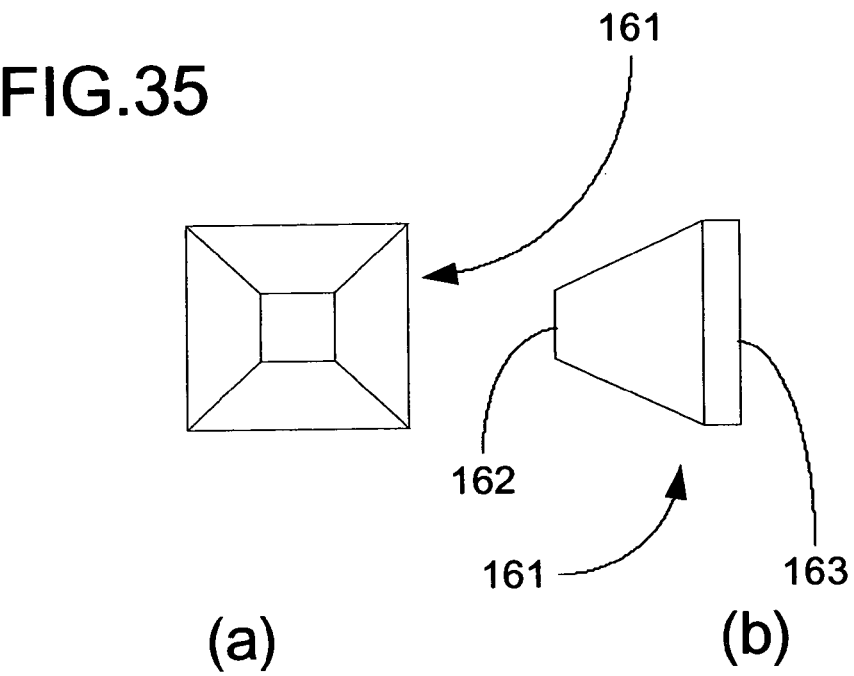
(a)    (b)
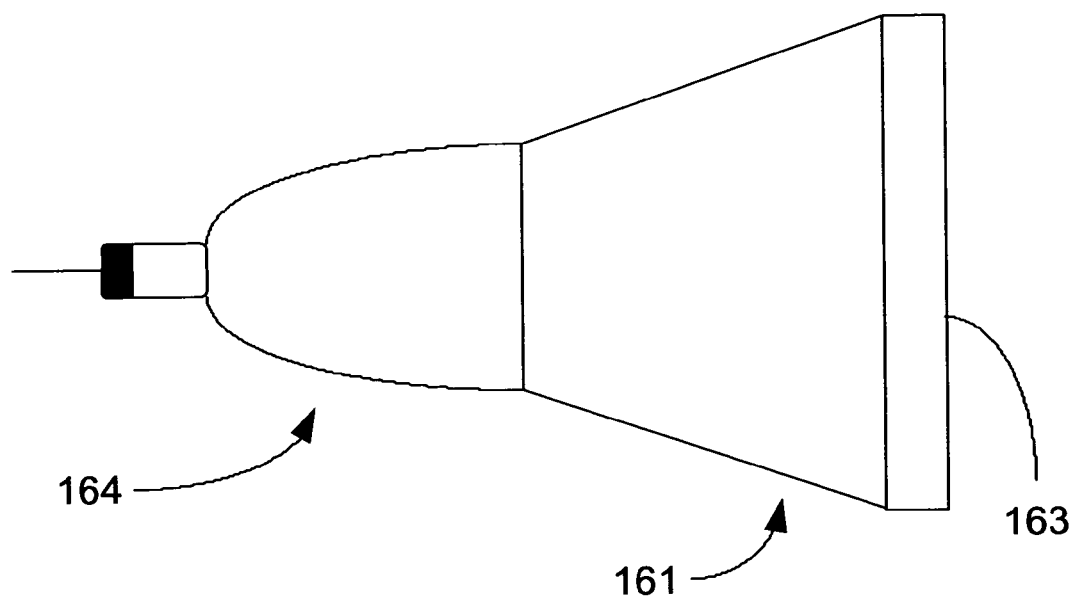
FIG. 36

(d)

(c)

(a)

(b)

SYSTEM AND APPARATUS FOR RECORDING, TRANSMITTING, AND PROJECTING DIGITAL THREE-DIMENSIONAL IMAGES

CROSS REFERENCE TO RELATED APPLICATIONS

This non-provisional patent application is a National Stage Entry of PCT Patent Application Serial PCT/US 04/38231 filed Dec. 8, 2004 under 35 U.S.C. § 371, which in turn is a continuation-in-part of and claims the benefit of and priority to U.S. Provisional Application Ser. No. 60/481, 823, filed Dec. 21, 2003. Said PCT Application and Provisional Application (hereinafter the claimed Priority Applications) are hereby incorporated by reference herein in their entirety thereto. This application contains material that was disclosed in my Disclosure Document No. 529418 filed with the United States Patent and Trademark Office on Apr. 7, 2003 and retained on deposit under the Disclosure Document Program discussed in MPEP §1706. This application discloses an invention that is an improvement over my U.S. Pat. No. 6,229,562 granted on May 8, 2001, incorporated herein in its entirety by reference thereto, and my U.S. Pat. No. 6,593,958 granted on Jul. 15, 2003, also incorporated herein in its entirety by reference thereto. Said patents are hereby collectively referred to as the 3-D PATENTS. This application also discloses an invention that is an improvement over my US Non-Provisional patent application Ser. Nos. 09/853,790 (filed May 11, 2001), 10/292,137 (filed Nov. 12, 2002), 10/416,689 (filed May 10, 2003), 10/904, 745 (filed Nov. 24, 2004), 10/904,888 (filed Dec. 2, 2004), 10/904,917 (filed Dec. 5, 2004), and 10/904,917 (filed Dec. 6, 2004), all of which are currently pending (collectively referred to as the PENDING APPLICATIONS), are additionally incorporated herein in their entirety by reference thereto. This application claims priority only to U.S. Provisional Application 60/481,823. No priority is claimed to the 3-D PATENTS nor to the PENDING APPLICATIONS.

BACKGROUND

1. Field of the Invention

This invention relates to a method and apparatus for making and projecting three-dimensional digital images recorded on compatible media from optical images produced via the principles of holography and/or integral photography.

2. The Problem to be Solved and the Improved Solution

The 3-D PATENTS disclose and claim a SYSTEM AND APPARATUS FOR THE RECORDING AND PROJECTION OF IMAGES IN SUBSTANTIALLY 3-DIMENSIONAL FORMAT. The invention described therein derives from the principles of holography and/or integral photography. The 3-D PATENTS first disclose a basic principle of magnification and projection. This principle permits magnification and projection of three-dimensional images uniformly in all directions, thereby overcoming drawbacks in the prior art. My pending U.S. application Ser. No. 10/904, 888 discloses a broad improvement upon this principle. Based upon this principle, cameras are described, in their various embodiments, that photograph a scene and retain the three-dimensional information therein. Although still life three-dimensional photographs made using this system can be simultaneously magnified and projected, the disclosed system has particular advantages in producing three-dimensional motion pictures. The 3-D PATENTS also describe an editor that would edit integral photographs and holograms containing the three-dimensional information from the photographed scene. In addition, a theater is designed wherein magnified three-dimensional photographed images are projected upon a large screen to be viewed by an audience. Further, the projectors and screens are described in their various embodiments. My pending U.S. application Ser. No. 10/416,689 discloses various screens to be used with this system. My pending U.S. application Ser. No. 10/904,745 discloses a unitary MODULAR INTEGRAL MAGNIFIER and a screen comprising these modules that is particularly useful for the Present Invention, and which is discussed later in the Present Application.

However, the system as described in the 3-D PATENTS emphasizes the use of photographic film as the recording medium. The preferred camera embodiment uses black-and-white film to record integral photographic images, and also uses color filters to retain the color information. This is done to compensate for the relatively low resolution of conventional color film. High resolution black-and-white film is commercially available. Higher film resolution means that more information can be recorded on and ultimately retrieved from the film medium. For example, ultra-high resolution black and white panchromatic film having a resolution of 2,000 line pairs per mm can be obtained. With this resolving power, information can be recorded on and retrieved from a spot as small as 0.25-μ (one-quarter micron). Yet, the information recording and retrieval requirements for a single frame or photograph of a three-dimensional picture using the system described in the 3-D PATENTS are so great as to exceed the resolution capabilities of even this film. Thus, the invention described therein proceeds to disclose a camera:

wherein a very large optical system is used to record horizontal parallax;

wherein vertical parallax is absent from the recorded picture so as to reduce the amount of required information;

wherein the recorded image is multiplexed on the film frame using a complex optical system so as to conserve space on the film;

wherein the film frame is larger than that of conventional motion picture cameras so as to increase the space available for recording the image;

wherein the film moves faster than in conventional motion picture cameras so as to increase the amount of information that can be recorded in a given time; and, wherein the film is stabilized via a special three-point film motion registration mechanism.

The 3-D PATENTS disclose a number of post processing methodologies wherein the integral photographic pictures remain as integral photographs or are converted to holograms. Ultimately, these photographs must be projected using a specially designed projector. The photographs to be projected reside either on photographic film or are stamped onto plastic using a conventional process. In either event, images from a moving physical medium (hereinafter "film") are projected onto a special screen using the special projector. Depending upon the embodiment, the film is transported through a film motion mechanism either at constant velocity or in a manner similar to that used in conventional motion picture projectors wherein each frame of film is stopped for viewing. The film stabilization requirements make great demands upon the projector. One embodiment requires gyroscopic stabilization. Also, illumination demands are great, and very complex unmultiplexing optics are required for the projector.

Clearly, both the motion picture camera and the projector for the system disclosed in the 3-D PATENTS are much more expensive to fabricate than their current motion picture equipment counterparts. The fact that the camera is very expensive should not discourage its use since even its higher cost would represent a small fraction of the cost of currently producing a motion picture. Furthermore, a single camera can be used to produce a large number of motion pictures. However, display of the three-dimensional motion pictures so produced either requires that special theaters be built or that conventional theaters be converted to show these new films. History of the motion picture industry has demonstrated that special processes requiring special theaters to be built have not enjoyed enduring economic success. On the other hand, many special processes that have lent themselves to adaptation in conventional theaters have achieved lasting success. Conventional theaters that would show three-dimensional motion pictures produced using the described system would require a special screen and projector, and the audience seating would be limited to certain specified positions. A conversion design wherein there would be minimum disruption to current audience seating is feasible. One of the continuing patent applications to the 3-D PATENTS (No. 09/853,790) discloses a manufacturing process wherein the special screen of the preferred embodiment can be inexpensively fabricated as small rectangular tiles to be assembled as a larger screen of any desired dimensions in any theater. However, the projector is the most expensive component in a theater designed to display these three-dimensional motion pictures. The design element most responsible for the increased expense of this special projector relative to conventional motion picture projectors is the film motion mechanism and the stabilization mechanism resulting therefrom. Therefore, if it were possible to eliminate film from the projection process, projectors could be produced at a much lower cost than even conventional motion picture projectors. In fact, the Present Invention could entirely eliminate the need for a projector. Furthermore, as will be discussed later, two-dimensional motion pictures may be shown in the same theaters utilizing the same equipment.

Television is a current device that can display motion pictures optionally with or without the use of film. The final television display mechanism does not use film at all. Unfortunately, the resolution available from conventional television systems makes projection of motion pictures before large audiences in large theaters impractical. Computer monitors provide somewhat higher resolution than conventional television sets, and the new High Definition Television (HDTV) standard also addresses this problem. Home viewing audiences are gradually demanding larger television screens. Rear projection large screen video home entertainment systems are popular, but the video quality is much lower than with large screen conventional picture tubes. HDTV was created to expressly solve this problem. Occasionally, interactive technical seminars are held in large motion picture theaters wherein live and filmed two-dimensional video images are projected onto a large screen. While the quality of these pictures is acceptable to audiences attending such events, the quality of motion pictures so projected is very poor compared to the quality of conventional movies projected from film. Some attempts have been made to digitally project popular movies in a few theaters with limited success. The major drawback to currently available video projection systems is that the resolution is so poor compared to film projection that the audience must be seated far enough away from the screen so as not to notice the difference. The Digital Light Processor (DLP™) chip manufactured by Texas Instruments, Inc. provides improved resolution, but even when these chips are used in digital projectors, the resolution is far less than from conventional film projectors. In addition, the illumination systems of currently available video projectors produce less bright and lower contrast pictures than those produced by film projectors. This poor image quality would probably be acceptable to viewers were film projectors not to be the motion picture display standard. However, audiences always look for image quality improvement, and are unwilling to accept less than standard viewing conditions.

The three-dimensional motion pictures produced by the system described in the 3-D PATENTS cannot be transmitted over conventional broadcast television. The bandwidth is simply too low. A video frame, broadcast using the NTSC standard, possesses a total vertical resolution of 525 line pairs. The unit of video resolution is called the pixel. The number of pixels in a video frame is (320×525 resolvable spots) or 168,000 pixels. Some video frames are displayed using 640×480 pixels or 307,200 pixels. Compare this with a conventional motion picture frame on 35-mm color film where there are between five-million and twenty-million pixels depending upon the type of film used. The 3-D PATENTS place the three-dimensional motion picture frame resolution requirement between 400-million and 33.8-trillion pixels. A conventional television broadcast simply cannot transmit that much information at the rate of 30 frames per second to be able to produce the three-dimensional movies in this way. Other transmission methods, such as fiber optic cable, have sufficient bandwidth, but the NTSC, PAL, SECAM, and even the HDTV display standards do not provide enough monitor resolution to show these movies.

Videotape recording technology for television broadcasts has been around since the early 1960's. In the 1980's, home videocassette recorders became available. These video recording devices are analog in nature. This type of recording is the same as the television broadcast standard which is also analog. Recently however, cable providers have been broadcasting digital television programming, and digital video recorders are now available to the public. Digital video affords a noticeably better picture quality than analog video. DVD movies are gradually replacing videocassette movies in both home and professional entertainment systems. However, the NTSC, PAL, or SECAM standards used therein do not adequately take advantage of the capabilities of digital video. In the USA, the NTSC standard is expected to be phased out over the next few years in favor of the HDTV standard.

Even in the film industry, digital recording has become the standard. Very few motion pictures are still edited using mechanical editing machines. Instead, they are edited digitally, frame by frame on computers. Special effects are regularly produced by computers during post production, although some are still produced in camera. Frames of motion picture film are exposed or printed in high resolution from digital images stored in computers. However, for best quality, motion pictures must first be recorded on photographic film, then transferred to a digital medium for editing, and finally transferred back to film for display.

When a picture is recorded on photographic film, the picture resolution is defined by the product of the frame size (in square-millimeters) and the square of the film resolution (in line pairs per mm). Degradation of photographic resolution is referred to as graininess. When a picture is recorded digitally, it does not have a frame size. The picture is stored either in a computer or on a digitally compatible medium. The resolution of the picture is specified by its dimensions in pixels or by the total number of pixels it contains. Degradation in digital resolution is referred to as pixelation.

Digital recording of motion pictures is current state-of-the-art. NTSC, PAL, SECAM, or HDTV quality motion pictures can be captured using digital video cameras. Digital recordings are typically made on high quality videotape, CD-ROM, and DVD. They are also recorded and stored in computers. With many computers, the amount of information required to record an entire motion picture on the available storage media may be so large as to make such recording impractical. Therefore, software compression algorithms have been developed to reduce storage requirements. Much digital image compression is also state-of-the-art.

Still-life digital photographic images are currently stored by a computer in many formats. The common image file types are BMP (bitmapped), JPEG (Joint Photographic Experts Group), GIF (Graphics Interchange Format), JPEG 2000, TIFF (Tagged Image File Format), PNG (Portable Network Graphics), PSD (Photoshop), and PICT (developed for MacDraw software). BMP is an uncompressed file format that permits direct viewing of the pixels. The other image formats employ compression in one way or another that is either lossless or lossy (i.e., upon decompression, all of the image information may or may not be fully reconstructed). These image formats were developed specifically to enable computer images to be displayed on computer monitors. Typical monitor resolutions are 640×480, 800×600, and 1024×768 pixels. Therefore, the current image formats are inadequate to meet the resolution requirements of the three-dimensional process disclosed herein.

Storage of an uncompressed 24 bit per pixel digital video motion picture lasting two hours running at 29.97 frames per second (the NTSC standard) with a resolution of 640×480 would require approximately 1.6 terabytes. Sometimes motion pictures are actually stored as uncompressed digital video for editing purposes where computer graphics special effects are added to individual frames. One recent motion picture required 700 gigabytes of data storage for this purpose. In this case, the editors were unable to store the entire movie on their computer at one time. Individual scenes were downloaded from video tape, edited frame by frame, then re-recorded in edited form onto video tape, and deleted from computer memory to make room for the next scene. However, except for such demanding editing requirements, methods currently exist to enable entire video motion pictures to be practically stored on computers. In addition, the capacity of available storage media is increasing rapidly.

Motion picture digital video files are currently stored on computers using formats called codecs (enCOder/DECoder). These codecs are also used for distribution of motion pictures on the web or a LAN or any other method of file transfer. Most comprise both video and audio information and feature not only intra-frame compression but also inter-frame compression. AVI (Audio Video Interleave) is compressed with many different codecs depending upon the needs of the users. It is a special case of the RIFF (Resource Interchange File Format), and it is the most common format for audio/video data on the PC. Its specification was defined by Microsoft as was the ASF (Active Streaming Format). The MPEG (Motion Picture Experts Group) codecs are also extremely popular. The MPEG-1 format produces high quality video and audio streams at approximately 2×CD-ROM data rates. Its standard is full frame rate (24–30 fps, depending on the source) with a quarter size image (352×240), and it is useful for playback on most personal computers. The MPEG-2 format produces high data rate, full broadcast quality files. Its standard is full frame rate (24–30 fps) and full screen resolution (720×480). It is the format used for DVD-Video and many home satellite data systems. The standard for the Apple Macintosh computer is the Quicktime format. Many other formats, such as MPEG4 and others, are also popular. Unfortunately, these also are matched to current television sets or computer monitors, and are unsuitable for use with the three-dimensional motion picture format disclosed herein.

On the other hand, generalized data compression algorithms are not necessarily keyed to photographs or video files that require display on television sets or monitors. Instead, they perform their function on any computer data files based upon the redundancy of the information contained within those files. The following compression algorithms are popularly used:

Arithmetic Coding
Pulse Code Modulation
Differential Pulse Code Modulation
Run-Length Coding
Shannon-Fane Coding
Huffman Coding
Dictionary Methods The particular variant of arithmetic coding specified by the JPEG standard is the subject of patents owned by IBM, AT&T, and Mitsubishi. One of the most popular dictionary methods is LZW (Lempel-Ziv-Welch) compression. As an example, a TIFF image file can achieve almost 5:1 compression using this algorithm.

The ability to digitally store complete motion pictures and other types of television programming is recent. DVD players, which are digital, are now commonplace in the home, and they are beginning to replace older video cassette recorders (VCR's) which are analog. DVD players double as CD-ROM players in many desktop computers. AVI, MPEG-1, MPEG-2, MPEG-4, and Quicktime in addition to other codecs are commonly used to enable digital video programs to be stored on the hard drives of desktop computers. Using appropriate software, computer users can watch these movies and programs on their computer monitors, and, in some cases, on their television sets.

Many companies have combined this technology with that of the internet. It would be desirable to transmit digital motion pictures and other video programming from computer to computer. Unfortunately, they were confronted with bandwidth problems. This problem can be illustrated by examining the available bandwidth for several methods of data delivery:

| TECHNOLOGY | DATA TRANSFER RATE |
| --- | --- |
| Fast Ethernet | 100 Mbps |
| Ethernet | 10 Mbps |
| Cable Modem | 8 Mbps |
| ASDL | 6 Mbps |
| 1x CD-ROM | 1.2 Mbps |
| Dual channel ISDN | 128 Kbps |
| Single channel ISDN | 64 Kbps |
| High speed modem | 56 Kbps |
| Standard modem | 28.8 Kbps |

Uncompressed video at 216 Mbps and above cannot be transmitted using these methods of data delivery. Using a cable modem and depending upon internet traffic, it can sometimes take as much as twenty-four hours to practically download a complete motion picture stored in AVI format. An additional problem arises when a user downloads a program from a host computer. By doing this, the user now has a perfect copy of the original program, and he can potentially re-distribute the program to others without the knowledge or permission of the program's owner. To overcome these problems, video streaming technology was developed. With video streaming, files can play as they are being downloaded to the user's computer. Thus the necessity for downloading and storing entire files before playback has been eliminated. In the video streaming model, information from the digital video file is sent by the video server to a data buffer. Data packets are then sent across communication lines to the client computer where it is stored in a data buffer and is played as it is received. These files are usually transmitted using AVI, ASF, H.263, or MPEG-4 codecs as well as proprietary streaming codecs such as Vxtreme, ClearVideo, VDOLive, Vivo, RealVideo, TrueStream, and Xing. Video streaming has specific hardware and software requirements. Systems combining both are commercially available. Generic video streaming software is also available.

The problems with currently available video streaming technology are the dependence upon relatively low available bandwidths and the incapability of producing programming with acceptable resolution on commercially available computer monitors. Even were these problems to be solved for conventional video programming, it would not be even nearly adequate for the much higher data transfer rates required for three-dimensional motion pictures produced using the process disclosed herein.

It has already been discussed that elimination of the film requirements of the invention in the 3-D PATENTS would be desirable for reasons of cost reduction. Digital projection and/or transmission provides the solution to this problem and is therefore an object of this invention. The present invention, in all its embodiments, is realized by a camera that digitally records the integral photographic images and by a mechanism that magnifies these digital images before a large audience. The principle for magnifying these digital images is identical to that claimed in the 3-D PATENTS, and described therein as "the magnification principle." However, digital images can also be created by direct recording or by transfer from photographic images on film. Therefore, this system is compatible with photographic recording using cameras disclosed in the 3-D PATENTS.

As the 3-D PATENTS' disclosure proceeded, it became apparent that, once the basic principle of magnification and projection was utilized, the primary technological problem centered around practically recording a sufficient quantity of information upon a manageable amount of photographic film. Much of the disclosures of the 3-D PATENTS describe the various solutions to this problem. In the Present Invention, it will become apparent that, once "the principle of magnification" is employed, the primary technological problem centers around practically recording a sufficient quantity of information on digital recording devices as well as on digitally compatible recording media. Much of the disclosure for the Present Invention addresses this problem. Another major technological problem, the solution to which is addressed in the Present Invention, is integration and transmission of the vast quantity of digital information using digital electronics so as to photograph large three-dimensional scenes and to project or transmit the three-dimensional pictures produced therefrom onto a screen for viewing.

The 3-D PATENTS disclosed that the system described therein can be used with television systems, computers, video recording and animation. They disclosed that it is possible to construct a home entertainment system (resembling a television set) that employs the methods and apparatus described therein. Furthermore, while broadcasting of three-dimensional photographic material over conventional television broadcast bands or even over conventional cable TV transmission is unfeasible due to bandwidth considerations, it is possible to adequately transmit such image information over closed circuit fiber optics cable. This has implications not only for home entertainment but also for computer displays. Using the methods and apparatus described therein, three dimensional computer graphics is feasible. Furthermore, the use of magnetic videotape (or other magnetic media) to record the information necessary for image retrieval using this method is also feasible. So also is the use of CD's of various formats (e.g., laser disc and DVD) feasible for this purpose.

In view of the above, it is therefore an object of the present invention to provide a three-dimensional system and method in which non-stereoscopic images can be magnified and digitally projected or transmitted to be seen by large audiences. Digital cameras and digital projectors will be described to accomplish this objective. Digital projectors are not necessary for all embodiments. Editing will be accomplished digitally. Another object of the invention is to provide such a system wherein said images are still life and/or moving pictures. Yet another object of the invention is to provide a three-dimensional system which is adaptable for use in animation, home entertainment, and computer technology. A further object of the invention is to enable the invention described herein to be compatible with display of two-dimensional images.

Factors Distinguishing the Present Invention Over the Prior Art

The concept of integral photography is not new. Edward Muybridge was the first to produce multiple photographs of a given scene. He obtained a patent in 1883. His process used multiple cameras to photograph moving objects. Each camera photographed the same scene from a slightly different view point. His now famous photographs were later assembled as frames to be used in the earliest motion pictures. The distinguishing feature of his process is that the photographs were not exposed simultaneously, but rather in a temporally sequential sequence. A few years later, Henry Kuhn developed a process to photograph a single scene from multiple viewpoints apparently simultaneously. The elemental photographs so produced were assembled onto a single photographic sheet arranged as a "stamp portrait." In 1920, J. W. Legg perfected a high speed camera that used multiple exposures to produce a series of stereoscopic photographs. In the meantime, several cameras were developed to produce photographic stereoscopic pairs. These stereoscopic pairs could be later reconstructed as three-dimensional scenes in special viewers called stereoscopes. At the time, stereoscopes had been used for at least a century to view artistic drawings in three-dimensions. Stereoscopes are still sold today. Stereoscopic cameras represented an improvement that enabled people to view photographed scenes with three-dimensional realism. In 1930, Herbert Ives developed a process to produce "parallax panoramagrams" from a pair of stereoscopic photographs. "Parallax panoramagrams" used lenticular sheets to reconstruct three-dimensional scenes without requiring additional special viewing aids. Ernest Draper, in 1934, developed a method of using multiple cameras to simultaneously photograph a three-dimensional scene. In 1936, Douglas Coffey developed a process for producing three-dimensional lenticular integral photographs called "composite stereographs." During the ensuing years, many improvements on these processes were made, and lenticular stereograms and integral photographs are still currently made and sold.

Until the invention of the system and apparatus described by the applicant in the 3-D PATENTS, integral photographs could not be practically magnified nor projected before a large viewing audience. Projection of non-stereoscopic three-dimensional motion pictures in theaters was heretofore unfeasible. In the 3-D PATENTS, integral photographs are produced using a first optical system comprised of a matrix lens array and other optical elements. The matrix lens array consists of a plurality of elemental lenses. Each elemental lens is capable of producing a single two-dimensional elemental photograph. The combination of these elemental photographs forms a two-dimensional integral photograph. The integral photograph is then magnified by a given magnification factor. The magnification process produces either a new integral photograph or a projected image. When the magnified two-dimensional integral photograph is viewed through a second optical system, a correctly magnified three-dimensional scene can be viewed. The second optical system is similar to the first in that it was scaled up from the first optical system by the magnification factor.

The same principle of magnification and projection described in the 3-D PATENTS, is used in the present invention. The difference is that video and digital imaging is used instead of photographic film. Consequently, the integral photographs of the 3-D PATENTS, do not physically exist in the present invention. Instead, they are virtual digitizations initially created with video imaging tubes and subsequently stored as digital information in computer memory and peripheral media. Virtual integral photographs produced in this manner are novel. The actual scenes are photographed using camera embodiments described herein. Many of the camera optical systems resemble those of the cameras described in the 3-D PATENTS. However, as will be described herein, because of image resolution problems, multiple video imaging tubes must be used. In most of the camera embodiments described, a single integrated first active optical system is used with a plurality of imaging devices. Yet, in one of the embodiments, a plurality of conventional video cameras functioning together as a single unit are used to produce the digitized virtual integral photograph. This camera embodiment is reminiscent of the earlier prior art discussed above. This is only an external physical resemblance due to the use of multiple cameras in the inventions dating back to the nineteenth century. However, when considered as a unit, this camera embodiment is not at all anticipated nor predicted by the aforementioned prior art. An integral photograph is composed of a plurality of elemental photographs, each elemental photograph requiring a separate lens for its creation. Whether that lens belongs to an integrated optical system or is a component of a separate single camera is irrelevant. A single camera with multiple lenses and imaging devices is the equivalent of the same number of multiple cameras having a single lens and single imaging tube. The unique aspect of this camera embodiment as well as of the alternate camera embodiments is the combination of camera components designed to produce the appropriate digitized virtual integral photograph. In the preferred camera embodiments, not all of the required elemental photographs are produced. The number of elemental photographs so created is insufficient to combine to produce an adequately viewable three-dimensional scene. To solve this problem, the preferred camera embodiments also contain a computer module to derive the missing elemental photographs by interpolation.

SUMMARY OF THE INVENTION

These and other objects of the invention which shall be hereinafter apparent are achieved by the SYSTEM AND APPARATUS FOR RECORDING, TRANSMITTING, AND PROJECTING DIGITAL THREE-DIMENSIONAL IMAGES comprising a method and apparatus for reducing a three-dimensional scene to an integral photograph, recording said integral photograph digitally onto a compatible medium, editing the digital image, and projecting or transmitting a magnified integral photograph in such a manner as to create the magnified three-dimensional image for viewing by an audience. The invention uses the basic principle of magnification and projection disclosed in the 3-D PATENTS as well as the optical principles described therein. The invention comprises cameras for photographing the scene and projectors for reconstructing the scene in three-dimensions. The invention utilizes the various screens which are active optical systems that were disclosed in the 3-D PATENTS and their continuing applications. Part of this disclosure involves new computer software methodology. This invention provides a system which is capable of being used in large theaters before large audiences. However it also provides a system which is adaptable to animation, home entertainment, and computer technology.

BRIEF DESCRIPTION OF THE DRAWINGS

The invention will be better understood by the Detailed Description of the Preferred and Alternate Embodiments with reference to the drawings, in which:

FIG. 7 (a) shows the format of the original integral photograph after compression in the vertical direction. FIG. 7 (b) shows the format of the multiplexed film.

FIG. 12 (a) is a top view, and FIG. 12 (b) is a front view.

FIG. 18 is a schematic showing the results of projection on a screen.

FIG. 21 shows the appearance of a single monitor from the matrix array and a single color filter corresponding to that monitor in the second embodiment of the projector.

FIG. 22 shows the appearance of a triad of elemental pictures from a video monitor and a corresponding triad of vertical color strips from the color filter in the second embodiment of the projector.

FIG. 26 shows how a byte can be separated into its respective nibbles by bitwise manipulation. FIG. 26(a) shows the results of right shifting. FIG. 26(b) shows the results of left shifting.

FIG. 27 shows the significant nibbles from two bytes can be combined into a single byte.

FIG. 28 is a schematic showing how data from a 12-bit monochromatic pixel can be compressed to an 8 bit pixel.

FIG. 35 is a drawing of the Modular Integral Magnifier disclosed and claimed in my pending U.S. application Ser. No. 10/904,745. FIG. 35(a) is a rear elevational view, and FIG. 35(b) is a side elevational view.

FIG. 36 shows a video monitor screen bonded to the rear face of the Modular Integral Magnifier shown in FIG. 35.

FIG. 37(a) is a front elevational view of the modular screen. FIG. 37(b) is a right-side elevational view. FIG. 37(c) is a top plan view. FIG. 37(d) is a rear elevational view.

Software Flow Charts:

The remaining drawings are used to describe the software associated with the processes and apparatuses that are the subject of this invention. The method of representation used therein is HIPO, an acronym which stands for Hierarchy plus Input-Process-Output. It was developed at IBM during the 1970's, and it has been widely used for software documentation. Its methodology is described in a 1975 IBM published document:

International Business Machines Corporation, "HIPO—A Design Aid and Documention Technique," IBM Corporation Technical Publications, GC20-1851-1, White Plains, NY, 1975

Figure 38:
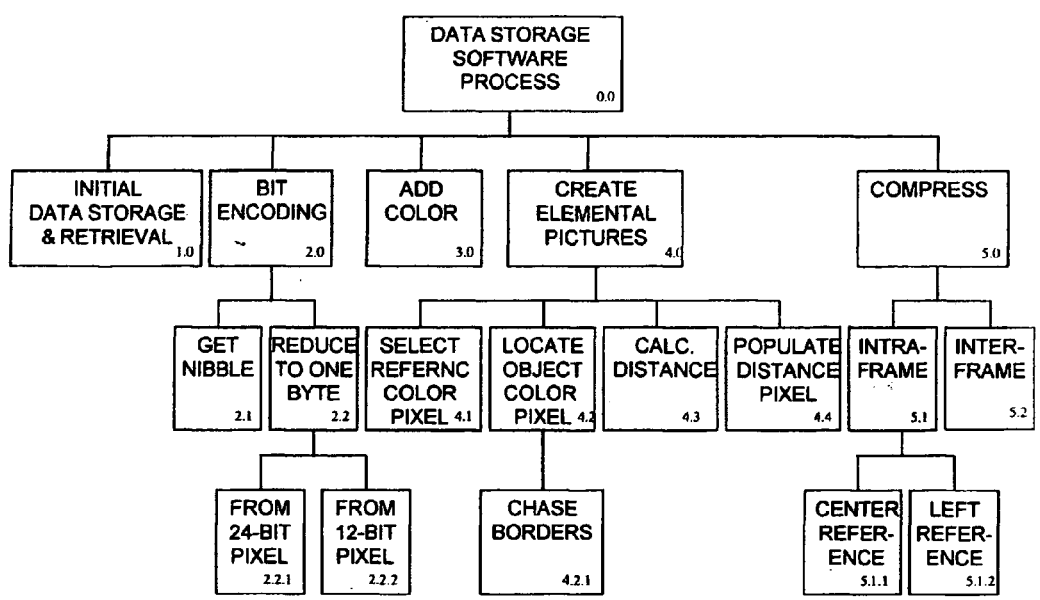

FIG. 38 is a hierarchical HIPO chart showing the modular relationship for the "Data Storage Software Process" for the sixth camera embodiment.

Figure 39:
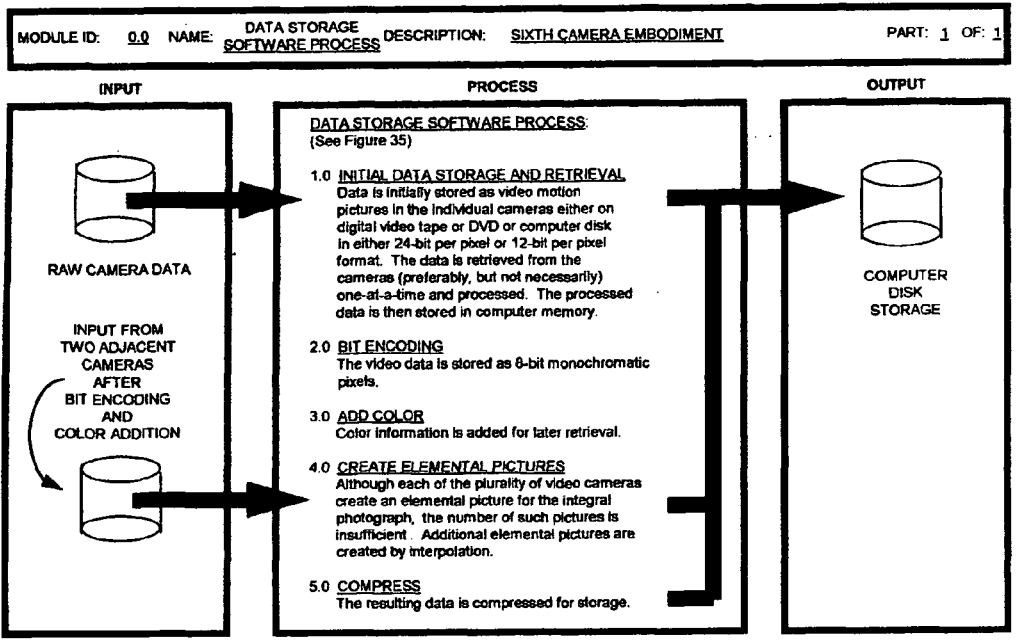

FIG. 39 is an IPO flow chart showing the modular flow for the "Data Storage Software Process."

Figure 40:
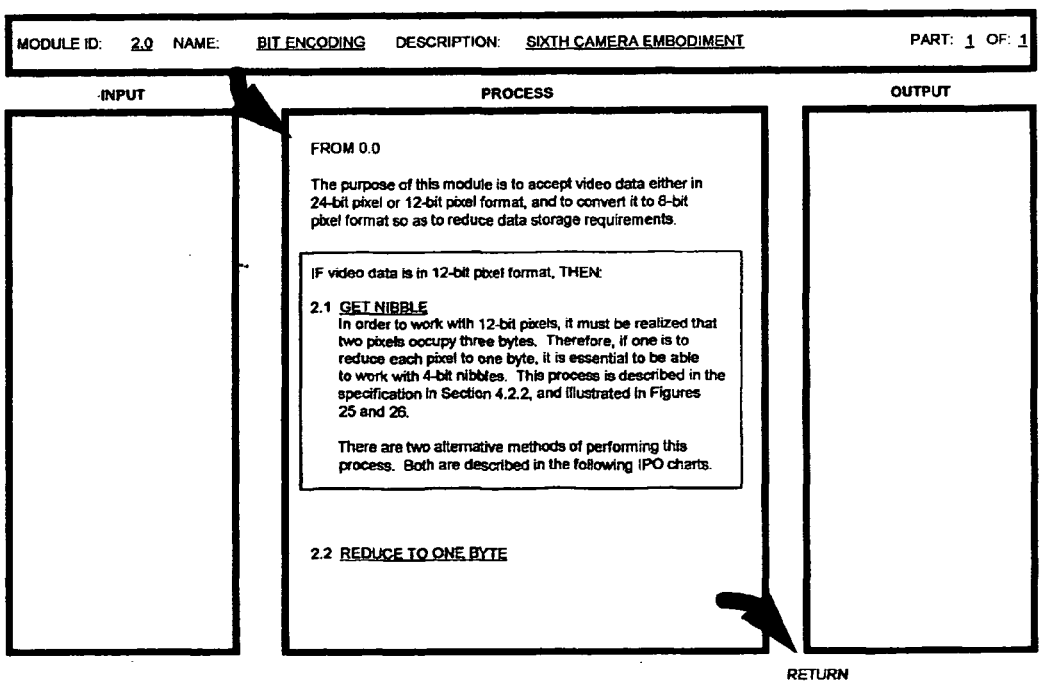

FIG. 40 is an IPO flow chart describing the "Bit Encoding" process.

Figure 41:
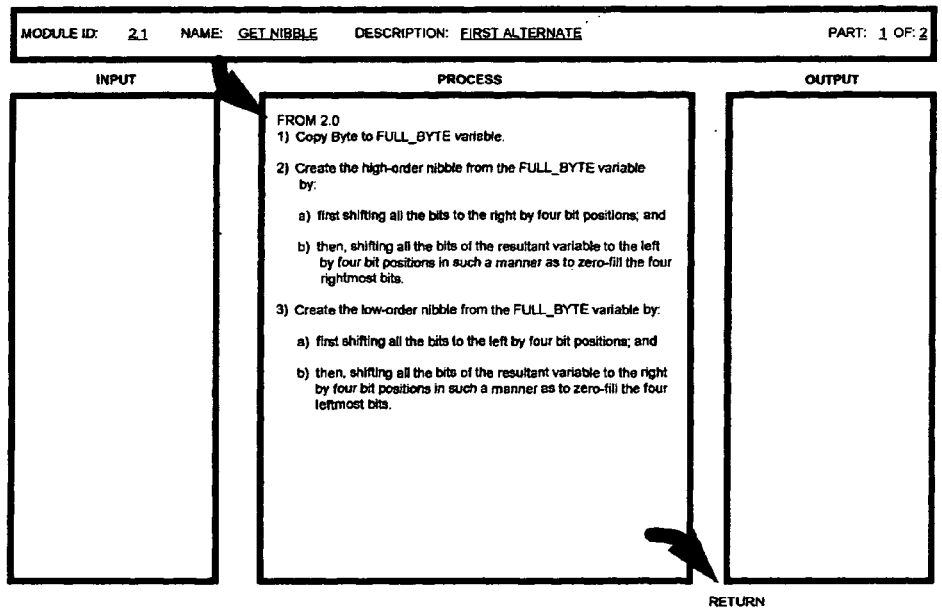

FIG. 41 is an IPO flow chart describing the first alternate of the process "Get Nibble," which ultimately permits manipulation of half-bytes.

Figure 42:
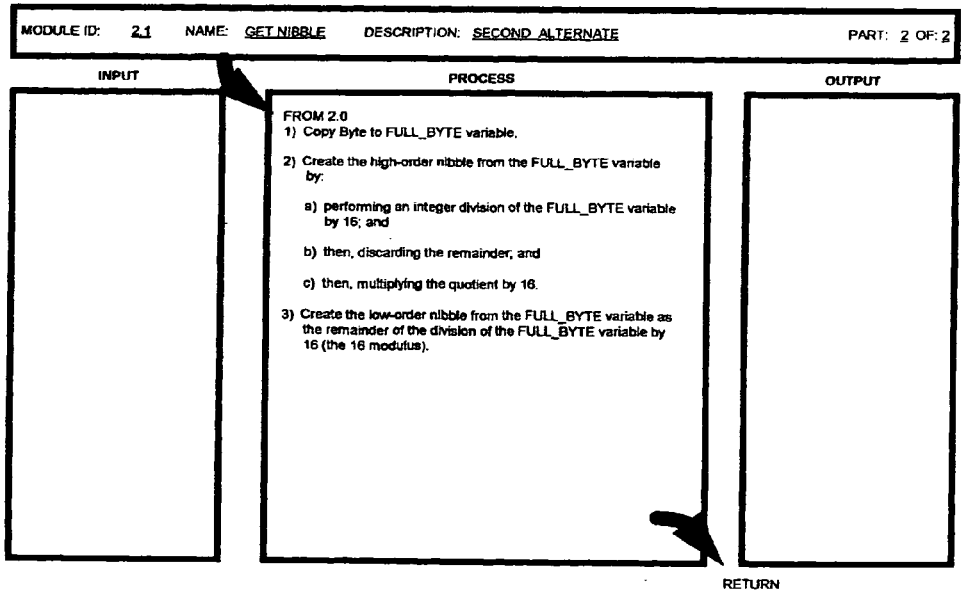

FIG. 42 is an IPO flow chart describing the second alternate of the process "Get Nibble."

Figure 43:
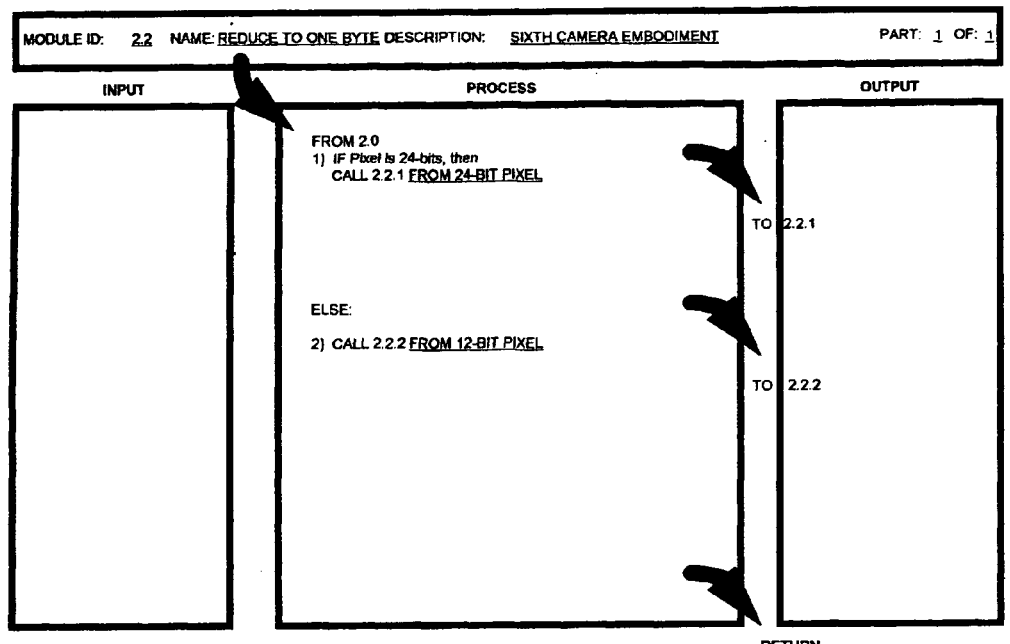

FIG. 43 is an IPO flow chart showing the modular flow for the process "Reduce to One Byte."

Figure 44:
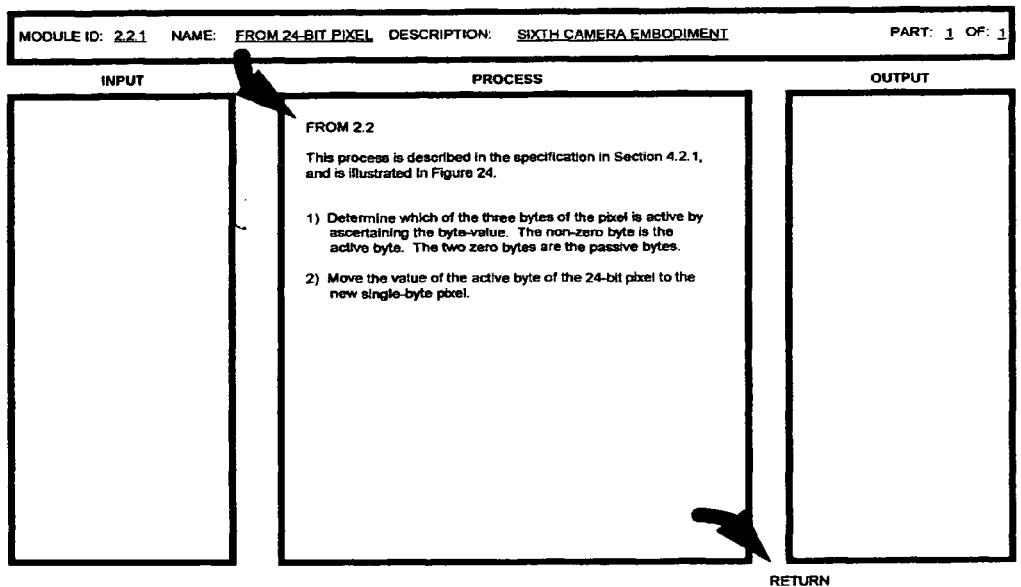

FIG. 44 is an IPO flow chart describing how an 8-bit pixel can be obtained "From 24-Bit Pixel."

Figure 45:
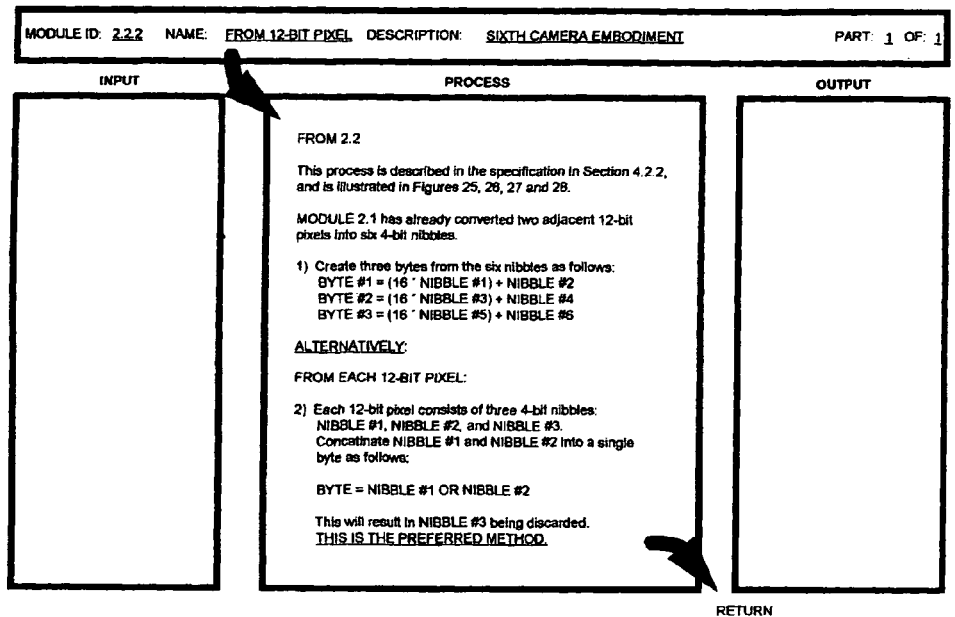

FIG. 45 is an IPO flow chart describing how an 8-bit pixel can be obtained "From 12-Bit Pixel."

Figure 46:
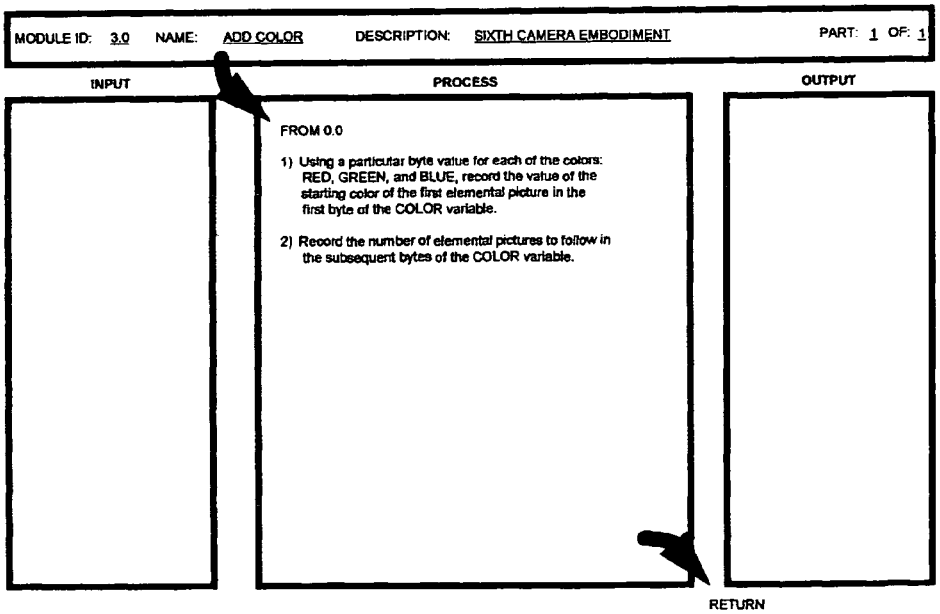

FIG. 46 is an IPO flow chart describing how to "Add Color" information to monochromatic elemental pictures.

Figure 47:
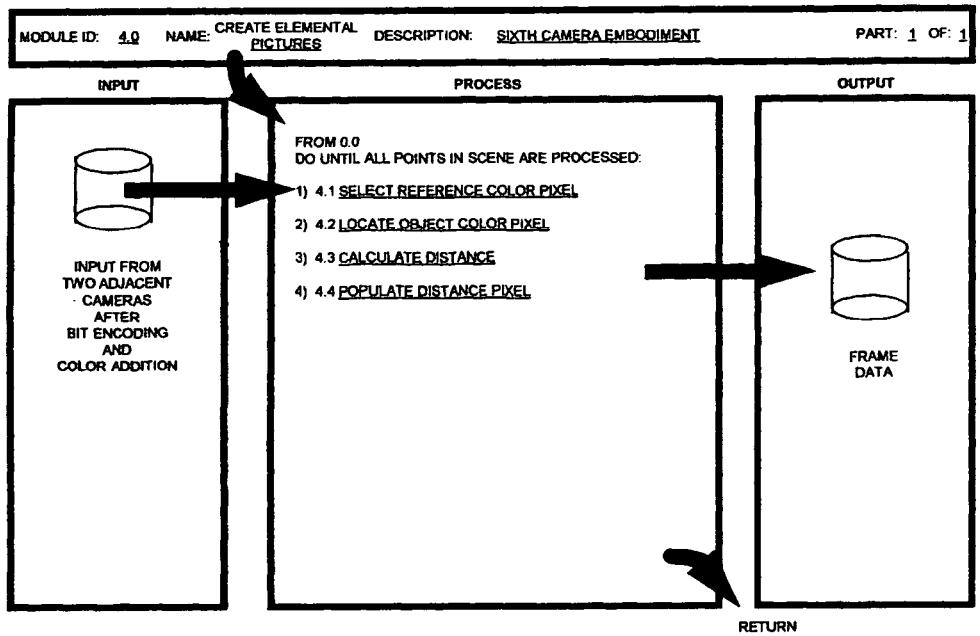

FIG. 47 is an IPO flow chart showing the modular flow for the process to "Create Elemental Pictures."

Figure 48:
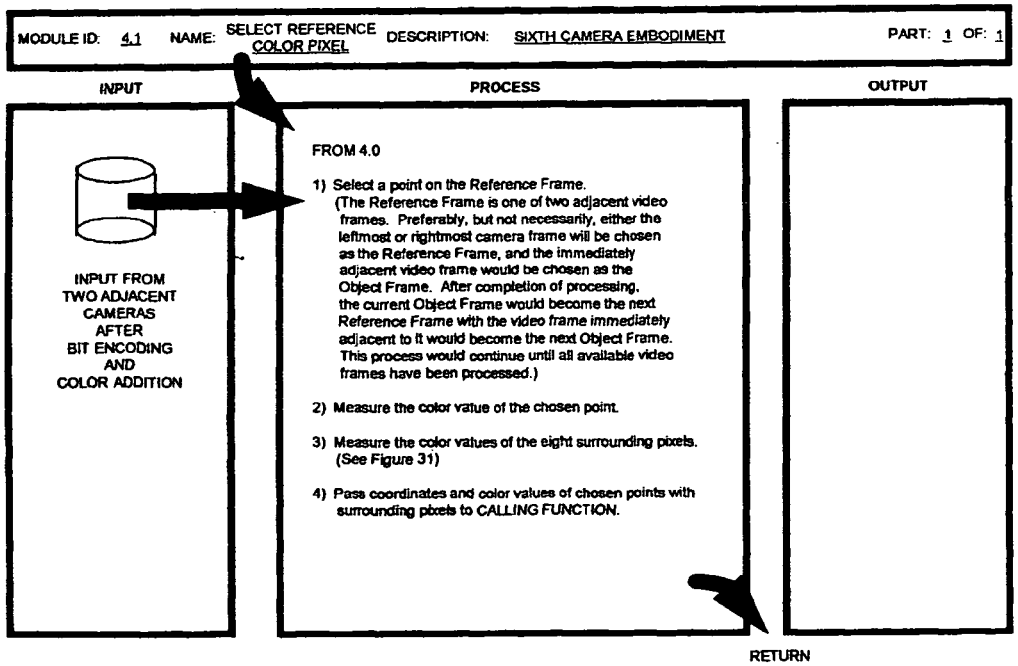

FIG. 48 is an IPO flow chart describing how to "Select Reference Color Pixel."

Figure 49:
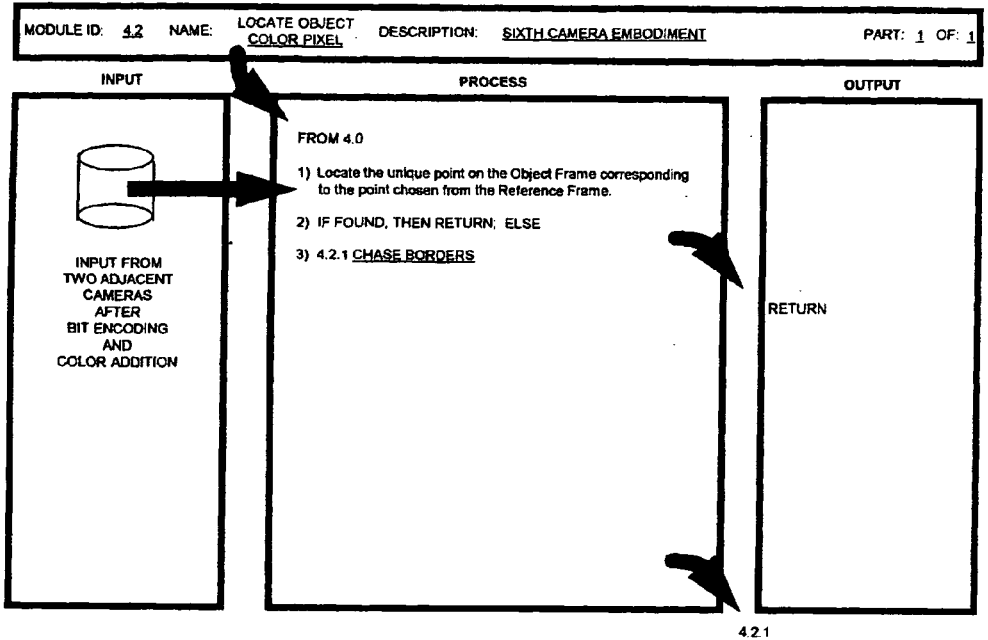

FIG. 49 is an IPO flow chart describing how to "Locate Object Color Pixel."

Figure 50:
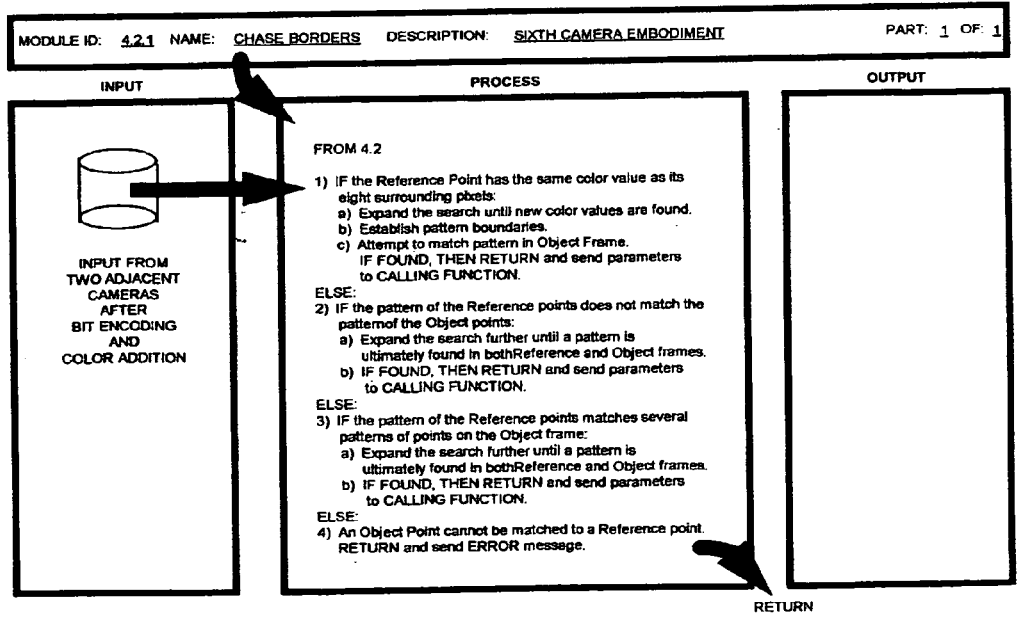

FIG. 50 is an IPO flow chart describing how to "Chase Borders."

Figure 51:
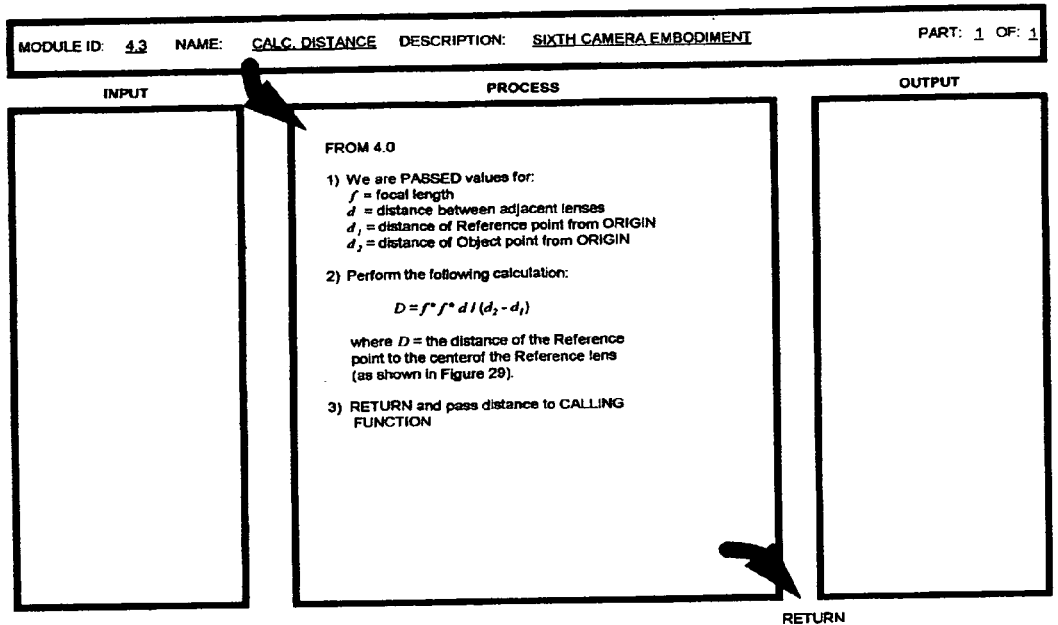

FIG. 51 is an IPO flow chart describing the process "Calc Distance" which calculates the distance of any point in a three-dimensional scene from the camera lens.

Figure 52:
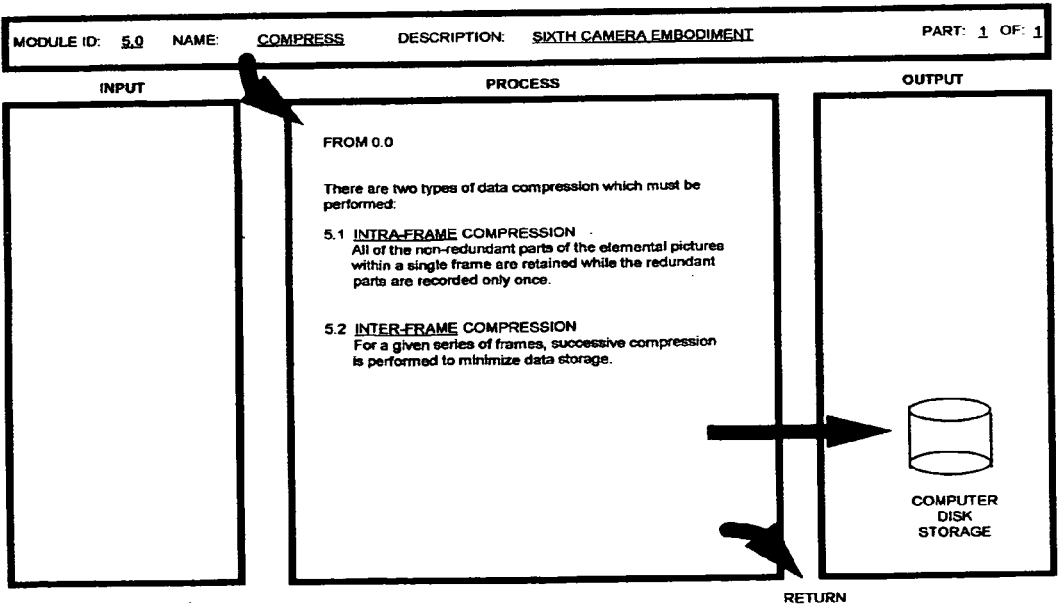

FIG. 52 is an IPO flow chart for the process "Compress" which discusses the data compression methodology.

Figure 53:
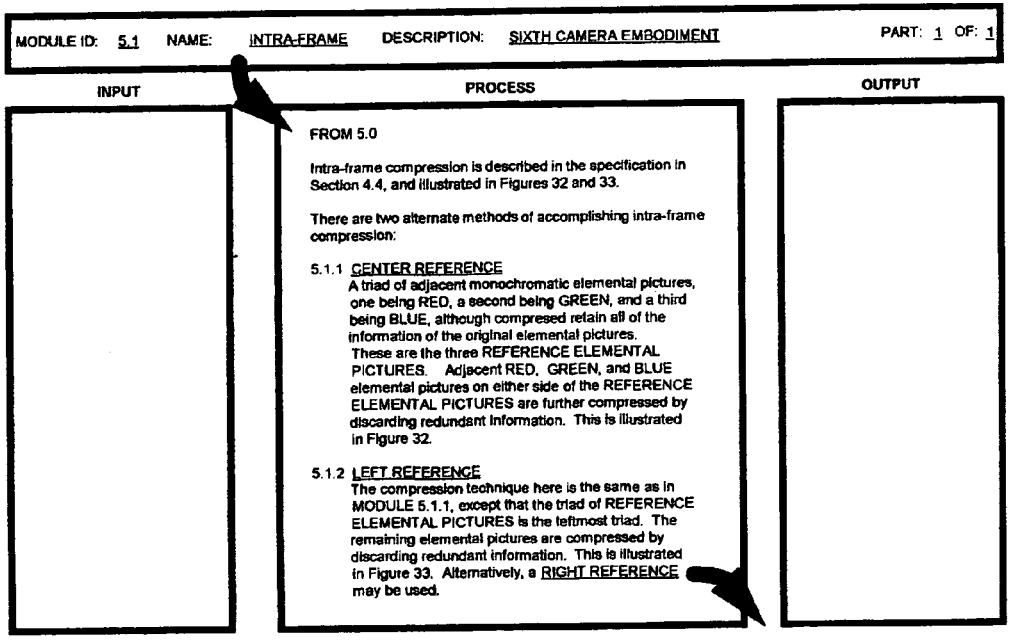

FIG. 53 is an IPO flow chart describing the alternate methods of "Intra-Frame" compression.

Figure 54:
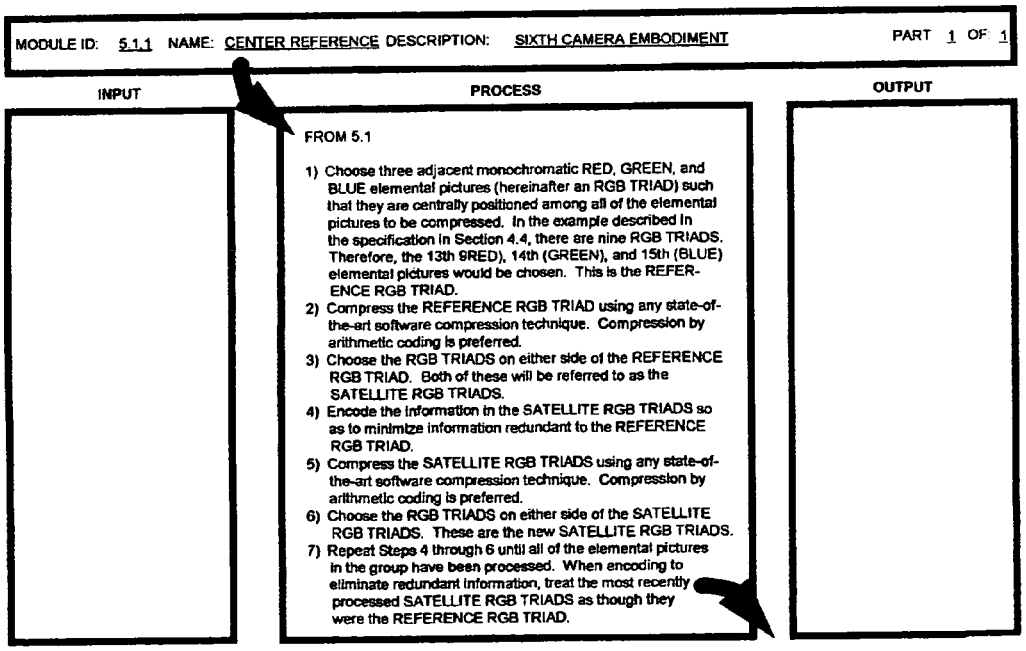

FIG. 54 is an IPO flow chart describing the "Center Reference" method of intra-frame compression.

Figure 55:
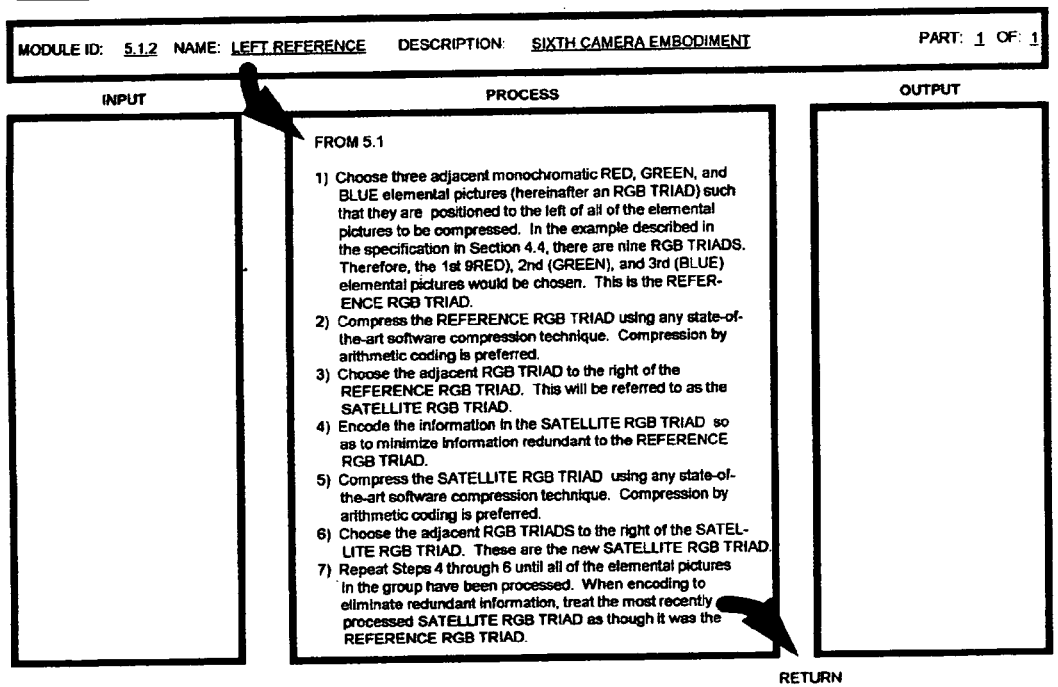

FIG. 55 is an IPO flow chart describing the "Left Reference" method of intra-frame compression.

Figure 56:
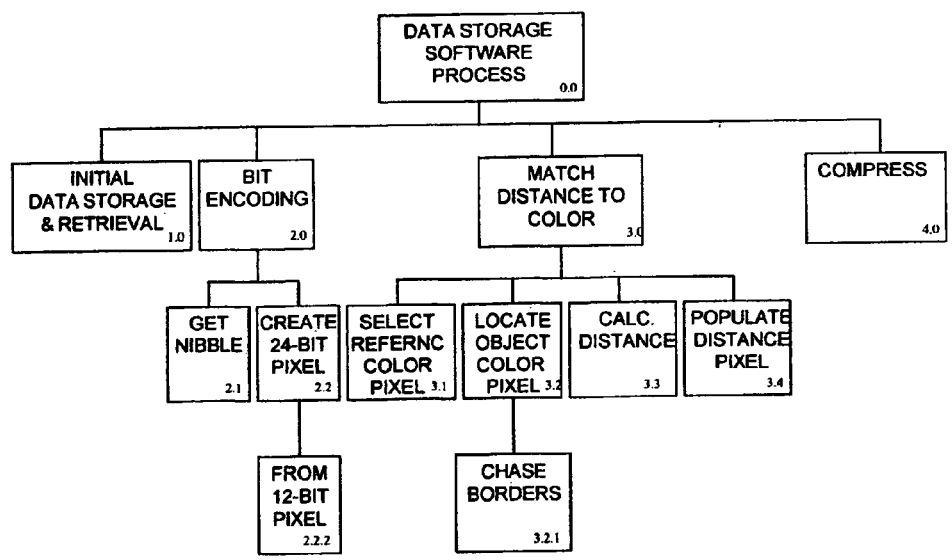

FIG. 56 is a hierarchical HIPO chart showing the modular relationship for the "Data Storage Software Process" for the first five camera embodiments.

Figure 57:
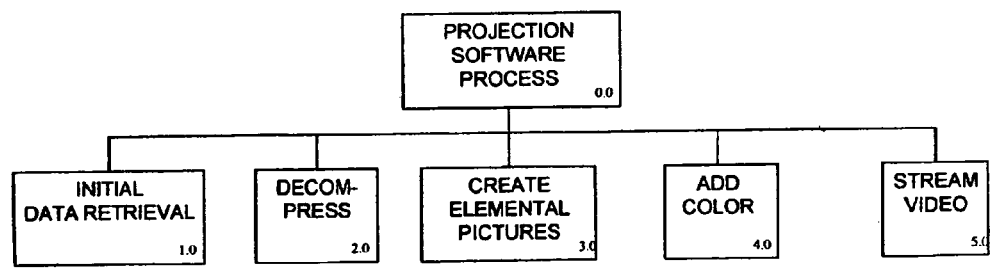

FIG. 57 is a hierarchical HIPO chart showing the modular relationship for the "Projection Software Process."

Figure 58:
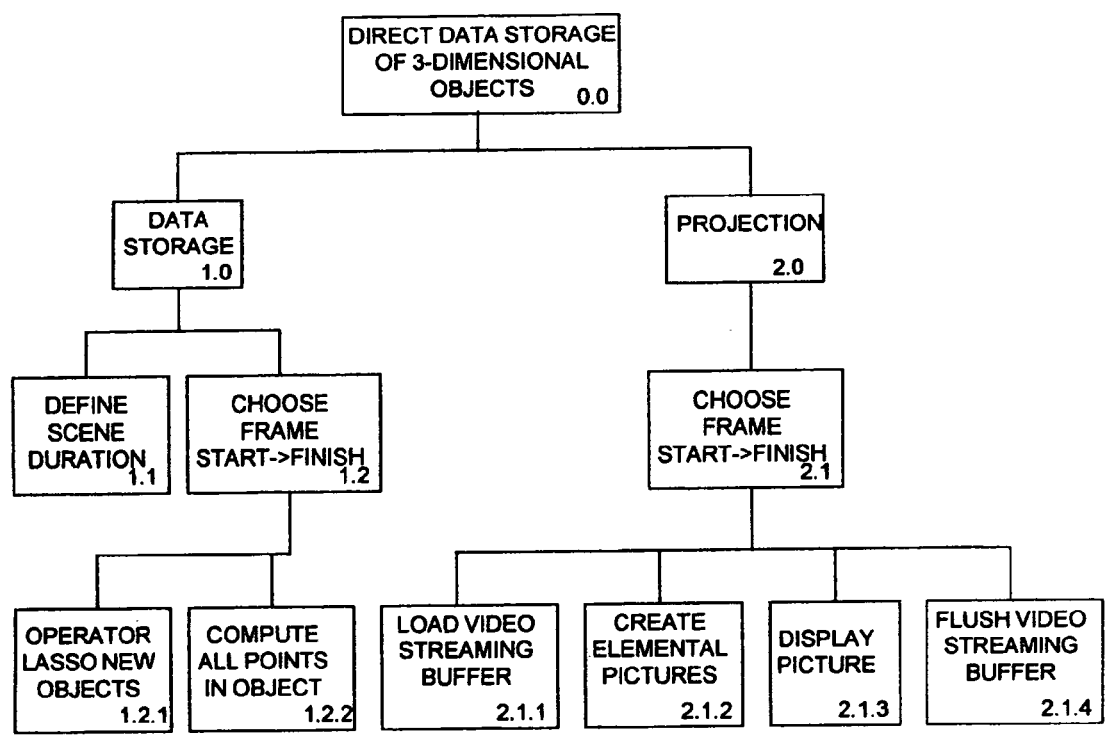

FIG. 58 is a hierarchical HIPO chart showing the modular relation for the process of "Direct Storage of 3-Dimensional Objects."

DETAILED DESCRIPTION OF THE INVENTION 1.0 The Principle of Magnification and Projection The present invention, in all its embodiments, is based upon a method that permits magnification (or demagnification) of a three-dimensional image produced from a photograph, hologram, optical system or other system or device, regardless of the medium or the method, in such manner as to preserve the depth to height and width relationship of the image as it existed prior to magnification. This method was disclosed in the 3-D PATENTS and in my pending U.S. application Ser. No. 10/904,888. The method requires the three-dimensional image prior to magnification to be rendered as an array of two-dimensional images by a first matrix lens array, such as a fly's eye lens. The method provides that all image dimensions would be magnified by the same factor such that all dimensions of the final three-dimensional image would be proportional to the dimensions of the original image provided that:

- the original array of two-dimensional images is magnified by some magnification factor;
- the magnified array of two-dimensional images is then viewed or projected through a second matrix lens array; and,
- the second matrix lens array has the same number and arrangement of lenslets as in the first matrix lens array, such that the second matrix lens array has been scaled up from the first matrix lens array in such a manner that the scaling factor is equal to the magnification (e.g., [the focal lengths or distance to the image plane] and [the diameters or distances between the centers] of the lenslets must be multiplied by the same magnification factor).

The ability to perform three-dimensional image magnification uniformly in all image dimensions is an advancement over the prior art. The utility of magnifying three-dimensional images using this method would be the ability to enlarge holograms or integral photographs or other media from which three-dimensional images are produced, or to project still or moving three-dimensional images before a large audience.

Figure 1:
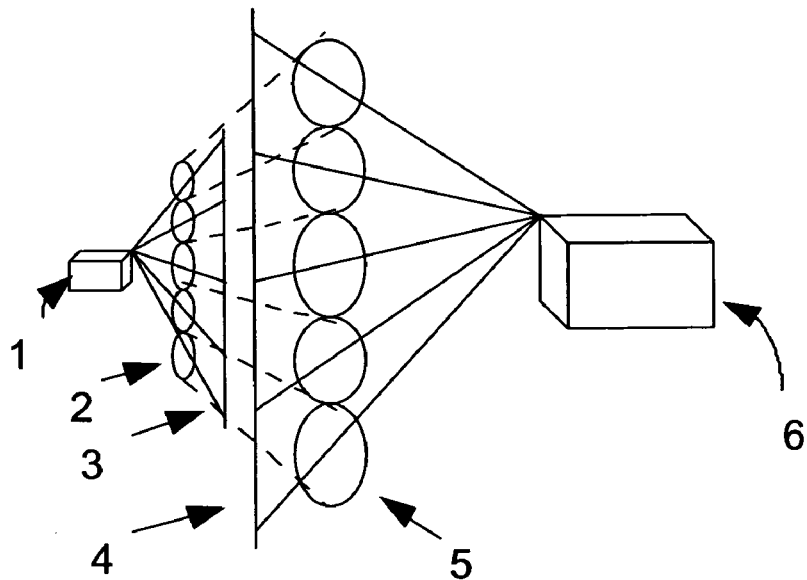
FIG. 1 illustrates the method of magnification that is the basis for this application.

The magnification principle is illustrated in FIG. 1. Object 1 is photographed by matrix lens array 2, thereby producing integral photograph 3. Integral photograph 3 is then magnified to produce integral photograph 4 which is then placed behind matrix lens array 5. This combination yields magnified image 6. It must be noted here, that during scaling-up, the ratio of the focal lengths (or distances from the central plane of array 5 to the image plane) to the distances between the centers of the lenslets in the array remains constant and equal to that ratio for the lenslets in matrix lens array 2. If a matrix lens array is made up of adjacent lenslets that touch each other, that ratio is equal to the (F/#).

Figure 2:
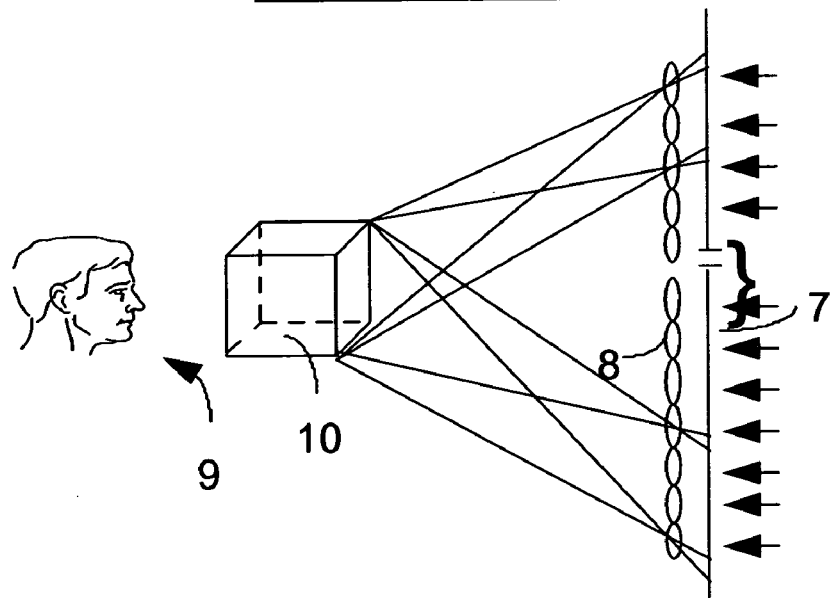
FIG. 2 illustrates how a magnified image can be projected before an audience.

Projection is merely another form of magnification. The only difference lies in the fact that no permanent record is produced as in photography. To illustrate the principle of projection, let us use as an example, the technique of rear projection shown in FIG. 2. (As described in the 3-D PATENTS, it is also possible to illustrate this principle with front projection.) Were an integral photographic transparency to be projected at some given magnification onto a translucent screen 7 which is behind a large matrix lens array 8, an observer 9 in the audience sitting in front of the matrix lens array will see the magnified three-dimensional image 10. As disclosed in the 3-D PATENTS, the three-dimensional image can be made orthoscopic, and can be made to appear either in front of or behind the matrix lens array.

What requires description is the optical, electrical, and mechanical system needed to produce the initial two-dimensional array from the unmagnified three-dimensional image (i.e., the camera), the optical, electrical, and mechanical system needed to produce the magnified three-dimensional image (i.e., the projector), any intermediate medium needed to produce the magnified three-dimensional image (i.e., the screen and/or any intermediate optical system), and any devices that may be required for editing the two-dimensional images used to produce the three-dimensional image. Also required is a description of the methods of photographing, projecting and editing magnified three-dimensional images. Finally, there must be a description of any computer processing that must be done to store and retrieve the images.

2.0 The Camera

The camera consists of:

- an optical system that would produce the two-dimensional array of two-dimensional images on a plane;
- the plane and/or recording medium whereon the two-dimensional array is produced;
- the mechanical apparatus (if any) associated with the image plane and/or recording medium;
- a means (if any) for adjusting the optical system for focus and/or special effects;
- the necessary electronics and computer equipment; and,
- the housing (if any) that integrates the optical system, the mechanical system and the image plane and/or recording medium into a single unit.

An example of the optical system is a matrix lens array such as a fly's eye lens arranged so as to produce a rectangular matrix array of rectangular two-dimensional images. This matrix array of elemental pictures would be called an integral photograph. If the camera is a motion picture camera capable of capturing moving three-dimensional images in the form of a sequential series of integral photographs, some means of sequencing frames would be required. If the camera is a video camera capable of capturing moving three-dimensional images in the form of a sequential series of integral photographs, a tube capable of converting optical signals to electronic signals would be required. The same would be true for a digital still camera that does not use film. If the camera is a digital video or still camera, a computing device might be included to convert the captured images into some digital format for storage on some digitally compatible medium. The digital video or still camera might also include a means for recording the image such as video tape, diskette, ROM, magnetic or other devices, etc. It might also require a mechanical device to hold and move the recording medium. Finally, any such camera mentioned above might require a housing to integrate the components and to provide a dark environment so as to not expose the recording medium unnecessarily. Alignment apparatus could also be used.

The parameters affecting the design of the screen and the theater are adequately discussed in the 3-D PATENTS. The 3-D PATENTS disclose that the screen, which is also a matrix lens array, must have the same number and arrangement of image focusing elements as the camera matrix lens array, and the (F/#) of each element in the screen lens array must be the same as its corresponding element in the camera lens array. This proves necessary for the film based system disclosed in the 3-D PATENTS. However, as will be discussed later in this digital based application, in many instances, this restriction can be avoided where different types of focusing elements are used in the two matrix lens arrays.

Studies have indicated that in a theater, an optimum audience viewing distance ranges between two and six times the screen width. Thus, the audience size and location can help determine an acceptable screen size. Although many movie theaters currently place their audiences closer to the screen than twice the screen width, those spectators sitting this close to the screen view even the present two-dimensional pictures uncomfortably.

It can be shown using parameters and mathematical equations defined in the 3-D PATENTS that it would be very convenient for the screen and the camera to have approximately 1,800 elements in the horizontal direction. Convention has it today that the width of a movie theater screen is twice its height. Therefore, the screen and camera will have approximately 900 elements in the height direction. Therefore, there will be a total of approximately 1,610,000 elements.

Where a video camera is to be used, considering a square array of elements on the imaging tube, since there are 1,800 such elemental pictures in the horizontal direction, each such elemental picture will have a linear dimension of 0.000556×w (where w is the width of the frame). In the area of X-Ray technology, large area, high resolution CCD based imaging systems are available. For example in one such system the CCD consists of a 2,048×2,048 array of 12 μm pixels, measuring 24.5 mm×24.5 mm and operated at room temperature, cooled only by ambient air circulation. With such an imaging tube, the width of the frame is 24.5 mm, and, therefore, the linear dimension of each elemental picture would be 0.01 mm. The 12 μm resolution is approximately equivalent to a spatial frequency of 42 line pairs/mm. Therefore, each picture would have the total information given by 0.42 line pairs. This is completely unusable. High resolution liquid gas cooled CCD imaging tubes for use with X-Ray technology are available with a resolution as low as 7 μm, but the image size is extremely small. Thus, using a rectangular matrix lens array for a video camera is extremely impractical.

2.1 The First Embodiment of the Camera

Figure 3:
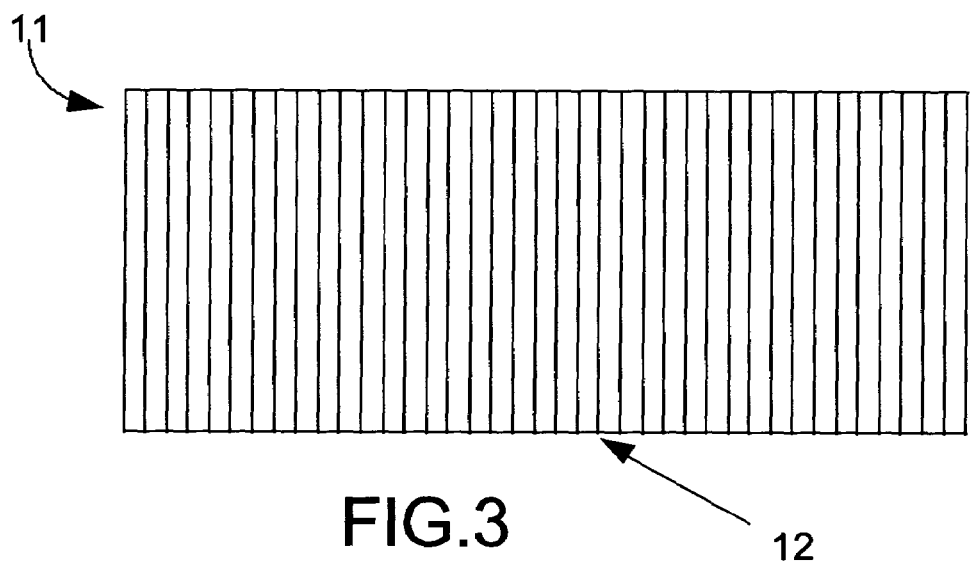
FIG. 3 illustrates the appearance of a two-dimensional integral photograph projected upon a screen using the preferred embodiment of this invention.

A solution is available that avoids the resolution problem: that is the elimination of vertical parallax, the use of monochrome video cameras for color videography, and the combined synchronized use of multiple video sources. Theoretically, an integral photograph produced by this type of camera will appear as shown in FIG. 3. The entire two-dimensional projected image 11 would consist of a multiplicity of two-dimensional elements 12. A projected three-dimensional image reconstructed from an integral photograph with only horizontal parallax would look exactly the same as the "lenticular" three-dimensional pictures currently on the market. Vertical parallax would be missing, but horizontal parallax would be present. In normal use of binocular vision, vertical parallax is not used, and horizontal parallax alone is sufficient to give a true three-dimensional effect.

According to the example above, the integral photograph in FIG. 3 would have approximately 1,800 elemental pictures spread out horizontally. Of course, they would be highly anamorphic in the horizontal direction. Given the frame width of 24.5 mm of the CCD imaging device cited above, each elemental picture would have a width of 0.0136 mm in the horizontal direction. This is precisely the width of each elemental picture that existed in the previous example without elimination of vertical parallax. While the vertical resolution would be excellent, the horizontal resolution would be ridiculously low. There are two solutions to this problem. Either the elemental pictures must be multiplexed to fit on the 24.5 mm×24.5 mm frame or the camera must be comprised of multiple video imaging tubes (with associated image focusing means). Of course, a solution exists that would combine both solutions. Horizontal elemental resolution can be calculated in the following way:

$$1\mu \geq =10^{-3} \text{ mm}$$

$$\therefore 1\mu \text{ resolution}=500 \text{ line pairs/mm spatial frequency}$$

| RESOLUTION (Microns) | SPATIAL FREQUENCY (line pairs/mm) |
|---|---|
| 1 | 500 |
| 7 | 71 |
| 10 | 50 |
| 12 | 42 |

From experimentation it is apparent that a horizontal elemental spatial frequency of 42 line pairs/mm represents the worst case that can be tolerated for a viewable picture. Therefore, use of the example high resolution ambient temperature CCD image tube in the example is feasible with 1 mm wide elemental pictures. So, 74 image tubes would be able to cover the field of 1,800 elemental pictures. Therefore, the dimensions of each elemental picture would be 1 mm×24.5 mm were the example CCD image tube to be used. However, other high resolution area scan CCD image tubes are available with different image surface dimensions and different resolution properties. For example, there is a CsI (TI) CCD tube available with 12 μm resolution having an image surface measuring 88.2 mm×51 mm. Use of a different CCD video image tube would change the elemental image dimensions and would possibly dictate a slight change in the total number of elemental pictures for convenience. The CCD video image tubes discussed here use 12-bit pixels, and in the example image tube, the frame rate is 25 frames per second (fps). Neither the frame rate nor the resolution can be degraded. However, the bits per pixel can be made lower as a compromise if the resolution can be increased. True black and white only requires 2-bit pixels. This is a half-tone picture, and can be tolerated if the resolution is in the 1–2 μm range. A gray scale can be expressed with 8-bit pixels that would provide 256 shades of gray. The total image surface area is also a factor governing selection of the video image tube. Even though the imaging tubes would be larger than the adjacent matrix lens arrays, it is relatively simple engineering to position the tubes so that they would fit together in a camera whose overall width is slightly smaller than two meters.

The general case would be:

$$N_S \approx \frac{n_{LINEAR} \times w_E}{W} \quad [1]$$

where:
  $N_S$=the number of camera stages (imaging tubes and associated optical elements)
  $N_{LINEAR}$=the total number of elements of minimum size that can be placed in
  a given width in one direction in the camera or screen
  $w_E$=the width of one elemental picture
  W=the width of the image surface The reason for the approximation in equation [1] above ($\approx$) instead of an equality (=) is that $n_{LINEAR} \times w_E$ might not be evenly divisible by W. This was the case in the example above wherein 1,800÷24.5≈74. Of course, the total resolution of an elemental picture, expressed in line pairs/mm, can be increased by magnifying the image dimensions before focusing onto the image surface. However, this must be compensated by increasing the number of camera stages.

Figure 4:
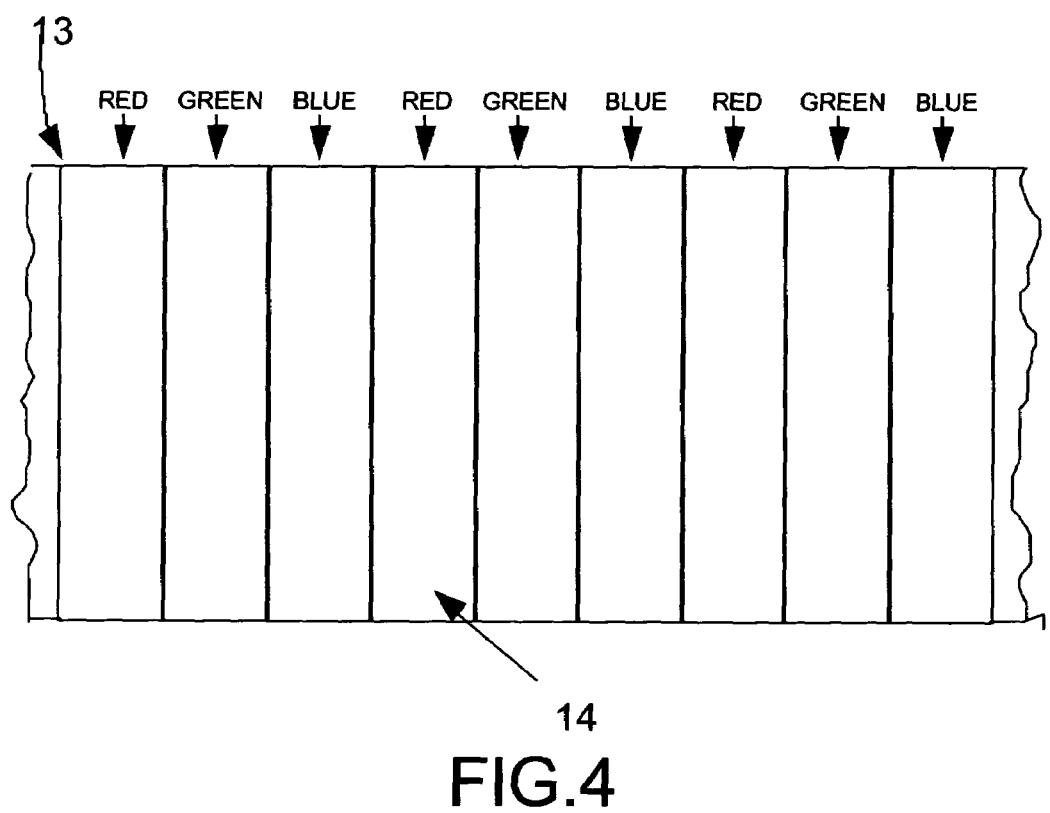
FIG. 4 is a schematic of a three color filter for producing monochromatic elemental video pictures.
Figure 5:
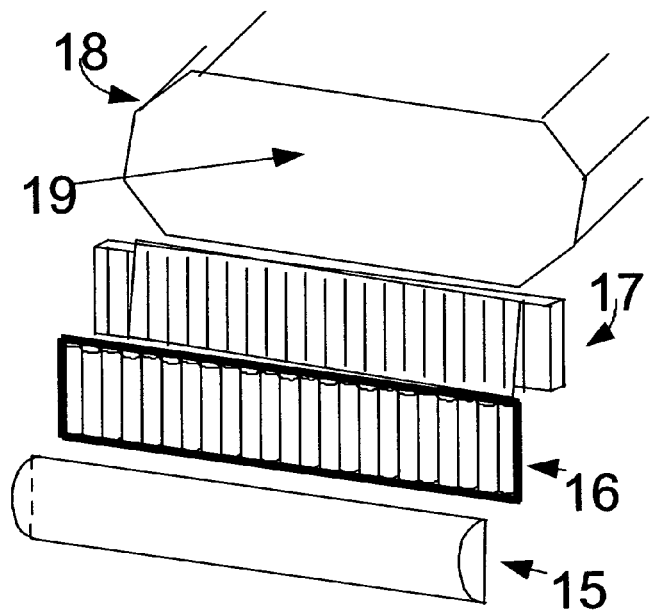
FIG. 5 is a schematic of the first embodiment of a single stage of a multistage video camera.
Figure 6:
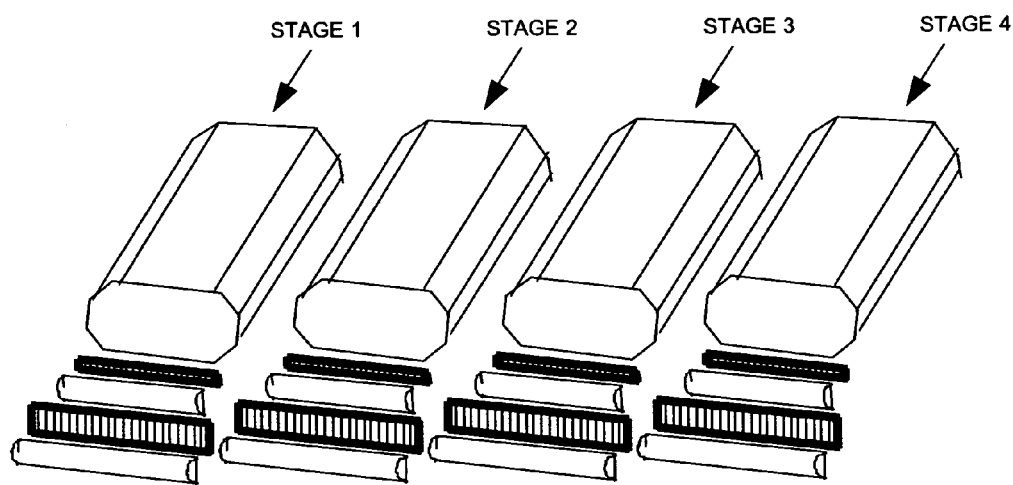
FIG. 6 is a schematic of the first embodiment of a multistage video camera.

Now, in order to achieve their high resolutions, the video imaging tubes must be monochromatic. Therefore, in order to create color pictures, multiple color filters such 32 as those described in the 3-D PATENTS must be used. In the embodiment described 33 herein, red, green, and blue are used as the primary colors. However, any three complimentary colors may be employed so long as they add to produce white light. FIG. 4 shows a section of such a color filter 13 with adjacent vertical transparent stripes 14 each being the size of an elemental picture. The colors of the adjacent vertical stripes alternate as red, green, and blue. FIG. 5 is a schematic of the first embodiment of a single stage of a multi-stage camera. Each stage is comprised of a cylindrical lens 15 to compress the elemental pictures in the vertical direction, a cylindrical matrix lens array 16 to compress the elemental pictures in the horizontal direction, a color filter 17 (such as is shown in FIG. 4) to produce alternating color monochromatic elemental pictures, and a high resolution video imaging tube 18. The cylindrical matrix lens array 16 can be any one of a number of different types as described in the 3-D PATENTS such as a Bonnet Screen (often called a lenticular sheet), a vertical array of adjacent cylindrical Fresnel Zone Plates, a hologram that reconstructs a vertical array of adjacent lines in space (said lines alternating red, green, and blue in color), etc. Other equivalent types may be used. The cylindrical lens 15 can be refractive, reflective, diffractive, or holographic in nature, or it can also be a zone plate. Furthermore, the cylindrical lens 15, the cylindrical matrix lens array 16, and the color filter 17 need not be arranged in the same order as is shown in the figure. The function of the combined optics comprised of lens 15, array 16, and filter 17 is to focus a vertical array of adjacent anamorphic elemental images (i.e., an integral photograph) onto image surface 19 of video imaging tube 18. FIG. 6 is a schematic of the first embodiment of a multi-stage camera. In FIG. 6, only four identical stages of the type described in FIG. 5 are shown. However, the camera can be comprised of many more stages that are similarly situated adjacent to one another.

2.2 The Second Embodiment of the Camera

A second embodiment of the camera would be to use fewer video imaging tubes (perhaps even one tube) by multiplexing the elemental pictures in the vertical direction.

Figure 7A:
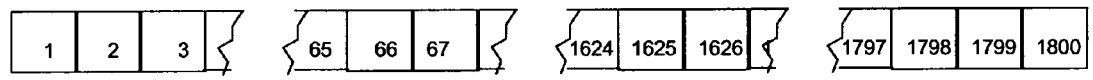
FIG. 7 shows how the integral photograph shown in FIG. 3 can be multiplexed onto a rectangular film format.
Figure 7B:
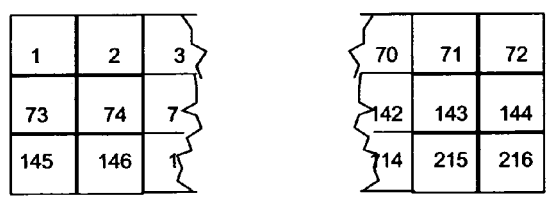
Figure 7B:
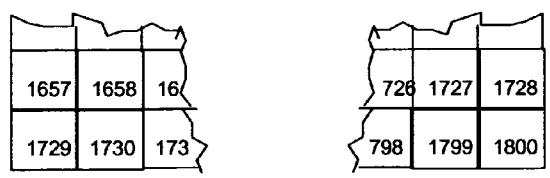

In the first embodiment of the camera shown in FIGS. 5 and 6, it is sufficient for the cylindrical lens that compresses all of the elemental pictures in the vertical direction to merely compress them so as to fit the vertical dimension of the image planes of the video imaging tubes. Therefore, in the chosen example where the image plane presents a frame size of 24.5 mm×24.5 mm, each elemental picture would be approximately 1 mm wide×24.5 mm high. This would provide excellent picture resolution in the vertical dimension and marginal picture resolution in the horizontal dimension. However, the human eye would compensate for the poor horizontal resolution because there are a large number of elemental pictures positioned horizontally. It would certainly be possible to reduce the size of each elemental picture in the vertical dimension and still maintain acceptable resolution. Were the vertical size of each elemental picture to be reduced to 2.45 mm, the total vertical spatial resolution would be approximately 100 line pairs. This has only marginal acceptability since it is less than one-fifth of the vertical resolving power of a conventional television picture. Yet, using an elemental picture size of 1 mm×2.45 mm, it would be possible to use only seven video imaging tubes in the camera to capture the entire scene. If a tube with image dimensions of 72 mm×72 mm were to be used, it would be possible to use only one video imaging tube. This is shown in FIG. 7. The example shown in this figure uses 1,800 elemental pictures arranged horizontally. Were these elemental pictures to be arranged in 25 rows vertically, each row would have 72 pictures. Therefore, each elemental picture in this 25×72 rectangular matrix would have approximate dimensions of 1 mm wide×1 mm high. FIG. 7(a) shows the elemental pictures arranged horizontally, and FIG. 7(b) shows the elemental pictures multiplexed into the aforesaid rectangular matrix on the video imaging tube. The various optical systems to perform multiplexing of this nature in the camera are adequately disclosed in the 3-D PATENTS. Were a decision to be made that the elemental picture dimensions afford inadequate resolution, additional video imaging tubes could be employed. In this way, the elemental picture dimensions can be increased to any desired size.

An initial examination of this second embodiment might lead a person skilled in the state-of-the-art to question why it might not be the preferred embodiment for the camera. In fact, it represents the preferred camera embodiment in the 3-D PATENTS. When used in the video camera disclosed above, it affords a reduction in the number of high resolution video imaging tubes thereby decreasing component costs and maintenance frequency. Unfortunately, the optics required to accomplish elemental picture multiplexing are complex. Multiplexing is necessary in a film camera to avoid the use of several filmstrips moving simultaneously that would require frame synchronization at the projection stage or, at least, in the post processing stage. However, digital frame synchronization with video imaging devices is easily accomplished. Therefore, the use of a larger number of video imaging tubes in the digital system disclosed herein is preferable over multiplexing. While the cost of constructing a camera for this system is a factor, the camera price, even with the large number of video imaging tubes, is small when compared with the other costs incurred in motion picture production. The camera price is easily amortizable.

2.3 Discussion Pertaining to the First Two Camera Embodiments

Figure 8:
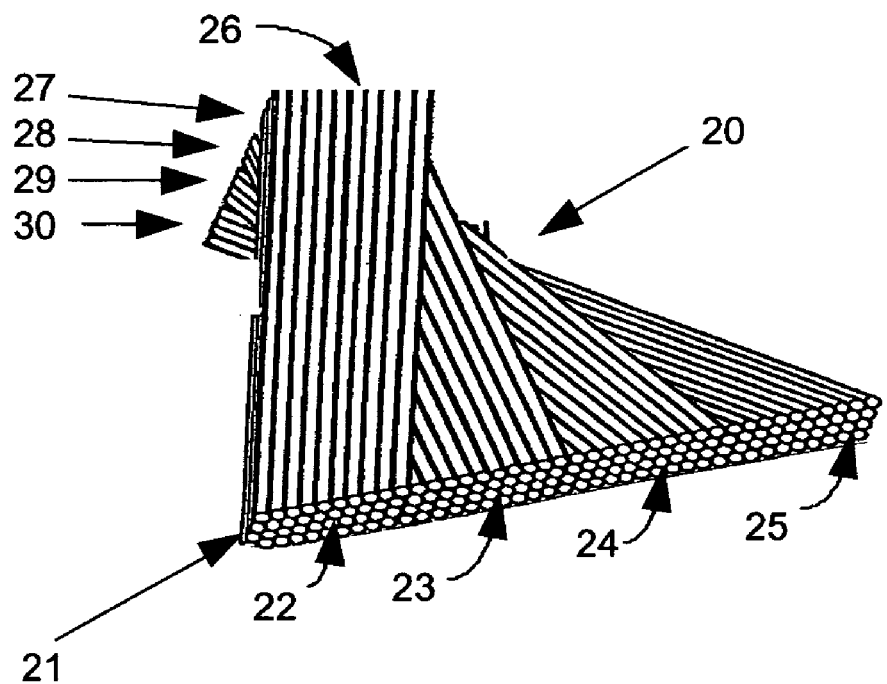
FIG. 8 is a drawing showing a fiber optics image dissector that can be used for image redirection and/or multiplexing.

In both embodiments disclosed above, it is not necessary for the multiple video imaging tubes to be positioned adjacent to each other linearly in the horizontal direction. It is only required that the optics comprised of the cylindrical lens (or multiple cylindrical lenses), the vertical lens array (or multiple arrays), and the color plate (or multiple plates) be positioned so as to afford adjacent continuity in the horizontal direction. The video imaging tubes can be positioned anywhere within the camera housing, and, depending upon the embodiment used, the optics required to redirect the elemental pictures to their appropriate video imaging tubes could be trivial. FIG. 8 is an example of a fiber optics image dissector that can be used for redirecting a group of elemental pictures into a different configuration. In the figure, the fiber optics image dissector 20 has two image planes 21 and 26. Were a line of adjacent elemental pictures to be focused onto image plane 21, the image dissector 20 could rearrange them into a different apparent configuration on image plane 26. In the example in FIG. 8, there are four groups of elemental pictures on image plane 21 arranged horizontally (i.e., 22, 23, 24, and 25) that are reconfigured vertically on image plane 26 (i.e., 27, 28, 29, and 30, respectively). This can be done so as to enable multiple video image tubes to be positioned adjacent to each other vertically instead of horizontally. In this example, four video image tubes are used. On the other hand, the fiber optics image dissector shown in the figure could be used to multiplex horizontally arranged elemental pictures so that they would be positioned in a matrix on a single image plane. In this example, the matrix would have four vertical rows. The use of this fiber optics image dissector for multiplexing was disclosed in the 3-D PATENTS. This type of fiber optics image dissector can be fabricated to provide any desired elemental picture rearrangement. It can be fabricated in stages and bonded together. 2 µm diameter fibers are readily available, and there would not be any problem obtaining 12 µm diameter fibers. In the example high resolution CCD video image tube, 12 µm square format fibers would probably be used.

2.4 The Third Embodiment of the Camera

A third solution to the problem exists that would permit the use of a single conventional video low resolution imaging tube. This third embodiment of the camera would involve optically magnifying each elemental picture and focusing the magnified image onto the surface of the imaging tube. This method has the advantage of providing high resolution pictures, but has the disadvantage that much higher data transfer rates are required. For example, if normal film moves at 25 fps and there are 1,800 elemental pictures, then information would have to be transferred at the rate of 45,000 fps. Video camera electronics that provide such a high transfer rate are not commercially available. Furthermore, the electron beam scan rate of the video imaging tube is not that high. Multiple video imaging tubes can be used to alleviate the scan rate problem. In the extreme case, the number of video imaging tubes can be equal to the number of elemental pictures. However, a camera of this type could be too bulky to be practical.

2.5 The Fourth Embodiment of the Camera

Figure 9:
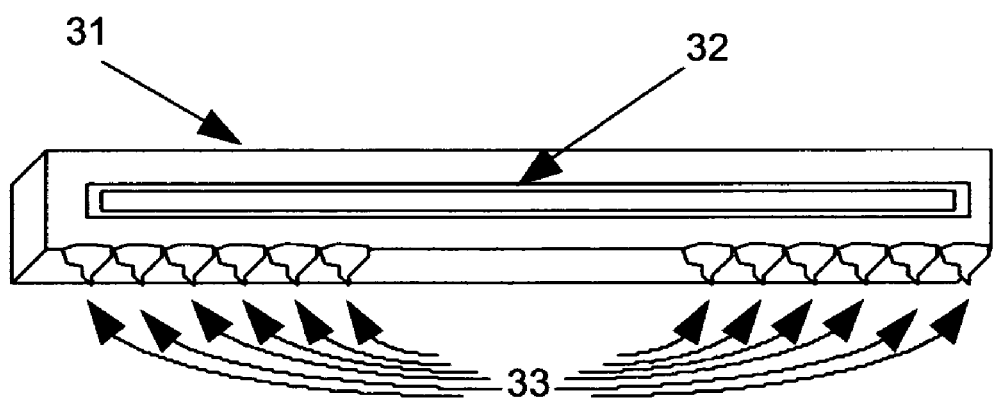
FIG. 9 is a schematic of a line scan image sensor.

A fourth solution to the problem exists that would employ high resolution line scan image sensors rather than area scan image sensors. A line scan image sensor captures image data by scanning a single line while an area scan image sensor scans an entire image surface one line at a time. Line scan image sensors are generally used for document scanning and optical character recognition while area scan image sensors are commonly used for video applications. FIG. 9 shows a schematic of a line scan image sensor. The active element of a line scan image sensor 31 is a small rectangular area 32. Within that rectangular area are sensitized pixels that are able to capture image data. Electrode pins 33 plug the image sensor into the electronics of the device (e.g., a photocopy or a facsimile machine) where scanning is to occur. Most line scan image sensors have relatively low resolution. However, high resolution line scan image sensors are commercially available. For example, one such sensor presents a linear array of 4,096 pixels that are 10 µm×10 µm, thereby presenting an aperture that is 41 mm×10 µm with a 100% fill factor. Each pixel uses 12-bits of data. The maximum line/frame rate is 12.0 kHz, and the data rate is 2×25 Mhz. The sensor packaging is 32-pin DIP. The operating temperature is ambient to 60° C. max. Although monochrome, it is a panchromatic sensor able to pick up light adequately across the entire visible spectrum from 400 nm to 1,000 nm with peak response in the 7,000–7,500 nm red region.

Figure 10:
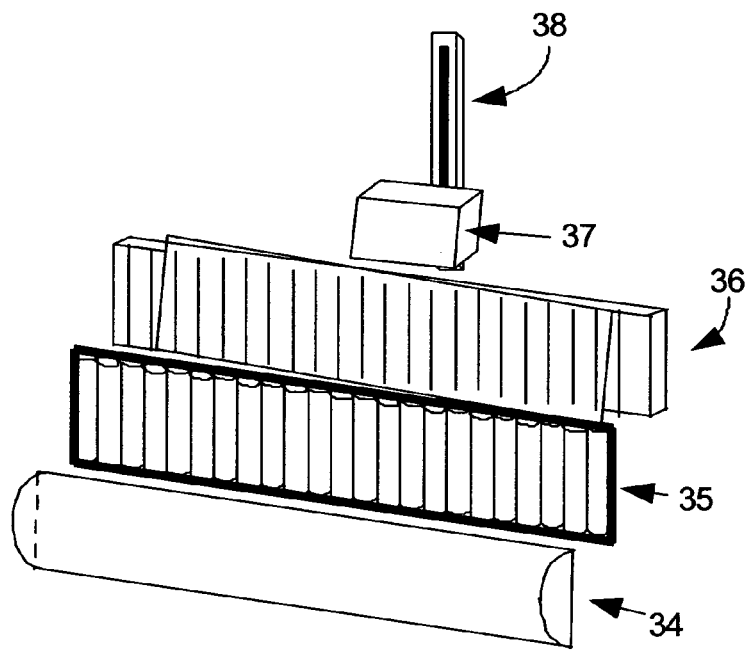
FIG. 10 is a schematic of a single state of the fourth embodiment of a multistage line scan camera.
Figure 11:
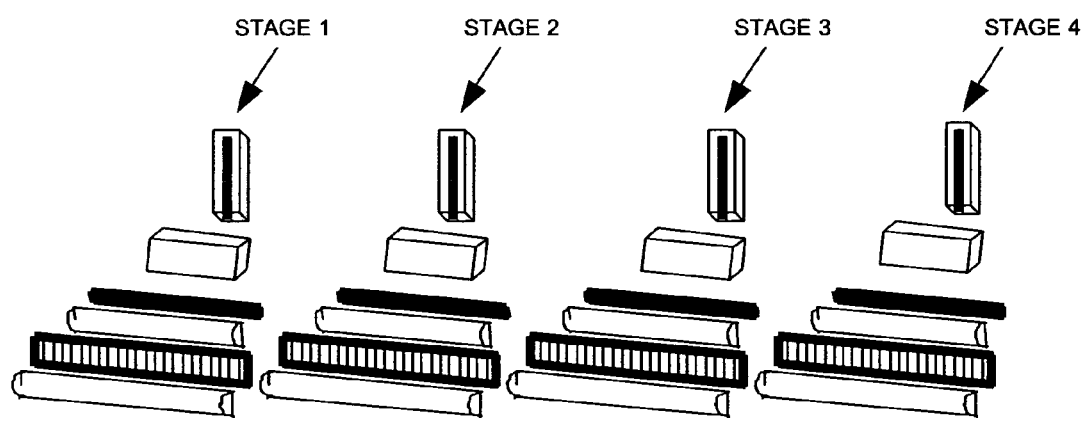
FIG. 11 is a schematic of the fourth embodiment of the multistage line scan camera.

Clearly a camera that employs this type of sensor would be similar to a photocopy machine, but it would employ the active optics and color filter heretofore described as well as a mechanical, optical, and/or electronic scanning device that would permit area scanning of the elemental pictures. This represents the fourth embodiment of the camera, which is shown in FIG. 10. The active optics consist of horizontal cylindrical lens 34 (to compress the image in the vertical direction), matrix lens array 35 (to create the elemental pictures), and color filter 36 (to create monochrome color information for the elemental pictures). An electrical, mechanical, and/or optical device 37 is used to redirect a portion of the elemental pictures and to focus them onto the active image area of the line scan image sensor 38 which in turn converts the image data into electrical signals. Obviously, a single line scan image sensor cannot be used to scan all of the elemental pictures because a single sensor cannot handle all of the data required with sufficient throughput to facilitate a scan rate of 25 fps. Each sensor can only handle a small number of elemental pictures. Therefore, a large number of sensors must be used. However, they are readily available commercially, and they are far less expensive than their area scan counterparts. Theoretically, a camera may be constructed wherein there are as many sensors as there are elemental pictures. The disadvantage of such a camera lies in construction of the scanning device 37 of FIG. 10. Such a device would be physically larger than the image sensor, and if moving parts are employed, it might tend to destabilize the camera where jitter cannot be tolerated. In a multistage camera, were such a device to possess moving parts, there would be many such devices, and the motion could create problems. However, both non-mechanical devices and mechanical devices that will position and scan the image onto the active surface of the sensor are currently state-of-the-art, and need not be described herein. Furthermore, techniques exist that could stabilize the camera (e.g, the use of a gyroscope). FIG. 11 shows a four-stage multi stage camera.

2.6 The Fifth Embodiment of the Camera

As an alternative fifth embodiment, the scanning device 37 of FIG. 10 may be eliminated entirely. In that event, the sensor 38 must be moved to accept the entire image. The advantage of doing this would be the elimination of optics that can potentially distort the image. The disadvantage of this alternative is that a 25–50 cps vibration would be set up that could destabilize the camera. However, once again, techniques exist that could stabilize the camera.

2.7 General Discussion Pertaining to the First Five Camera Embodiments

The camera used in this process, whether film or video, is very large relative to current motion picture camera equipment. The size of the camera horizontally is dictated by the size requirements of the matrix lens array. The width of the array is between 1½ and 2 meters, and its height is one-half of the width. The camera housing must encompass the external optics (i.e., the horizontal cylindrical lens(es), the matrix lens array(s), and the color filter(s) and must internally contain the video imaging devices along with the associated optical, mechanical, and electrical paraphernalia. Obviously, the camera is very heavy and must be supported and moved mechanically. However, support and movement of a camera by a dolly is state-of-the-art in the motion picture industry.

Figure 12B:
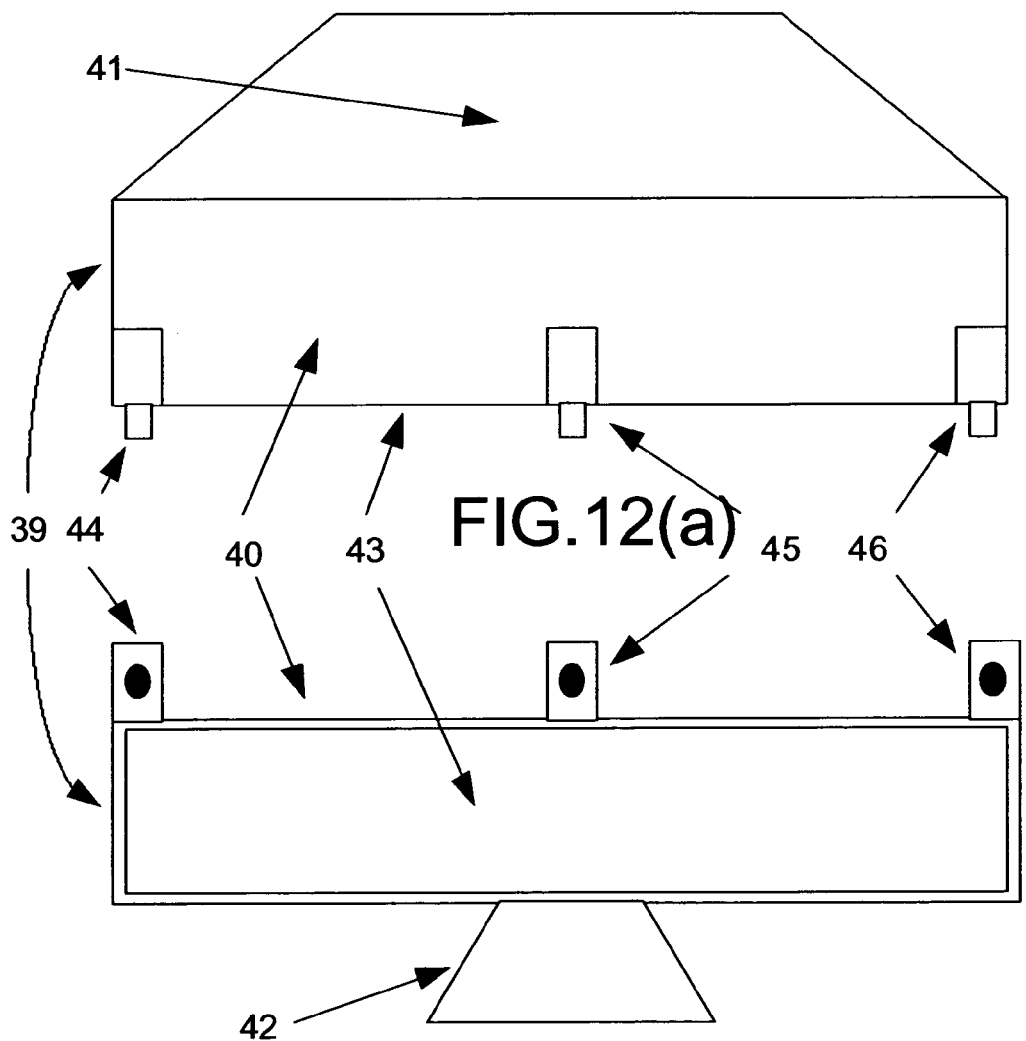
FIG. 12 is a schematic showing how fifth embodiment of the camera would appear externally.

Now, for all of the embodiments discussed thus far, it would be desirable for multiple external conventional color video cameras to be mounted on the three-dimensional motion picture camera, preferably on top of or on the bottom of the external optics. These conventional video cameras are to be combined for use as a view finder. For this purpose, at least one such camera must be used. However, to produce a three-dimensional view finder, there must be a minimum of two such video cameras, but more than two may be used. FIG. 12 is a schematic showing three such conventional cameras mounted on top of the external optics. One camera is mounted on the left end of the external optics, a second camera is mounted on the right end, and the third camera is mounted at the dead center. The central camera can be used as a viewfinder if desired with supplemental information being supplied by the other cameras. However, all three cameras will be later used to calculate the distance of every object in the scene from the external optics of the three-dimensional camera. FIG. 12 shows how the camera would look externally. FIG. 12 (*a*) is a top view, and FIG. 12 (*b*) is a front view. The camera housing 39 has a front portion 40 (shaped as a rectangular prism), a rear portion 41 (shaped as the lower frustum of a pyramid), and a base 42. The external optics 43 is mounted to the front portion 40. Three conventional color video cameras, 44, 45, and 46, are mounted to the top of the front portion 40.

2.8 The Sixth Embodiment of the Camera

The following discloses the sixth embodiment of the camera which is an exemplary embodiment and the embodiment that the inventor currently envisions as the best mode. The principle of magnification and projection demands that the photographed three-dimensional scene be ultimately converted into an integral photograph for later projection. As has been already discussed, for the purpose of minimizing the amount of information recorded, the exemplary configuration for said integral photograph has only horizontal parallax and the elemental pictures are monochromatic alternating sequentially between three primary colors. Since three-dimensional positioning of objects in a scene may be computed from any two elemental pictures, and monochrome color information can be computed from any single elemental picture, it is feasible to compute the information required for all of the elemental pictures in an integral photograph by using only two color video cameras having reasonable resolution. Ideally, to reduce the computation required, more than two video cameras, each one having its own associated microprocessor and its own data storage medium, should be used. These microprocessors and data storage media are arranged in a local area network. Ideally, a peer-to-peer configuration should be utilized, but use of a client server configuration is also feasible. Although it is theoretically possible to compute the information required to produce the desired integral photograph using only two color video cameras, use of so few cameras does not represent the ideal embodiment. Stereoscopic 3-D motion pictures are produced using only two cameras. However, for ideal reconstruction of a realistic three-dimensional image, the camera lenses must be positioned horizontally apart from each other at the interoccular distance. Positioning the two lenses further apart from each other produces a reconstructed three-dimensional stereoscopic image with exaggerated depth, while positioning them closer together produces a reconstructed image that appears somewhat flat. The system disclosed herein as well as in the 3-D PATENTS reconstructs a more realistic three-dimensional image by photographing a large number of pictures. In our example, the two most extreme opposing outermost elemental pictures are photographed with lenslets positioned between 1½ and 2 meters apart. All of the elemental pictures between the extremes contribute to the final reconstruction to provide three-dimensional realism. Therefore, cameras should be located at these extreme points. However, if only two cameras or a small number of cameras are used, much of the photographic information in any two adjacent cameras will not be redundant (i.e., some object points will not appear in photographs produced by both cameras). Since computation of the three-dimensional position of a point in a scene requires that point to be visible in two adjacent photographs, use of a small number of cameras will provide sufficient information to calculate only the distances of points photographed by both adjacent cameras. Such a computation cannot be performed for those points appearing in one picture and not in the other. To avoid this problem, a large number of cameras should be used. In this situation, there will be a high degree of redundancy in all of the cameras.

Figure 13:
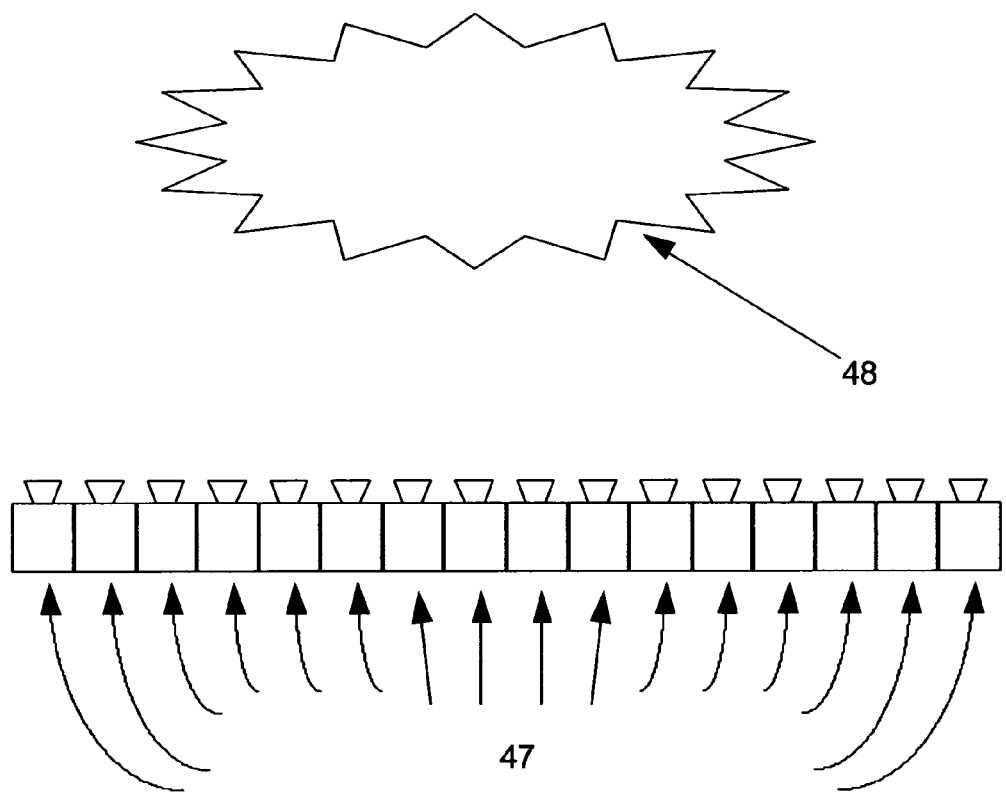
FIG. 13 is a schematic showing the sixth embodiment of the camera wherein multiple cameras each containing its own microprocessor are arranged linearly to photograph a three-dimensional scene.

Therefore, the sixth embodiment of the camera is shown in FIG. 13. In the figure, multiple color video cameras 47, each containing its own microprocessor and its own data storage medium, are arranged linearly, and each camera photographs the entire three-dimensional scene 48. The digital information obtained from each video camera is used to compute the information to be stored for several of the elemental pictures of the integral photograph. In the sixth camera embodiment the entire integral photograph is not stored on a single data storage medium. Instead a group of elemental pictures (those computed by the individual component video camera assembly) are stored together as frames on the data storage medium associated with the individual component video camera assembly responsible for computing those elemental pictures. Synchronizing information is stored with each frame so as to enable it to be appropriately associated with the frames computed and stored by the other camera assemblies in the network, such that all of the frames so computed can be integrated to form a single frame comprising the integral photograph. Ideally, enough cameras 47 should be configured linearly to span a linear distance of approximately 1.8 meters. The cameras should be attached to each other so that the all function as a single unit. The associated electronics control all of the cameras together as though they were a single camera.

In the sixth embodiment of the camera, it is simple to calculate the number of elemental pictures that must be handled by each individual component video camera assembly. To do this calculation, merely divide the total number of elemental pictures by the total number of individual video camera assemblies that comprise the composite camera. It is also relatively simple to calculate the position of any point in the three-dimensional scene based upon its focused positions by the multiple lenses on the multiple image planes. This will be discussed later herein.

Once the two dimensional position of any point on two image adjacent planes are known, the three-dimensional position relative to the camera lens can be calculated. Therefore, in a multiple camera environment, it is possible to compute the distance of every point in the three-dimensional scene using information from only two cameras. Accordingly, in the sixth camera embodiment, it is not necessary to photograph every elemental picture in the integral photograph. Using this computational method, and with the aid of a computer, it is feasible to synthesize every elemental picture in the integral photograph. These elemental pictures can then be converted to alternating monochromatic red, green, and blue images. Of course, the elemental pictures remain in digital form on an appropriate storage medium. They only become visible again upon projection. Therefore, in the sixth camera embodiment, the entire integral photographic frame is created from synthetic elemental pictures that are the same as though they had been actually photographed. Furthermore, using this embodiment, resolution is no longer a problem since the synthesized elemental pictures could have the same resolution as the photographs taken by the individual conventional video cameras.

3.0 The Projector

Now, we turn to the projector hardware. The projector is configured in component stages as is the camera. Ideally, the projector has the same number of stages as the camera. Each component projector stage has a corresponding component camera stage. Therefore, each component projector stage deals only with the video data captured and stored by its respective camera stage. The projector hardware can exist in one of two embodiments.

3.1 The First Embodiment of the Projector

The first embodiment is extremely practical. In this embodiment, each component projector stage is comprised of the following components:
  laser beam generators capable of producing three laser beams—one having a red color, one having a green color, and one having a blue color;
  a scanning assembly for each of the aforementioned laser beams that will allow the laser beams to be directed to different positions on the screen;
  a means for varying the intensity of each of the three laser beams by digital computer control;
  a digital computer controlled by a microprocessor;
  sufficient random access memory (RAM);
  permanent disk storage;
  space for variable data storage;
  means to communicate with the other component projector stages as part of a local area network, preferably peer-to-peer (but a client/server configuration would be acceptable).

It will be shown that, when the sixth camera embodiment is used to create the integral photographic frames, each stage of the projector would need to transfer 8.1 MBytes per frame at 29.97 fps or approximately 243 Mbytes per second to the appropriate laser beams. So each laser beam would be modulated at the rate of 664 megabits per second. This is feasible with computer technology today. This is the maximum required data transfer rate when using the sixth camera embodiment. When using other camera embodiments, different data transfer rates may apply.

Figure 14:
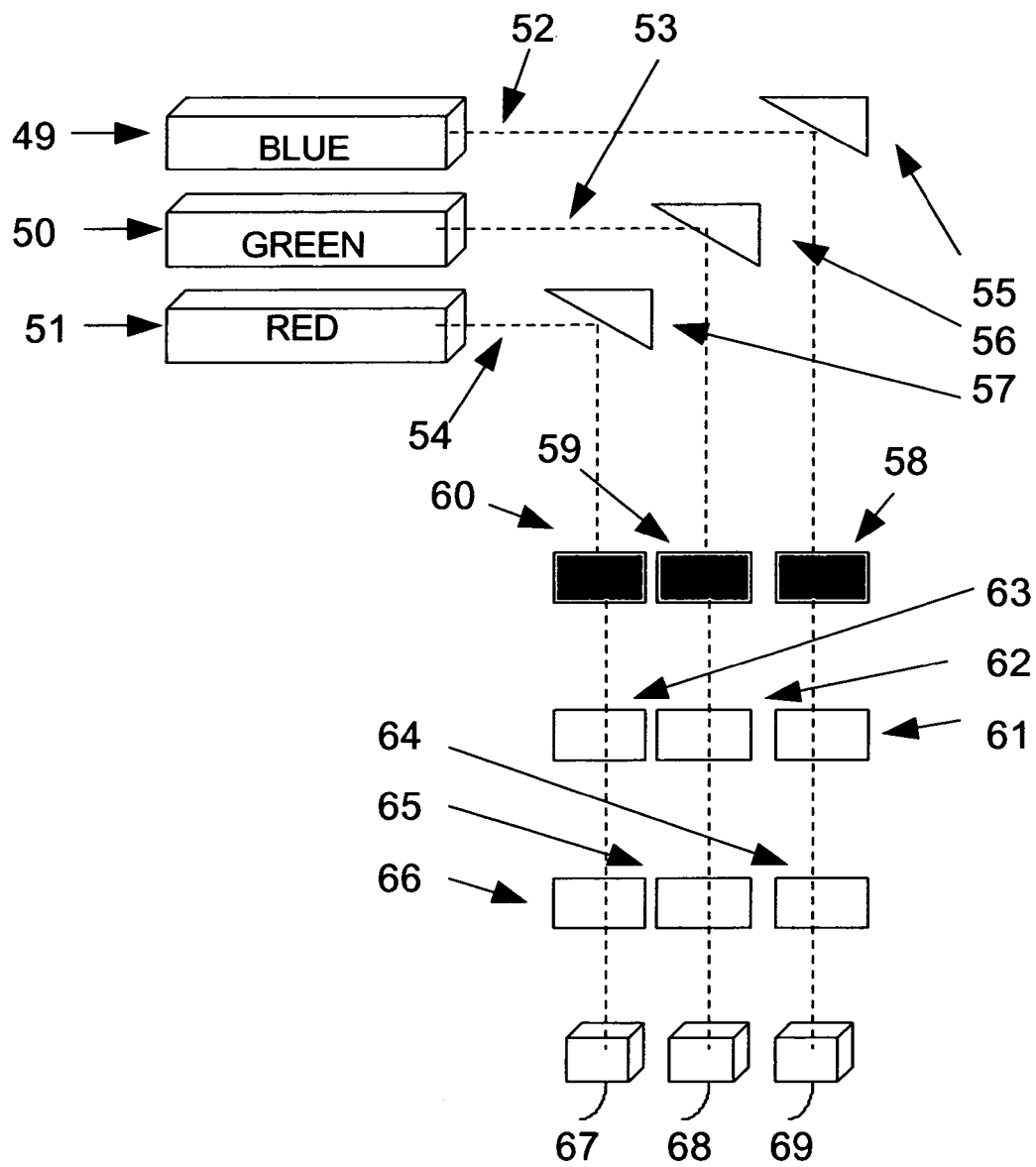
FIG. 14 is a schematic showing how three laser beams are controlled in a single component stage of the first embodiment of the projector.
Figure 15:
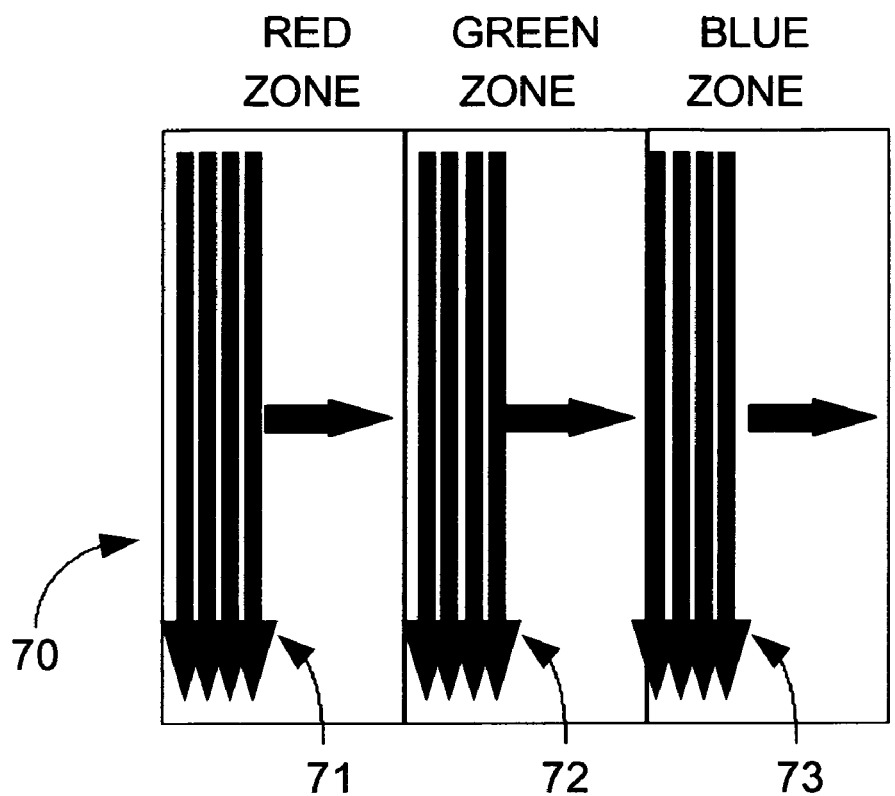
FIG. 15 is a schematic showing how three vertically scanned laser beams from the first embodiment of the projector impinge upon their respective multi-colored zones on the screen.

FIG. 14 is a schematic of the laser controller for one triad of a component stage of the projector. Three laser generators 49, 50, and 51 respectively produce red, green, and blue laser beams 52, 53, and 54. In the figure, the aforementioned laser beams 52, 53, and 54 are re-directed using mirrors 55, 56, and 57, respectively, into neutral density filters 58, 59, and 60 where they are adjusted for intensity. The After passing through the neutral density filters, the three laser beams 52, 53, and 54 pass through RGB shutters 61, 62, and 63, respectively. The neutral density filters and RGB shutters together compensate for drifts in beam strength. From there, the three laser beams 52, 53, and 54 pass either through acousto-optical modulators or electro-optical modulators 64, 65, and 66, respectively. The modulators are controlled by computer software that provides time variant electric potentials, thereby precisely varying the intensities of laser beams 52, 53, and 54. After passing through the modulators, laser beams 52, 53, and 54 pass through the scanning mechanisms 67, 68, and 69, respectively. The scanning mechanisms cause the laser beams to impinge precisely on specific points of the theater screen. FIG. 15 shows how the three red, green, and blue laser beams impinge within their respective zones on a portion of the screen 70. As the red laser beam passes through its scanning mechanism, successive vertical scan lines 71 are produced on the red zone of screen 70. In the figure, these scan lines propagate from top to bottom and from left to right. However, the directions can be reversed if desired. Similarly, as the green laser beam passes through its scanning mechanism, successive vertical scan lines 72 are produced on the green zone of screen 70. Also, as the blue laser beam passes through its scanning mechanism, successive vertical scan lines 73 are produced on the blue zone of screen 70. In this way, a picture is painted on the screen using vertical scan lines.

Figure 16:
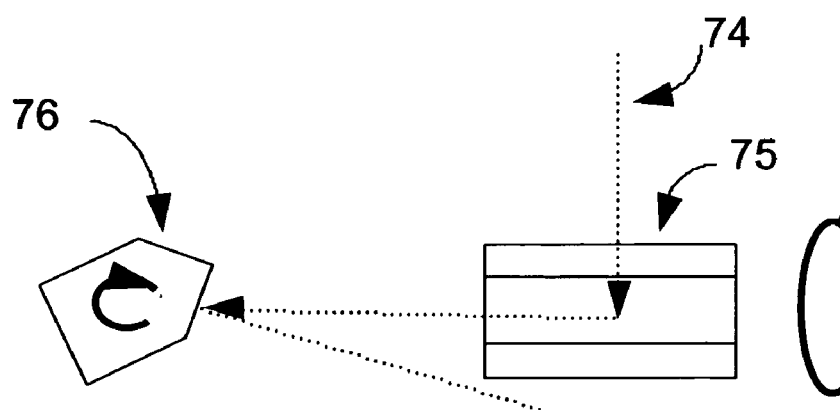
FIG. 16 is a schematic of a scanning mechanism for a single laser beam of the first embodiment of the projector.

FIG. 16 is a schematic of a possible laser scanning mechanism for a single laser beam. The scanning mechanism consists of two rotating prisms. In the figure, two penta-prisms are shown. However, the prisms can have any polygonal shape. Laser beam 74 enters the scanning mechanism and impinges upon rotating prism 75 which redirects the laser beam toward rotating prism 76 which, in turn directs the laser beam toward the screen. Prisms 75 and 76 rotate in planes perpendicular to one another and at different speeds. One prism is used for vertical scanning while the other is used for horizontal scanning. The prism used for vertical scanning moves considerably faster than the prism used for horizontal scanning.

Figure 17:
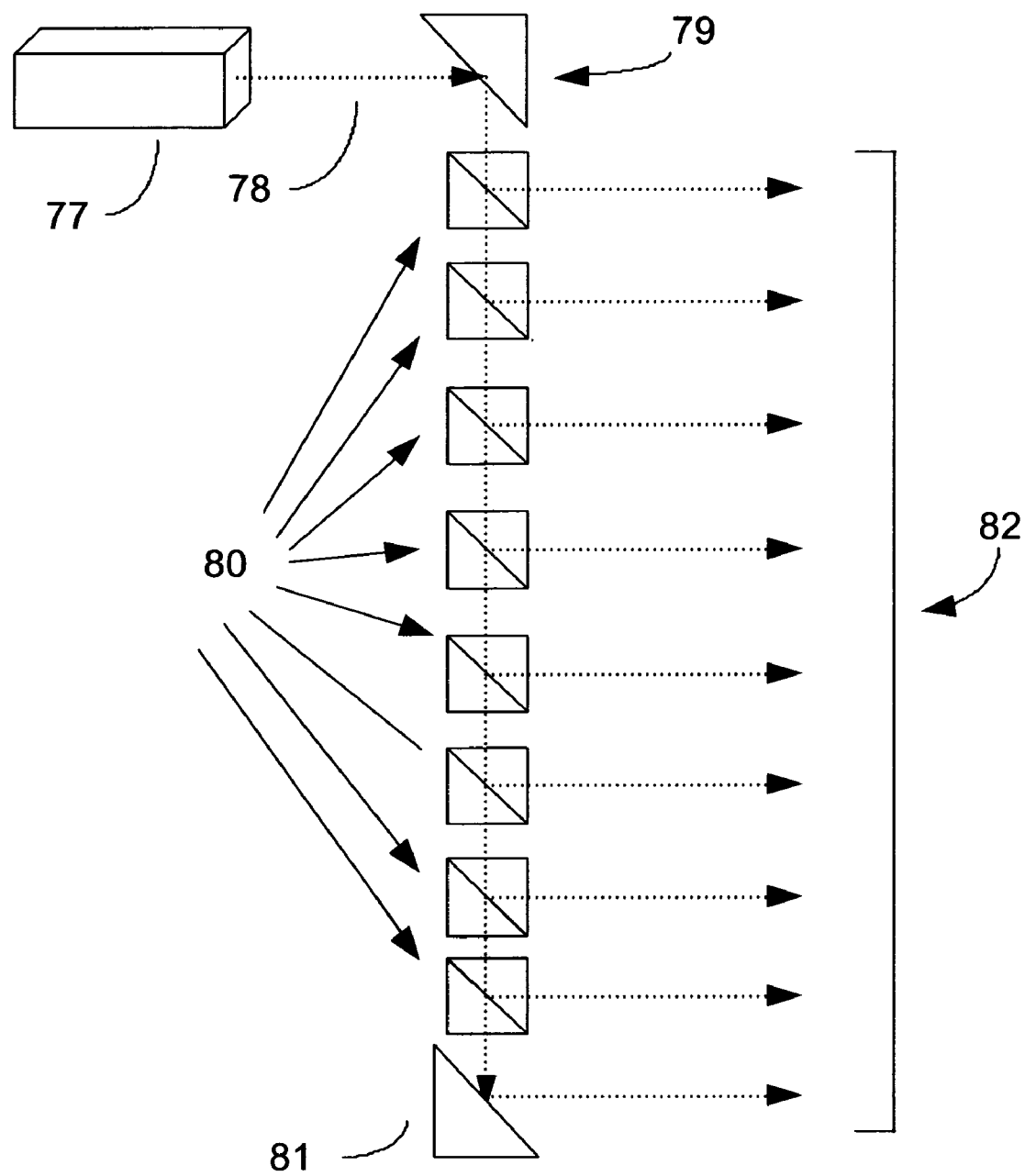
FIG. 17 is a schematic showing how a single laser beam can be split into a multiple of nine laser beams.

FIG. 14 shows a single triad of laser beams. 52 is the blue laser beam, 53 is the green laser beam, and 54 is the red laser beam. It could be advantageous for there to be nine such triads of alternating red, green, and blue laser beams forming a total of twenty-seven laser beams per component stage of the projector. Of course, the number twenty-seven is variable, but it is highly desirable for the total number to be divisible by three. Therefore, each laser beam should be split into nine laser beams for our example. FIG. 17 shows how this should be accomplished. Laser beam generator 77 creates laser beam 78 which is then redirected in a perpendicular direction by mirror 79. The redirected laser beam 78 then passes through eight dichroic mirror beam splitters 80 finally impinging upon mirror 81. The beam splitters 80 and the mirror 81 redirect output laser beams 82 in a perpendicular direction so that all of the laser beams 82 emerge parallel to the initial laser beam 78. Unfortunately, the output laser beams 82 that are closest to the laser beam generator 77 will have a higher intensity than those which are farther away. That is another reason to pass all of the output laser beams through neutral density filters so as to attenuate them and to make the intensities of all of the output laser beams equal.

Figure 18A:
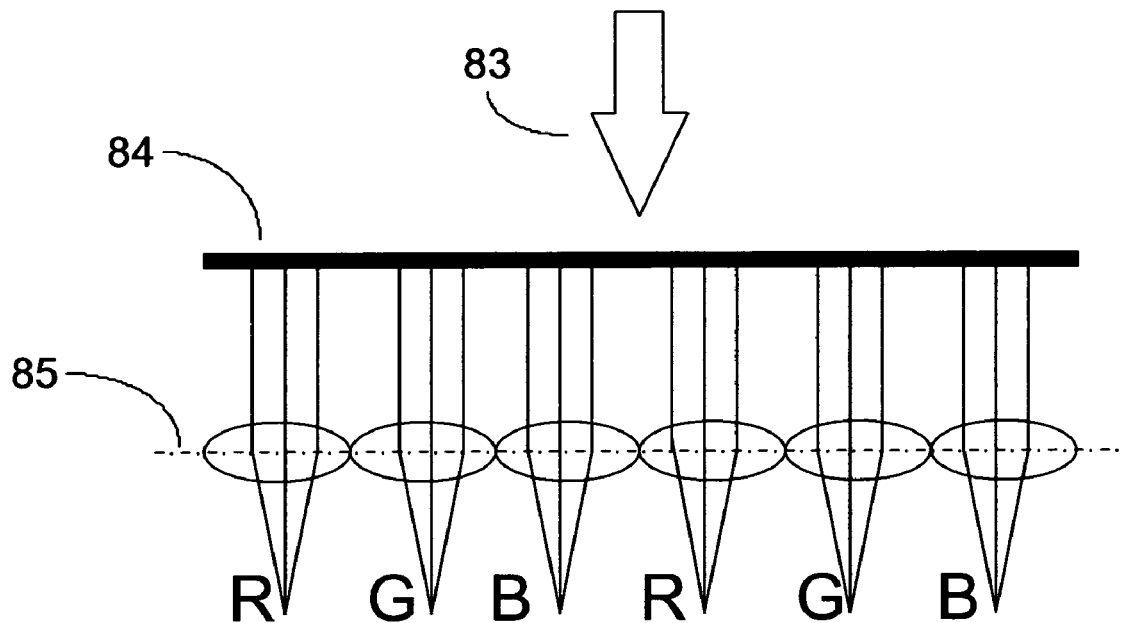
FIG. 18(a) represents the case of rear projection onto a physical two-dimensional screen to be reconstructed via a cylindrical matrix lens array.
Figure 18B:
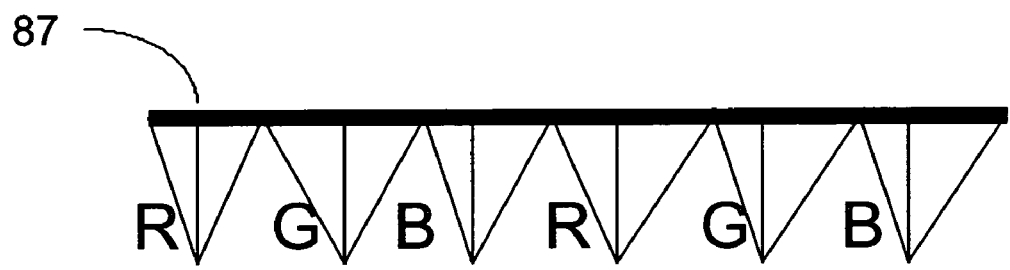
FIG. 18(b) represents the case of front projection onto a holographic screen.
Figure 18B:
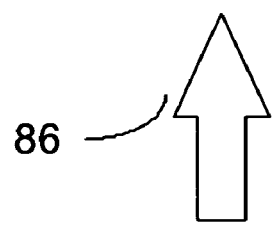

Finally, all of the component stages together paint the integral photograph consisting of the elemental pictures on the screen where it reconstructs a three dimensional image. FIG. 18 shows the results of the laser beam projection on a portion of the theater screen. FIG. 18(a) shows the case of rear projection using a matrix lens array, while FIG. 18(b) shows the case of front projection onto a Bragg Angle holographic screen. The schematics of FIGS. 18(a) and (b) are both top views. In FIG. 18(a), scanned red, green, and blue laser beams 83 impinge upon rear projection screen 84 so as to produce a discernible integral photograph. The lenslets of the matrix lens array 85 are vertical cylindrical lenslets, and in their most elemental form produce focused lines of light in front of the matrix lens array. However, when an integral photograph is produced on screen 84, the combination of screen 84 and lens array 85 is capable of reconstructing a three dimensional image.

In FIG. 18(b), scanned red, green, and blue laser beams 86 impinge directly on the holographic screen 87 to paint an integral photograph. The holographic screen consists of vertical elements that redirect the laser beams that impinge upon it into vertical focused lines of light. Because the screen is a Bragg Angle reflection hologram divided into color zones, each zone uses only the wavelength laser beam designated for that zone. Therefore, a red zone can only reconstruct an image produced by a red laser beam, a green zone can only reconstruct an image produced by a green laser beam, and a blue zone can only reconstruct an image produced by a blue laser beam. Alignment of the laser beams is critical. However, the holographic screen was created to take the impinging light and to reconstruct alternating red, blue, and green focused vertical lines of light. However, once the integral photograph is painted on the screen, it is capable of reconstructing a three-dimensional image.

3.2 The Second Embodiment of the Projector

In the second embodiment, each component projector stage is comprised of the following components:
  a matrix of high resolution television monitors that can be of the type of either black-and-white or color;
  a color filter that is required if the monitors use black-and-white and that is not used if the monitors use color,
  a means for optically redistributing the images from the television monitors into a straight line;
  a linear array of projection lens units, one lens unit to be used for each monitor;
  a digital computer controlled by a microprocessor;
  sufficient random access memory (RAM);
  permanent disk storage;
  space for variable data storage;
  means to communicate with the other component projector stages as part of a local area network, preferably peer-to-peer (but a client/server configuration would be acceptable).

Figure 19:
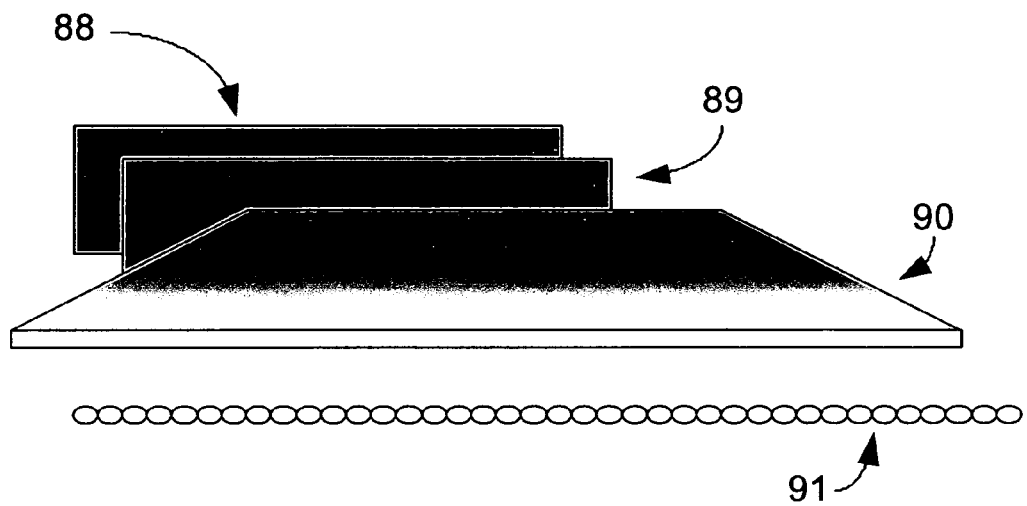
FIG. 19 is a schematic of the optical configuration of the second embodiment of the projector.

FIG. 19 shows a schematic of the optical configuration of this second embodiment. Light from the video monitors in matrix array 88 passes through color filter array 89, and then passes through the optical redistribution unit 90, and finally passes through the projector lens array 91 whereupon it is projected onto the screen. If the video monitor matrix array is linear rather than rectangular, then the optical redistribution unit 90 is not used. If the video monitors in matrix array 88 are color monitors, then the color filter array 89 is not used.

Figure 20:
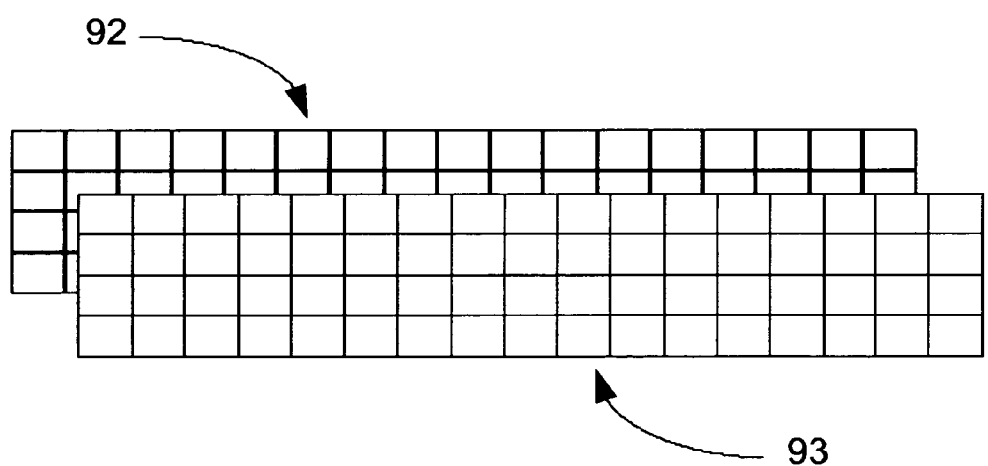
FIG. 20 is a schematic of the matrix array of video monitors and the color filter array of the second embodiment of the projector.

FIG. 20 shows a schematic of the matrix array of video monitors 92 and the color filter array 93. Each square in array 92 represents a video monitor. Each square in array 93 represents a color filter. For each square in array 92, there is a corresponding square in array 93.

Figure 21A:
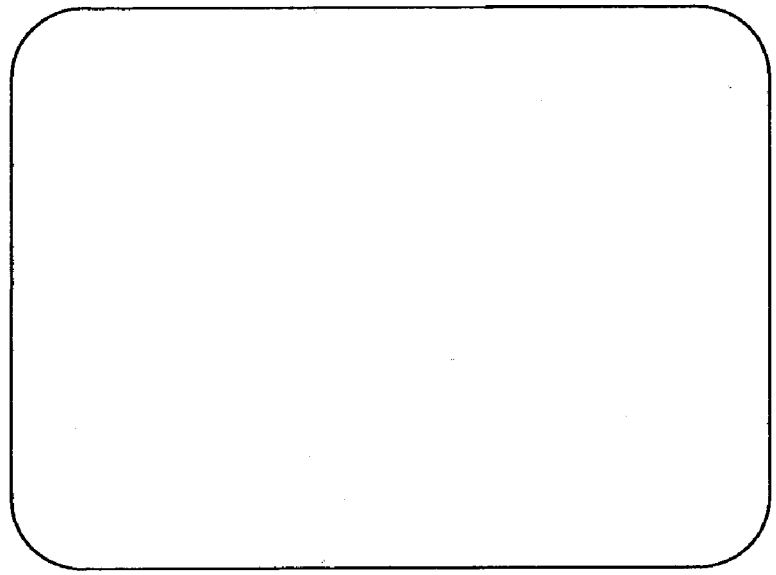
FIG. 21(a) shows a single video monitor that displays a multiplicity of elemental pictures arranged horizontally.
Figure 21B:
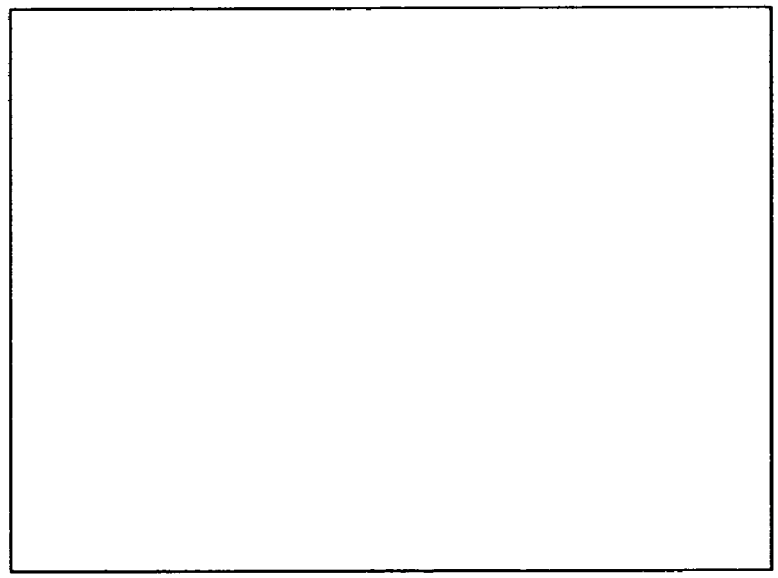
FIG. 21(b) shows a single color filter corresponding to that monitor.

FIG. 21 shows the appearance of a single monitor from array 92 of FIG. 20 and a single color filter from array 93 of FIG. 20. FIG. 21(a) shows a single video monitor that displays a multiplicity of elemental pictures arranged horizontally. FIG. 21(b) shows a single color filter corresponding to that monitor. The color filter of FIG. 21(b) consists of a series of vertical strips. Each vertical strip in the color filter of 21(b) corresponds to an elemental picture in FIG. 21(a). The vertical strips in FIG. 21(b) are each color filters alternating in color. In the embodiment shown they alternate from red to green to blue, and this pattern is repeated across the filter.

Figure 22A:
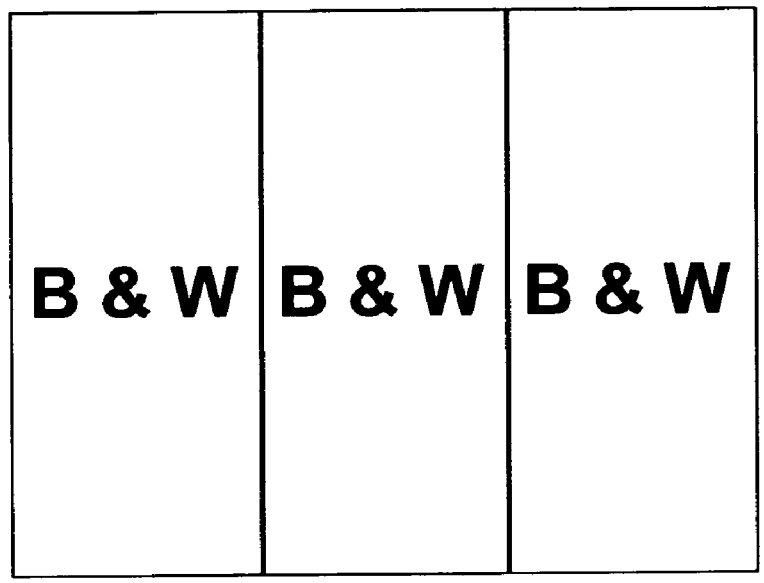
FIG. 22(a) shows the appearance of a triad of elemental pictures produced by a single monitor in the array.
Figure 22B:
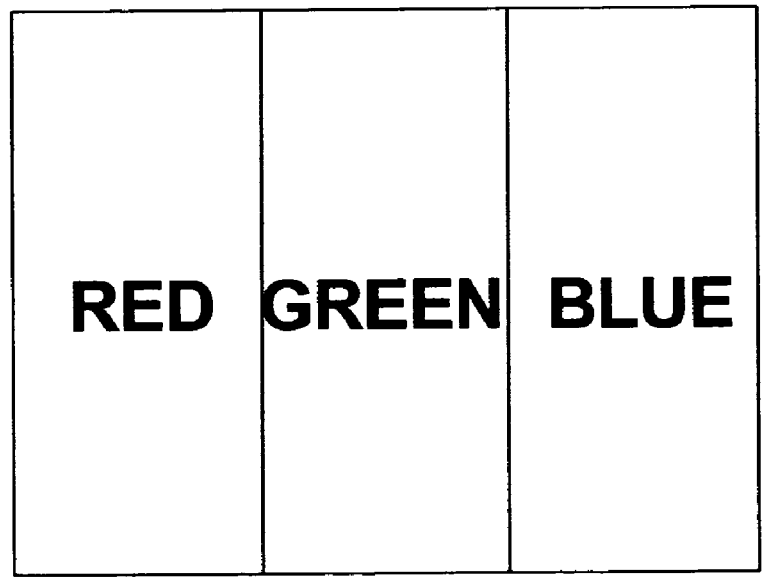
FIG. 22(b) shows the appearance of a triad of vertical color strips within a single color filter in the array.

FIG. 22(a) shows the appearance of a triad of elemental pictures produced by a single monitor in array 92 of FIG. 20. FIG. 22(b) shows the appearance of a triad of vertical color strips within a single color filter in array 93 of FIG. 20. The triad of color strips in shown in FIG. 22(b) corresponds respectively to the elemental pictures shown in FIG. 22(a). The combination of elemental pictures from FIG. 22(a) and color strips from FIG. 22(b) are meant to produce a triad of elemental pictures that appear red, green, and blue, respectively. Clearly, if the elemental pictures in FIG. 22(a) are not black-and-white, but rather are monochromatic red, green, and blue, respectively, the color filter of FIG. 22(b) is not required.

Figure 23:
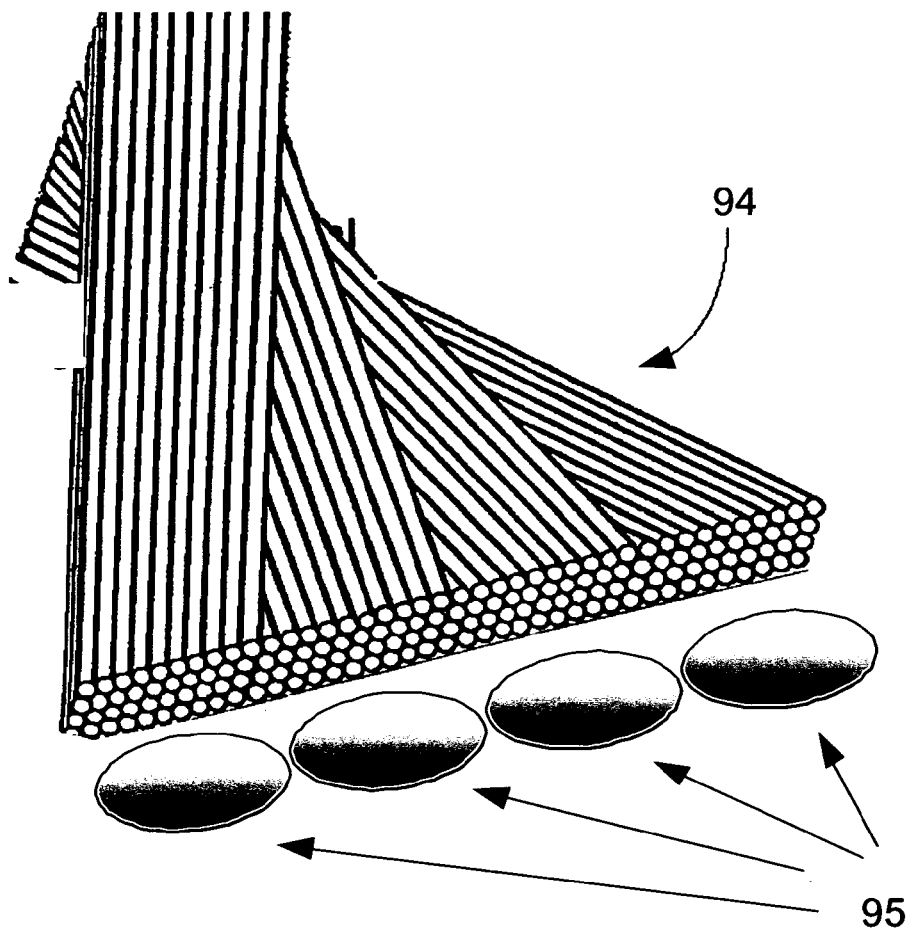
FIG. 23 is a schematic of a section of the part of the projection system in the second embodiment of the projector that provides one method of rearranging the pictures from the video monitors into a linear array and projecting the rearranged pictures onto the screen.

FIG. 23 is a schematic of a portion of the means, 94, for optically redistributing the images from the television monitors into a straight line as well as a portion of the linear array of projection lens units. In the figure, the means, 94, for optically redistributing the images from the television monitors into a straight line is a fiber optics bundle of the type shown in FIG. 8, and it is shown as capable of redistributing the images from four monitors. Appropriately, four projection lenses, 95, are shown, each 11 lens corresponding to a picture emanating from one monitor.

Currently, the best resolution available from color video monitors is that available from HDTV. However, experimental color television systems exist with much higher resolution. High resolution black and white monitors are available.

3.3 General Discussion Pertaining to Both Projector Embodiments

For either of the two embodiments described herein, it will be shown that a highly desirable configuration of the projector would consist of 67 component stages, each stage being capable of producing twenty-seven alternating red, green, and blue monochromatic elemental pictures on the screen, making a total of 1809 elemental pictures that form an integral photograph. This integral photograph in combination with the screen can reconstruct a three-dimensional image of the scene using the principle of magnification and projection disclosed earlier in this application as well as in the 3-D PATENTS.

Computer mother boards are commercially available as circuit cards having dimensions of 4.7 inches high (11.9 cm) by 0.58 inches wide (1.5 cm) and 14.7 inches deep (37.3 cm); installed cards 0.7 inches deep (1.2 cm) center to center. Associated with each circuit board is all of the computer electronics, memory, networking, disk controller, console port, and two 2.5 inch ATA/66 disk drives capable of 30 Gbytes capacities. This shows how small computers can be made.

Sixty-seven computers would be included with the projector. They will all be in the form of circuit cards. The electronics of the projector will be rack mounted, while the lasers, optics and mechanical components will be externally mounted. The projector will be large, but will contain few moving parts. Image stabilization will not be required. Motion pictures will be supplied in removable cartridges.

4.0 Direct Transmission without Projection

The following discloses an embodiment for the display of the magnified three-dimensional images that does not utilize a projector. It is an exemplary embodiment that the inventor currently envisions as the best mode for display. In this embodiment, the screen is comprised of the following components:

a matrix of two-dimensional video display devices;
   electronics associated with each of said video display devices; and,
   optics to create light wavefronts associated for the desired three-dimensional images from the two-dimensional images produced by said display devices and to project these wavefronts in such a manner as to be seen by the audience.

This screen resembles a conventional video wall currently used in many displays to produce large sized video images. The primary difference is the optics associated with the video wall that produce the three-dimensional display. The video wall is used to create the composite magnified integral photograph used as input to the associated optics to produce the output three-dimensional wavefronts according to the principle of magnification disclosed in the 3-D PATENTS.

The display devices of the screen may be, inter alia, active video display devices or composite devices comprised of active video display devices and projection optics. While the latter may use rear projection to produce the composite two-dimensional image, it is the equivalent of using active display devices in that the composite magnified integral photograph is not projected onto the screen in the conventional sense (e.g., as a single image from a projection booth). Rather, no matter what video display devices are used to create the video wall matrix, the composite magnified integral photograph is created by segmentation of this integral photograph such that each display device shows only a portion of the entire two-dimensional display. The active display devices used for the screen may be, inter alia, cathode ray tubes (CRT), liquid crystal displays (LCD), plasma flat panel displays, plasma controlled LCD displays, field emission displays, electroluminescent panels, light emitting polymer displays, active holographic displays, light emitting diode displays, or even a matrix of light bulbs. The display device may be compatible with NTSC, HDTV, PAL, SECAM, etc. This embodiment is independent of the type of display used so long as each component display device is capable of ultimately transforming an electronic signal representing a digital video image to a two-dimensional video display.

It is envisioned that a desired configuration of the screen would be where transparent optics are bonded to the surfaces of the individual display devices. The combination of display device, electronics, and optics would form an individual component of the screen matrix. An example of such a component would be an LCD flat panel display with a lenticular lens sheet, or Bonnet Screen, bonded to its front surface. This type of device would produce a display that would be relatively immune to image distortion due to dimensional changes of its individual component parts, said dimensional changes being caused by temperature differences, vibration, etc.

Conventional video walls use too few individual display components to produce an adequate three-dimensional display. For example, a twenty-four foot wide display might use sixty components—ten for width and six for height. A typical component would be a 35-inch diagonal NTSC video display that is approximately 29 inches wide by 22 inches high. Each would have the capacity of displaying 168,000 pixels (i.e., 525 horizontal×320 vertical). The video wall would therefore be capable of displaying approximately ten mega-pixels (i.e., 5,250 horizontal×1,920 vertical). In common use, the video image display resolution is often degraded to what would be observed on a single TV display tube. However, even were the full ten mega-pixel resolution to be fully utilized, even though such a video wall would produce a reasonably high quality two-dimensional image, it would not be able to create adequate three-dimensional displays using the magnification principle.

Using the sixth camera embodiment, it was determined that the camera could be comprised of approximately seventy adjacent video cameras situated horizontally, and that such a configuration would produce three-dimensional images with adequate resolution. In this case, each video display would be responsible for displaying twenty-seven elemental pictures, said elemental pictures being synthesized from interpolated data from two-dimensional video images created by two adjacent cameras. This would yield 1,890 elemental pictures in the horizontal direction. Therefore, a video wall display that would produce adequate images could have a matrix of seventy display devices arranged horizontally by an appropriate number of display devices arranged vertically so as to produce the desired screen width to height aspect ratio. It has already been disclosed that, since vertical parallax is absent, vertical resolution requirements may be relaxed. Therefore, the image from each of the video camera components can be converted to a column of video images anamorphically expanded in the vertical direction to create a single vertical image using conventional video wall display technology. Such expansion is only in the vertical direction because horizontal resolution may not be sacrificed.

Unfortunately, the appearance of a video wall comprised of a matrix of display devices shows boundary lines that separate the component display devices. There are two reasons for this:

There is a physical boundary between the component displays that has a finite observable dimension. This boundary is not a part of the active display. It is "dead space."
   The central portion of a video display is normally brighter than the edges of the display. Observation of a composite image created from several video displays will reveal alternating bright and dim regions across the display.

Therefore, even if no "dead space" exists between the displays, a boundary line is observed between the displays because the edges of each display is so much dimmer than its central portion.

Clearly, the solution to the boundary line problem involves two components—reducing or eliminating "dead space" between the video displays and adjusting the pixel intensities to produce a uniformly bright image across each video display. The former may be accomplished using physical construction techniques. The latter may be accomplished using software techniques. The physical boundaries between the display devices should be as small as possible. They should be neutral colored or possibly transparent. If these boundaries have dimensions smaller than what could be seen by the audience at minimum visual acuity, the audience should not perceive them. Combining this with adjusting the edge brightness to be greater than the central brightness would solve the boundary line problem.

Another solution is to use the screen disclosed in my pending application Ser. No. 10/904,745 (entitled MODULAR INTEGRAL MAGNIFIER). That patent application discloses a unitary device that is used as a magnifier of three-dimensional images. All of the components of the device are maintained in fixed alignment, so that there is no positional instability. The problem of image jitter and misalignment is taken care by the construction of the device. One embodiment of this modular device is shown in FIG. 35. FIG. 35 (a) is a rear elevational view, while FIG. 35 (b) is a side elevational view. An integral photograph (not shown) is accepted by rear face 162 and is uniformly enlarged and transmitted through the body of the device (a transmigrator) 161 as an enlarged integral photograph (or integral frame) onto front face 163. The transmigrator contains all of the necessary enlargement/projection optics, and the integral frame associated with face 163 is always in fixed (logical) alignment with the one associated with face 162. Face 162 has an appropriate matrix lens array associated with it. Therefore, a viewer looking directly at face 163 will see a magnified three-dimensional image. The image is orthoscopic either since all of the optics required to convert from pseudoscopy to orthoscopy is contained within transmigrator 161 or the integral photograph is pre-processed so that such conversion is unnecessary. (For such pre-processing, please refer to my pending application Ser. No. 10/904,920, filed on Dec. 6, 2004, entitled METHOD OF FORMING A THREE-DIMENSIONAL ORTHOSCOPIC IMAGE FROM ITS PSEUDOSCOPIC IMAGE.) Where the integral photograph is pre-processed to reconstruct to reconstruct an orthoscopic image, the transmigrator optics can be as simple as a coherent fiber optics magnifying face plate.

Although face 162 could accept an integral photograph projected thereupon, this type of input would normally not be used. Were the projected integral photograph to be positionally unstable (even to a minor degree), movement of the magnified three dimensional image would be noticeable. However, were the integral photograph to be bonded to face 162, stability would be maintained, and the image would not move. FIG. 36 shows a video monitor 164, the face of which has been bonded to face 162 (not shown). The video monitor need not only be a CRT tube. It can be an LCD display, or a plasma display, or any other device that can display an integral photograph. The image of the integral photograph is transmitted through and enlarged by transmigrator 161 to impinge on face 163 which has a matrix lens array bonded to its surface.

Figure 37:
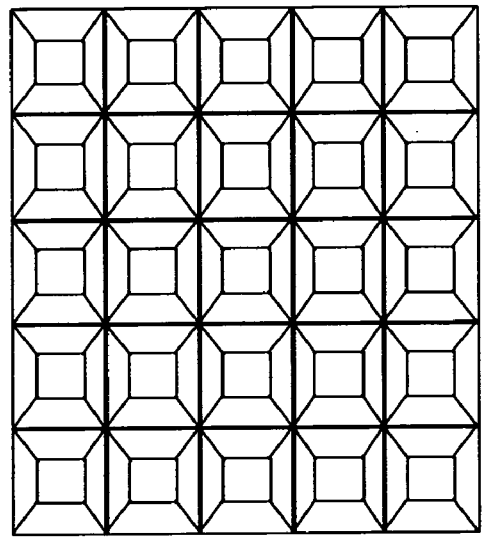
FIG. 37 is a drawing of a screen comprised of a plurality of Modular Integral Magnifiers.
Figure 37:
Figure 37:
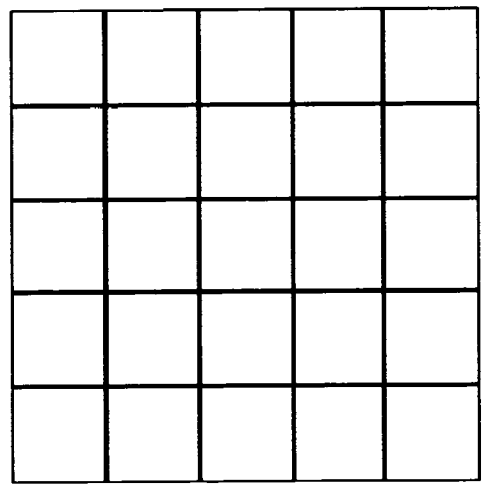
Figure 37:
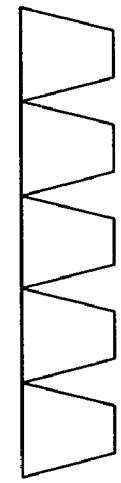

FIG. 37 shows various views of the modular screen described in application Ser. No. 10/904,745. FIG. 37 (a) shows a front elevational view; FIG. 37 (b) shows a side elevational view; FIG. 37 (c) shows a top plan view; and FIG. 37 (d) shows a rear elevational view. The screen of FIG. 37 comprises a plurality of Modular Integral Magnifiers arranged in a matrix. In the figure, twenty-five modules are shown. However, in a theater, a convenient arrangement of modules might be 70×35. Therefore, a screen could conveniently have approximately 2,500 modules. A 30 ft.× 15 ft. screen would then empty modules having a square front face whose sides are approximately 5¼-inches. One inch-square modules could conveniently be used in home entertainment systems.

Digital video monitors would be bonded to the rear faces of the modules, one monitor to each face. Clearly, the total integral photograph is logically broken apart and distributed among the video monitors as sub-integral photographs. Similarly, the total integral photograph is broken apart positionally with the rear faces of the modules each receiving a sub-integral photograph. Adjacent sub-integral photographs do not touch each other. However, the fragmented integral photograph is re-united at the front surface of the screen. The individual modules could have separate matrix lens arrays bonded to their front faces, but a better solution would be for the screen to have a single lens array covering a large number of modules.

In a theater projection booth, the projector would be replaced by a computer system. The computer system could be comprised of a large number of parallel computers networked together. The composite system could be made quite small and would be rack mounted. A motion picture would be distributed as a pack that would be inserted into the computer. Using the sixth camera embodiment, the pack could be comprised of approximately seventy DVD's. Other media such as tape or computer disk could be used. Each DVD would represent the video motion picture as was photographed using a component video camera of the composite camera of the sixth camera embodiment. Therefore, there would be a video frame on each DVD corresponding to a particular instant of time for display of the motion picture. The computer system would use video streaming technology to construct the composite video frames for transmission to the screen. First, the computer system would assemble all of the corresponding frames from the multiple DVD's to form a composite frame. Next, the elemental pictures of the integral photograph would be created by interpolation between the corresponding frames. These elemental pictures would be appropriately allocated to the various video display devices that comprise the screen. This process would create corresponding video frames for each of the display devices. Then the computer would transmit these corresponding video frames to the display devices. Finally, the computer would discard all of the information of the current frame and would repeat the process for the next frame. This process could be modified to include a storage buffer for several frames. Use of a storage buffer could ease the performance requirements. However, the net result is that the input to the computer is but a small fraction of the information necessary for display and that the output from the computer is all of the information necessary for display. Video frames are created on-the-fly, and they are discarded when they are no longer needed.

5.0 Storage of the Digital Data

Now, the discussion turns to the storage of the digital data. Clearly, computer hardware and software must be associated with the camera. The various embodiments of the camera could conceivably use a single microprocessor, but in the sixth embodiment of the camera, it is preferred (but not required) that each video imaging tube would have its own associated microprocessor functioning as a client in a peer-to-peer local area network. Alternatively, each microprocessor can function as a client in a local area network with a central server computer for the entire camera. In the fifth camera embodiment (a line scan camera), each line scan image sensor would preferably (but not necessarily) have its own associated client microprocessor for use in a peer-to-peer or client/server local area network. Once the data storage requirements are determined, the computer hardware and software requirements will also be determined.

In the example used in the fifth embodiment of the camera described herein above and shown in FIG. 12, each video imaging tube uses 4,194,304 twelve-bit pixels (2,048×2,048). A highly desirable configuration of this embodiment would use seventy video imaging tubes. This would require 3,523,215,360 bytes of storage per frame or approximately 3.36 GBytes. At 25 fps, an uncompressed two-hour motion picture would require approximately 604,800 Gbytes of storage capacity. The storage figure of 3.36 Gbytes per frame would approximately be true for any of the first five alternate embodiments disclosed herein thus far. This amount of storage is enormous, and a new method of data compression is needed to drastically reduce the data storage requirements.

In the sixth embodiment described herein above and shown in FIG. 13, the amount of uncompressed storage required would be twice as large (viz., 6.72 Gbytes per frame), except that this storage requirement would be distributed across the individual storage media associated with each individual video camera assembly. For example, if the camera described in the sixth embodiment uses one-hundred individual video camera assemblies, then each such assembly would be required to store only 672 Mbytes per frame in uncompressed mode. While this still shows the need for data compression, such distributed data storage is far more reasonable.

As mentioned previously, many state-of-the-art algorithms exist for compressing a video image. Some are lossy and others are lossless. JPEG compression is an example of a lossy algorithm, while LZW compression is an example of a lossless algorithm. Unfortunately, LZW compression alone is not sufficient to reduce the data storage to a reasonable figure. The LZW algorithm achieves a compression ratio of approximately 5:1. This would compress the frame size in the sixth camera embodiment to 135 Gbytes and in the other alternate camera embodiments to 67 Gbytes. A complete two-hour motion picture made with the sixth camera embodiment of the camera would therefore occupy 241,920 Gbytes, and one made with the other alternate embodiments of the camera would occupy 120,960 Gbytes. Considering that a commercially available DVD-ROM can store 17.6 Gbytes of data, the two-hour motion picture would need to be stored on at least 6,873 DVD disks in the first five camera embodiments (and probably twice that number considering the sixth camera embodiment). PKZIP compression achieves a compression ratio for pictorial information of approximately 7:1. While this is somewhat better, it is still insufficient. Clearly, a new method of data compression is needed.

The method of data compression disclosed herein reduces the pictorial data in several stages. A hierarchical HIPO flow chart for the sixth camera embodiment is shown in FIG. 38, and an IPO flow chart for the sixth camera embodiment is shown in FIG. 39. The hierarchical HIPO flow chart for the other alternate camera embodiments is shown in FIG. 56.

The method of data compression disclosed herein employs the following steps and has the following objectives:

5.1 Initial Data Storage

There is no problem with initially storing the digital video data in any of the embodiments disclosed above. In all of the embodiments discussed, there is a storage medium associated with each of the video image tubes, be it videotape, recordable DVD, or a computer hard drive. In many of the embodiments discussed above, each video image tube has a separate microprocessor dedicated to processing the data collected from that video image tube. There should be no difficulty providing sufficient data storage for this task. For example, a complete two-hour conventional video motion picture can be stored using the MPEG-2 codec in less than 5 Gbytes.

5.2 Bit Encoding

An IPO flow chart for this process for the sixth camera embodiment is shown in FIGS. 43 and 46.

5.2.1 Reduction from Initial 24-Bit Pixel Representation

Figure 24:
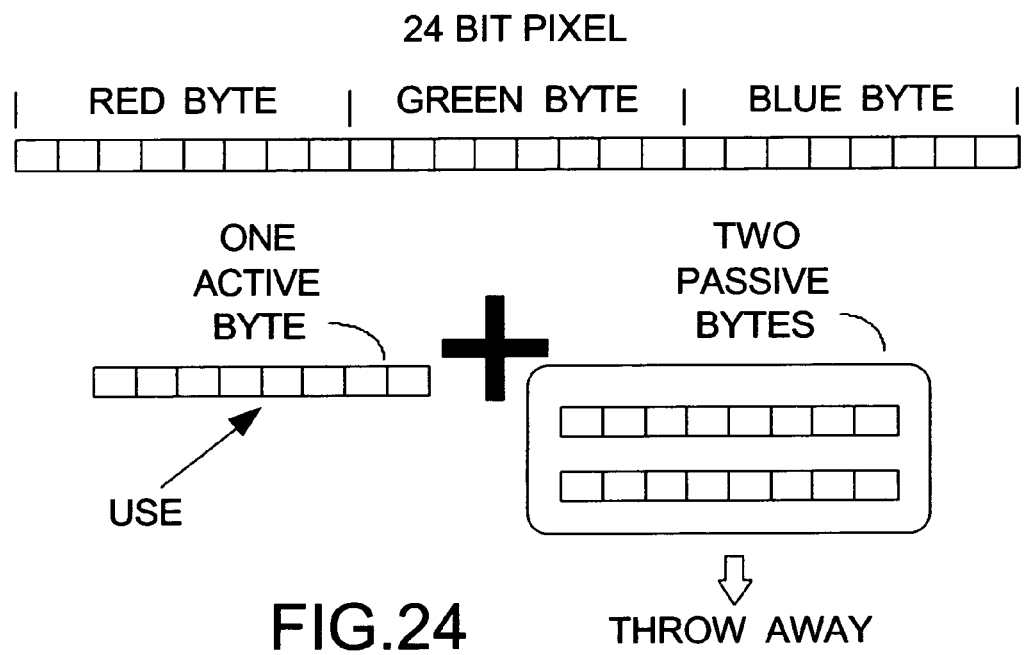
FIG. 24 shows how data from a 24-bit monochromatic pixel can be compressed to an 8-bit pixel.

In the sixth camera embodiment, the data from each pixel is transferred to computer storage as 24-bits. 24-bit storage enables a computer monitor to reconstruct approximately 16-million different colors. The unit of information in most computers is the byte which is 8 bits. Therefore, 24-bit pixels occupy 3 bytes of storage, one byte for each color: red, green, and blue. In the three-dimensional system disclosed herein, the pixels are monochromatic, i.e., solely red, green, or blue, but not a combination of more than one of the three primary colors. Therefore, two of the three bytes will be stored as '00000000' (eight zeros), and will result in a waste of storage. One of the three bytes will be active, and two will be inactive. When going from a red elemental picture to a green elemental picture to a blue elemental picture, a different byte will be active for each one. Each byte can retain 256 intensity levels (hereinafter referred to as "shades of gray"). Accordingly, were 256 intensity levels to be considered adequate for viewing a motion picture, pixel storage could be reduced to 8 bits or one byte. This is a superior embodiment. FIG. 24 illustrates how this can be done. A 24-bit pixel is a binary integer between 0 and 16,777,215 occupying three bytes: a red byte, a green byte, and a blue byte. Considered separately, each of the three bytes is a binary integer between 0 and 255. For a monochromatic picture, two of these bytes have a zero value. These are the passive bytes shown in FIG. 24. The non-zero byte is the active byte. For this method of compression, the two passive bytes are discarded, while the one active byte is used. An IPO flow chart for this process is shown in FIG. 44.

If the audience is seated a distance away from the screen such that the individual elemental pictures are not resolvable (i.e., at minimum visual acuity), then the brightness of three adjacent elemental pictures (a red picture, a green picture, and a blue picture) will produce the color definition for all three. Therefore, the eye will reconstruct approximately 16 million different colors. Even were the audience to be seated closer to the screen than at minimum visual acuity, their eyes would still resolve as many colors. The only drawback would be vertical pixelation which would become more obvious the closer a viewer is to the screen.

5.2.2 Reduction from Initial 12-Bit Pixel Representation

Figure 25:
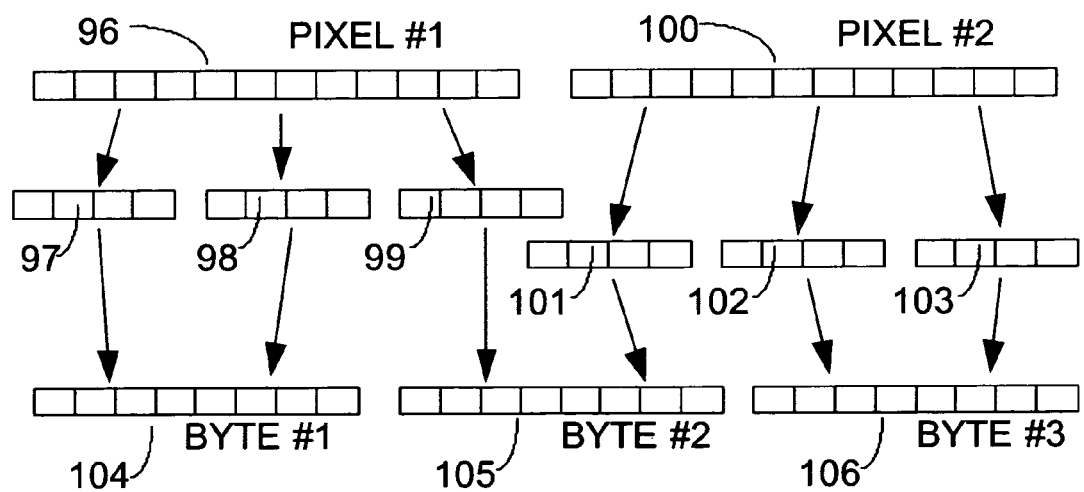
FIG. 25 shows how data from two 12-bit pixels are converted to three bytes of data storage.

With the exception of the sixth camera embodiment, in the other alternate camera embodiments, the data from each pixel is transferred to computer storage as 12-bits. 12-bit monochrome enables a computer monitor to reconstruct 4,096 shades of gray. Therefore, in the system disclosed herein, 12-bit encoding will produce more vivid coloration than the 24-bit encoding of the preferred embodiment. Each byte consists of 2 nibbles (1 nibble=4 bits), but the nibble is only conceptual. Most computers only perform byte manipulation. Yet, the data from each pixel is 3 nibbles in length, i.e., a number between 0 and 4,095 (or between HEX: 000 and FFF). This would normally be translated into two-bytes per pixel (i.e., HEX: 0000 to 0FFF). Therefore, in order to be able to obtain frame data storage that is no larger than 3.52 Gbytes, data from every two pixels (2 pixels×12-bits/pixel=24-bits) must be encoded into three bytes (3 bytes×8 bits/byte=24-bits). This is shown in FIG. 25. In the figure, two pixels 96 and 100 are shown. The first step is to logically separate 12-bit PIXEL #1 (96 in FIG. 25) into three nibbles 97, 98, and 99, and 12-bit PIXEL #2 (100 in FIG. 25) into three nibbles 101, 102, and 103, respectively. BYTE #1 (104 in FIG. 25) is then made to consist of the two nibbles 97 and 98 concatenated together. BYTE #2 (105 in FIG. 25) is made to consist of the two nibbles 99 and 101 concatenated together. Finally, BYTE #3 (106 in FIG. 25) is made to consist of the two nibbles 102 and 103 concatenated together.

An example of this would be:

| PIXEL | DECIMAL VALUE | BINARY VALUE | HEXADECIMAL VALUE |
|---|---|---|---|
| #1 | 1300 | 010100010100 | 514 |
| #2 | 4021 | 111110110101 | FB5 |

PIXEL #1 has three nibbles with hexadecimal values 5, 1, and 4. PIXEL #2 has three nibbles with hexadecimal values of F, B, and 5. These would combine to form three bytes having the following values:

| BYTE | HEXADECIMAL VALUE | BINARY VALUE | DECIMAL VALUE |
|---|---|---|---|
| #1 | 51 | 01010001 | 81 |
| #2 | 4F | 01001111 | 79 |
| #3 | B5 | 10110101 | 181 |

There are several methods of calculating the nibbles in a twelve-bit pixel. One of these involves the use of bitwise manipulation. All computer assembly languages permit bitwise manipulation. For example, in IBM Basic Assembly Language (BAL), the operators SLDA, SLDL, SLA, and SILL cause bits to be left-shifted, while SRDA, SRDL, SRA, and SRL cause bits to be right-shifted. Several higher level computer languages, such as C, also permit bitwise manipulation. Bit shifting in C is performed using the operators >>and<<. For example, if x is an unsigned integer, the expression:

$$x=x>>4;$$

causes the variable x to be replaced by a value whose bits are shifted to the right by four positions. In other words, the lowest order nibble (the one on the right) is discarded, the nibbles to its left now move right, and the leftmost nibble is zero-filled. FIG. 26(a) shows how right bit shifting works. Byte 107 consists of two nibbles, 108 and 109. When this byte is right bit shifted by four bit positions, the low-order nibble 109 is discarded. Data from the high-order nibble 108 is then shifted to the low-order nibble position 111 in Byte 110. The high-order nibble position 112 is then zero-filled. In order to provide a better understanding of the figure, significant data bits are shown as filled with ones, but this is rarely the situation.

For a second example, if x is an unsigned integer, the expression:

$$x=x<<4;$$

causes the variable x to be replaced by a value whose bits are shifted to the left by four positions. In other words, the highest-order nibble (the one on the left) is discarded, the nibble on its right now moves left, and the rightmost nibble is zero-filled. This is the inverse process to the previous example. FIG. 26(b) shows how left bit shifting works. Byte 113 consists of two nibbles 114 and 115. Data from the high-order nibble 114 is discarded. The low-order nibble 115 is then shifted to the high-order nibble position 117 in Byte 116. The low-order nibble position 118 is then zero-filed.

FIG. 27 shows how two bytes having alternating significant nibbles can be combined to form a single byte wherein both nibbles are significant. In Byte 119, the low-order (or rightmost) nibble is significant, while in Byte 120, the high-order (or leftmost) nibble is significant. Performing a logical OR operation on both Bytes 119 and 120 yields Byte 121 where both nibbles are significant. The high-order nibble of Byte 121 is the same as the high-order nibble of Byte 120, while the low-order nibble of Byte 121 is the same as the low-order nibble of Byte 119.

Using C-Language syntax, to separate a single byte into its high and low-order nibbles:

```
unsigned short full_byte, high_nibble, low_nibble;
/*     full_byte is the original data.
       high_nibble is the high-order (leftmost) nibble.
       low_nibble is the low-order (rightmost) nibble.
*/
unsigned short calc_nibble(void)
{
    high_nibble = full_byte >> 4;      /* right shift */
    high_nibble = high_nibble << 4;    /* left shift */
    low_nibble = full_byte << 4;       /* left shift */
    low_nibble = low_nibble >> 4;      /* right shift */
}
```

The variables full_byte, high_nibble, and low_nibble each contain eight bits of data. In full_byte, all of the bits are significant; in high_nibble, the four rightmost bits are significant, and the four leftmost bits are zeros; in low_nibble, the four leftmost bits are significant, and the for rightmost bits are zeros. IPO flow charts for this process can be found in FIGS. 41 and 42.

Referring to FIG. 25, a twelve-bit pixel cannot exist independently since nibbles cannot be addressed directly. As shown in the figure, two twelve-bit pixels, 96 and 100, are represented as three bytes of data, 104, 105, and 106. Alternatively, a single twelve-bit pixel may be represented as a two-byte unsigned integer with the high-order nibble being zero-filled. Using the method described herein above, a twelve bit pixel can be separated into its component nibbles by separating the individual bytes into their component nibbles. Using this method, one obtains three nibbles per twelve-bit pixel. These are represented in FIG. 25 as follows:

1. NIBBLE # is shown as 97
2. NIBBLE #2 is shown as 98
3. NIBBLE #3 is shown as 99
4. NIBBLE #4 is shown as 101
5. NIBBLE #5 is shown as 102
6. NIBBLE #6 is shown as 103

Furthermore, the three bytes of data are represented in FIG. 25 as follows:

1. BYTE#1 is shown as 104
2. BYTE #2 is shown as 105
3. BYTE #3 is shown as 106

The calculation that shows how the three bytes are created from two adjacent twelve-bit pixels is as follows:

BYTE #1=(16×NIBBLE #1)+NIBBLE #2

BYTE #2=(16×NIBBLE #3)+NIBBLE #4

BYTE #3=(16×NIBBLE #5)+NIBBLE #6

Working with the 12-bit representation and considering that three adjacent monochromatic elemental pictures provide the equivalent of a color pixel, a viewer seated at a distance from the screen equal to minimum visual acuity should be able to resolve approximately 69 billion colors. This is unnecessary since the human eye is unable to differentiate so many chromatic shades. Therefore, as an alternative, the 12-bit representation should be degraded to an 8-bit representation. This is illustrated in FIG. 28. The 12-bits shown as 122 in FIG. 28 is a number between 0 and 4,095, and can be thought of as being comprised of the three nibbles 123, 124, and 125. If the number contained in 122 is divided by sixteen and the remainder discarded, this would be the equivalent of discarding the low-order nibble 125. The number contained in the byte 126 (formed from combining nibbles 123 and 124) is a number between 0 and 255. The nibble 127 contains the remainder of the division of the number contained in 122 by sixteen. The nibble 125 is discarded. As an alternative to this computation, bitwise manipulation can be performed as described herein above to achieve the same result.

IPO flow charts for this process can be found in FIG. 45.

5.2.3 Addition of Color Information to the Reduced Monochrome Pixel Representations Now that the 24-bit and 12-bit information has been compressed to be able to fit into a single 8-bit byte, only one piece of additional information is required, viz., whether the byte contains the gray scale information for a red, green, or blue pixel. Each byte must be associated with one of the three monochrome colors. However, this information need not be attached to each byte, as it would drastically increase the storage required for each monochrome pixel. Instead, this information could be stored external to the 8-bit monochrome pixels. Each elemental picture can be stored as a fixed number of 8-bit monochrome pixels. Adjacent elemental pictures shift from red to green to blue and back to red, repeating the sequence on a regular basis. Therefore, it is only necessary to record the starting color, the number of 8-bit pixels until the next color occurs, and the total number of pixels stored. An IPO flow chart for this process can be found in FIG. 43.

5.3 Formation of the Elemental Pictures Associated with the Sixth Camera Embodiment In the sixth camera embodiment, multiple conventional color video cameras are used without an additional matrix lens array to form each frame of the motion picture. In effect, the multiple video camera lenses combine to form a linear matrix lens array. However, from each frame of each component camera, several monochromatic elemental pictures are created using a computer software algorithm. Information obtained from two time synchronized video frames using two adjacent cameras is used to compute the three-dimensional information necessary to create the elemental pictures. Each elemental picture can have a pixel resolution that is less than or equal to the resolution of one component camera that produced the frame from which the elemental picture was created. Ideally, an elemental picture will have the exact same resolution as the parent frame. Using an NTSC type camera, the resolution will be 640×480 pixels. Each pixel will occupy one byte in data storage. Therefore, each elemental picture will occupy 307,200 bytes or 300 Kbytes in uncompressed mode. Ideally, in order to keep track of the monochromatic color for each elemental picture, the number of elemental pictures associated with each component camera should be a number divisible by three.

Figure 29:
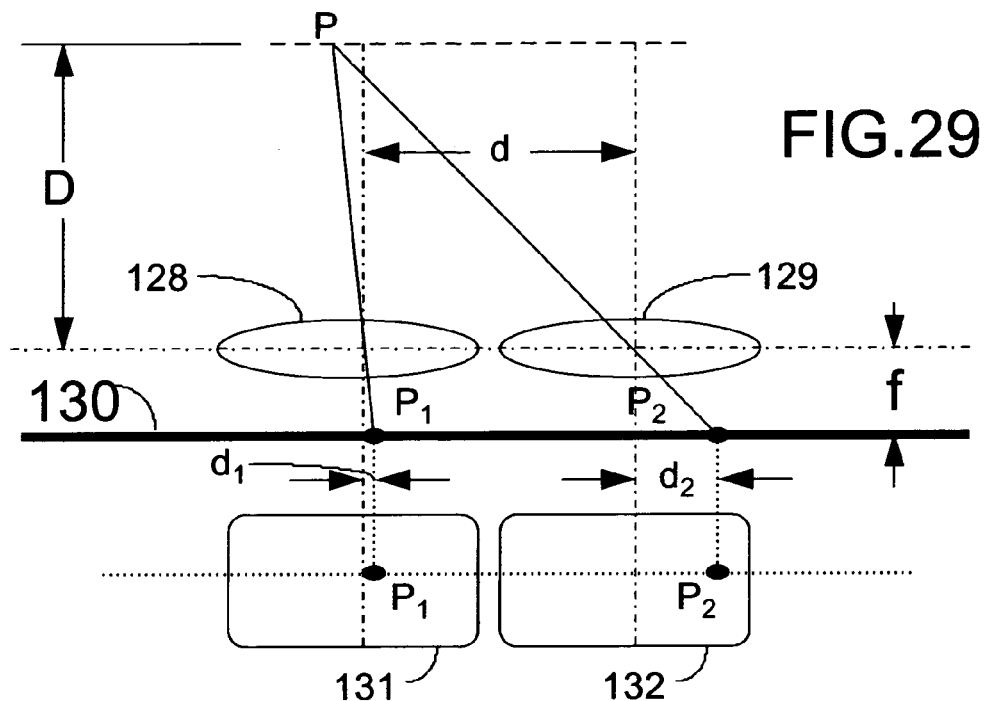
FIG. 29 is a schematic showing how to calculate the distance of a point in space from the camera given its image positions on two adjacent video frames.

The method of creating the elemental pictures from the raw camera data using software involves the computation of the distance from the camera lens to every point on the video frame captured by the component video camera assemblies. To accomplish this, we need information from two adjacent video camera assemblies. An IPO flow chart for the overall process can be found in FIG. 47. Referring to FIG. 29, point P is imaged using lens 128 and lens 129 of two adjacent component video camera assemblies onto their respective image planes 130 as points $P_1$ and $P_2$, respectively. Since the lenses of the two component video cameras are identical, the image planes 130 are both a distance f from the central axis of lenses 128 and 129. The point P is situated in space at a distance D away from the central lens axis of the camera. Frames 131 and 132 are produced by the video cameras on image planes 130 using lenses 128 and 129, respectively. Lenses 128 and 129 are positioned a distance d apart. For ease of understanding FIG. 29, the central vertical axes of frames 131 and 132 are also located a distance d apart in the drawing, but this is not necessary since they are only representations of the data produced by the camera CCD's. However, in the figure, points $P_1$ and $P_2$ are drawn projected from image planes 130 onto frames 131 and 132, respectively. We know the values of f and d. The horizontal distances $d_1$ and $d_2$ of points $P_1$ and $P_2$, respectively, can be measured. However, D is unknown, and it must be calculated. Using a simple optical ray trace along with plane geometry, we compute:

$$D = \frac{f^2 d}{d_2 - d_1}$$

Therefore, by knowing the X-Axis positions of the images of a given point on both of two adjacent video frames, the distance of that point from the lens axis of the camera can be calculated. For ease of computation, in FIG. 29, points $P_1$ and $P_2$ are shown as imaged on the X-Axis. Nevertheless, the Y-axis position of $P_1$ and $P_2$ are identical on frames 131 and 132, respectively, and their Y-values do not enter into the computation. An IPO flow chart for this process is found in FIG. 51.

Figure 30:
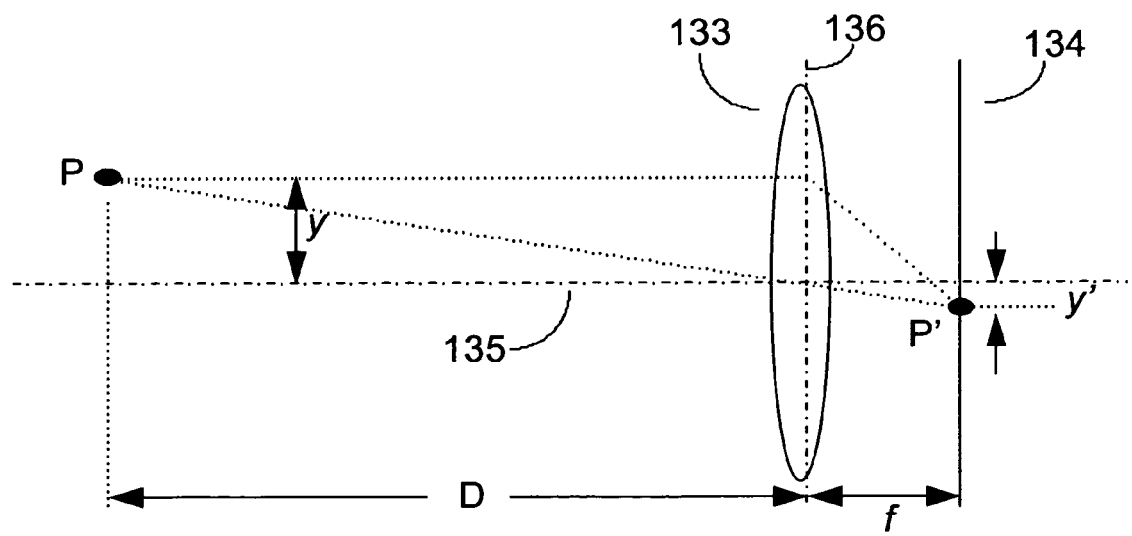
FIG. 30 illustrates how vertical distances are calculate between camera optics and various points in space.

The calculation of the point's vertical (or Y-axis) position on the image plane is even simpler. Since vertical parallax has been eliminated, the simple ray trace of FIG. 30 can be used. In FIG. 30, Point P is focused vertically by lens 133 onto image plane 134 to Point P'. Lens 133 has a focal length f. Point P is vertically positioned at a distance y from the center-line 135 of lens 133 and horizontally positioned at a distance D from the central plane 136 of lens 133. Point P' is vertically positioned on the image plane at a distance y' from the center-line 135 of lens 133. If the lengths f, D, and y are known, then the distance y' can be calculated as follows. Using similar triangles:

$$\frac{y'}{y} = \frac{f}{D} \text{ Therefore,}$$

$$y' = \frac{fy}{D}$$

It is not always easy to determine the image position of a given point on the video image plane. When an observer looks at a photograph, he can usually determine where a given point has been imaged on the picture. He does this using pattern recognition. For a computer to perform this determination, it must also perform pattern recognition. In computer science, pattern recognition is usually performed using neural networks. This will not be necessary in the present case, since the pattern recognition problem is far simpler than usual. A video frame is merely a data matrix of color pixels. Each data element records a specific composite color value computed from a red value, a green value, and a blue value. The general pattern recognition problem in computer science has been to extract objects from a video frame and to recognize those objects. For example, one would like to ascertain where a human face appears in a video picture; or, one would like to differentiate between boys and girls in the picture. Our problem is merely, given an image point produced from a point in space on one video frame, ascertain the location of the image point produced from the same point in space on another video frame.

Figure 31:
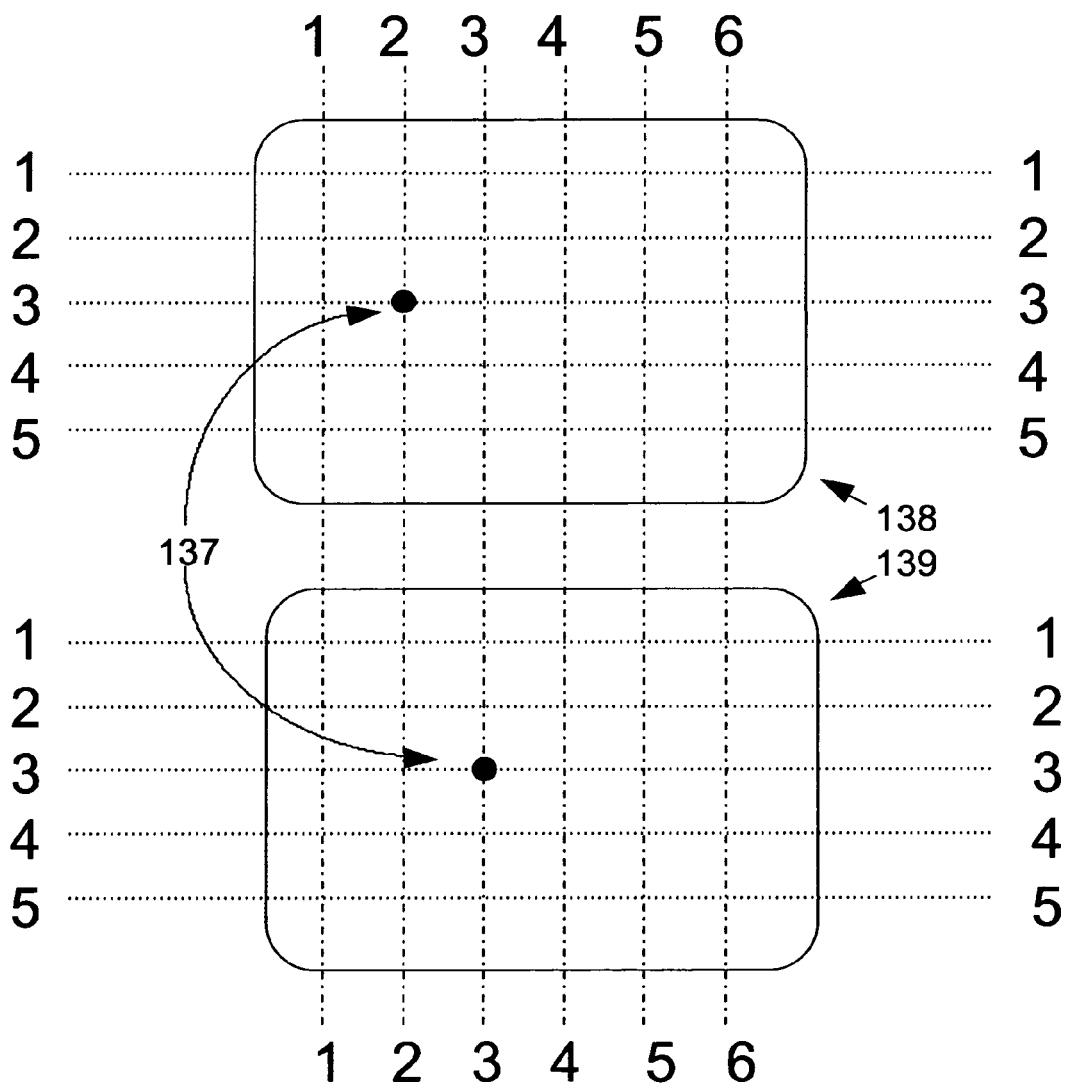
FIG. 31 is a schematic showing the problem of finding the image of a given point on two adjacent video frames.

FIG. 31 is a schematic of two adjacent video frames 138 and 139. For simplicity, positions on these frames are represented as a 6 column by 5 row matrix. (It is standard in video technology to refer to the number of columns and then the number of rows; e.g., 640×480. However, when discussing frame location coordinates in this application, we shall refer to them using the more conventional mathematical notation, i.e., first by row and then by column.) In the figure, a point in space is imaged as point 137 on frames 138 and 139. The location of this image point is {3,2} in frame 138 and {3,3} in frame 139. How do we know that the image point located at {3,2} in frame 138 and at {3,3} in frame 139 are created from the same point in space? To ascertain this, we examine all the surrounding points. Every image point on a video frame is on a pixel that is surrounded by eight other pixels. We can tell that the image point 137 in frames 138 and 139 represent the same physical point because it has a unique color value relative to the points surrounding it in both frames. We know that the two cameras that created video frames 138 and 139 are identical. We can also carefully color calibrate the two cameras so that when they are photographing the same point in space, the color value of the image point will be the same. We also know that the cameras are very close together. Therefore, there should be no difference in color value in the images of a given point on the video frames of the two adjacent component video cameras. Furthermore, the image point for which we are trying to find correspondence in each frame will be on the same horizontal scan line (or matrix row) in both frames provided that the cameras are carefully aligned physically. In the method shown, we first choose one of the two frames as a reference (let us say frame 138). We know where point 137 is imaged on frame 138, and we then search for it on object frame 139. We find it because of its unique color value. So, in the situation shown in FIG. 31, it is easy to determine that the image points located at {3,2} in frame 138 and at {3,3} in frame 139 are created from the same point in space. An IPO flow chart for this process is found in FIGS. 48 and 49.

Four additional problems arise. First, what if the color values of all the points surrounding point 137 in frames 138 and 139 are the same. Second, what if the color values of some of the points surrounding point 137 in frames 138 and 139 are the same, and the patterns of color values of the remaining surrounding points do not match in both frames 138 and 139. Third, what if we want to find a point on frame 139 corresponding to point 137 on frame 138, and there are multiple candidates (i.e., more than one group of nine pixels on frame 139 having the same color values as all nine corresponding pixels on frame 138). Finally, what if point 137 appears in only one frame, 138 or 139, but not in both frames. A software solution to each of these four problems is shown in the IPO flow chart of FIG. 50.

For the first case, by only searching the eight surrounding pixels, and finding them having the same color value, one cannot find the corresponding point on each frame. The point in question is obviously part of a field where all points in the field have the same color. In this situation, it is essential to ascertain the boundaries of the field. In pattern recognition terms, this is called: "chasing the borders." To do this, one successively examines pixels to the right and left of the point as well as above and below trying to find points of a different color value. The purpose of this exercise is to define the borders of the field in two dimensions. Once the coordinates of the border are defined, the distances from the camera lens to all of the points on the border of the physical object can be determined using the previously discussed computational methods. If all points within the border are the same color, then the distances of all such points are calculated by interpolation using the border distances.

For the second case, where there are several points in the group of nine points having the same color value and where the pattern of the remaining points do not match, this represents a common condition that can occur in the following situation. When one photographs a scene with two adjacent cameras, physical objects or points at infinity are always imaged at the same position in both frames. (The meaning of the term "infinity" with respect to three-dimensional vidiography will be discussed shortly.) Objects closer than infinity are imaged at different positions in both frames as shown in FIG. 29.

This is seen in the equation $$D = \frac{f^2 d}{d_2 - d_1}, \text{ since } \lim_{d_1 \to d_2} D = \infty.$$

The closer an object or point is to the component lenses, the greater is the difference $(d_2 - d_1)$. Therefore, the images of points closer to the camera lenses will exhibit a greater horizontal shift between adjacent video frames than points further away from the camera lens. In order to solve this problem, one expands the field of search. One searches to the left and right and above and below the point in question looking for pattern similarities. When one finds such similarities (especially over a large field), one assigns distances to the surrounding points. After this is done, the remaining points (with unassigned distances) fall into place.

For the third case, we are faced with the problem of ambiguity where a group of nine points under investigation in the reference frame match with several groups of nine points in the object frame. This problem is also solved by expanding the search and proceeding as in the second case.

For the fourth case, we are faced with the problem where a point that appears in one frame is obscured by an object in an adjacent frame or where a point appears at the horizontal boundary of one of the two frames. In this case, the point is not assigned a distance value, but is merely ignored. Its distance will be computed using frames from other adjacent cameras.

In general, one performs the calculation for distance a pixel point at a time. If that point has a unique color value that is the same for the reference and object frames, then it is obvious that both points represent the same physical point and its distance can be computed. If the point has a non-unique color value and is uniquely surrounded by eight points having the same color pattern in both frames, then it is obvious that both image points refer to the same physical point. Where ambiguities occur, expand the search in all four directions. Eventually, distances can be computed for some of the points. Once that is done, the point is fixed in space, and it can be used as a reference for the surrounding undetermined points. The distances to every point in space is computed relative to the reference frame. Once the computation is successfully performed, the object frame is discarded from the buffer. What remains are two frames having the same number of data elements in similarly arranged matrices. The first frame is the raw video frame of color values of pixels photographed by the component video camera. The second frame is a data matrix of distance values corresponding to the pixels in the first frame. The color pixel frame uses three-byte pixels, one byte each for the red value, the green value, and the blue value. So, an uncompressed NTSC video frame will occupy 921,600 bytes of storage (640×480×3) or 900 Kbytes. Now, what is left to calculate is the size of the second frame or distance frame. It will also have 640×480 or 307,200 data elements. However, we do not know how many bytes are required to store the distance information. Clearly, we have to store the distances of objects at infinity. Infinity is defined as the physical distance to those points that image to the same point on both the reference and object frames. Optically this holds true only for objects that are actually at an infinite distance from the camera lens. Yet, on a video camera CCD, one cannot resolve any points between the pixels. Therefore, if $(d_2-d_1)$ is equal to the inter-pixel distance, the point will behave as though it was at infinity. Assuming that a typical CCD might have the 640 horizontal pixels spanning a distance of approximately 25 mm, the inter-pixel distance would be approximately 0.04 mm. (This approximate inter-pixel distance is used for order of magnitude computations, so it need not be exact.) Now, assume that the focal distance is approximately 40 mm. We can also assume that the adjacent inter-lens distance is 27 mm. Therefore, $$D = \frac{f^2 d}{d_2 - d_1} = \frac{(40)^2 \times 27}{0.04} = 1.08 \times 10^6 \text{ mm.}$$

So, objects situated 1,080 meters away from the camera will appear at infinity. If we use three bytes for any distance value, we can capture a number as large as approximately 16-million. Therefore, if we express the distance from the camera lens in millimeter units, three bytes will be sufficient to capture any distance between very close and very far object points.

5.4 Intra-Frame Compression

An IPO flow chart describing this concept is shown in FIG. 53 with that of the overall compression scheme shown in FIG. 52.

The methods for compression of a single frame rely on the fact that all elemental pictures are photographs of the same scene, although from a slightly different viewing angle. All of the elemental pictures of the scene are photographed at the same time. Therefore, each elemental picture is only slightly different from its adjacent elemental pictures. Image points from objects that are at infinity will always appear at the same position on the imaging tube. However, since the extreme elemental pictures will not have a high overlap percentage, initial compression should take place on a group of elemental pictures at a time rather than on all of them at once.

For example, consider that there are 1,809 elemental pictures per frame. (The number 1,809 was chosen specifically because it is divisible by three. So, there would be 603 of each elemental picture—monochromatic red, green, and blue. This number was also chosen because it is divisible by 27.) This would dictate that one should use 67 cameras each producing data for 27 elemental pictures—nine red, nine green, and nine blue. The sixth camera embodiment allows one to use elemental pictures of any desired pixel resolution up to the maximum resolution of a single color video camera used to photograph the scene. Assuming that the digital cameras are each of the NTSC type capable of resolving 640×480 pixels, and that it would be desirable to store each elemental picture using the same pixel resolution, then the data storage requirement for an uncompressed single frame of the integral photographic motion picture for each component color video camera would be nine times the space required for an uncompressed conventional motion picture frame. Since an uncompressed conventional motion picture frame occupies 921,600 bytes of storage (640×480×3) or 900 Kbytes, the uncompressed storage requirement for a single stage of the three dimensional camera would be 8.1 Mbytes (900 Kbytes×9) per frame.

As mentioned previously in this application, there exist a number of state-of-the-art compression algorithms to accomplish compression. The lossless LZW compression algorithm can reduce a conventional video frame from 900 Kbytes (640×480×3) to approximately 180 Kbytes. On the other hand, the arithmetic coding algorithm which is more lossy can compress the same video frame to 60 Kbytes. A single elemental picture can be compressed to 300 Kbytes using LZW and 20 Kbytes using arithmetic coding. This greater compression is due to the fact that elemental pictures are monochromatic and therefore only occupy one-third of the data storage space even though the resolution is identical (640×480×1).

Figure 32:
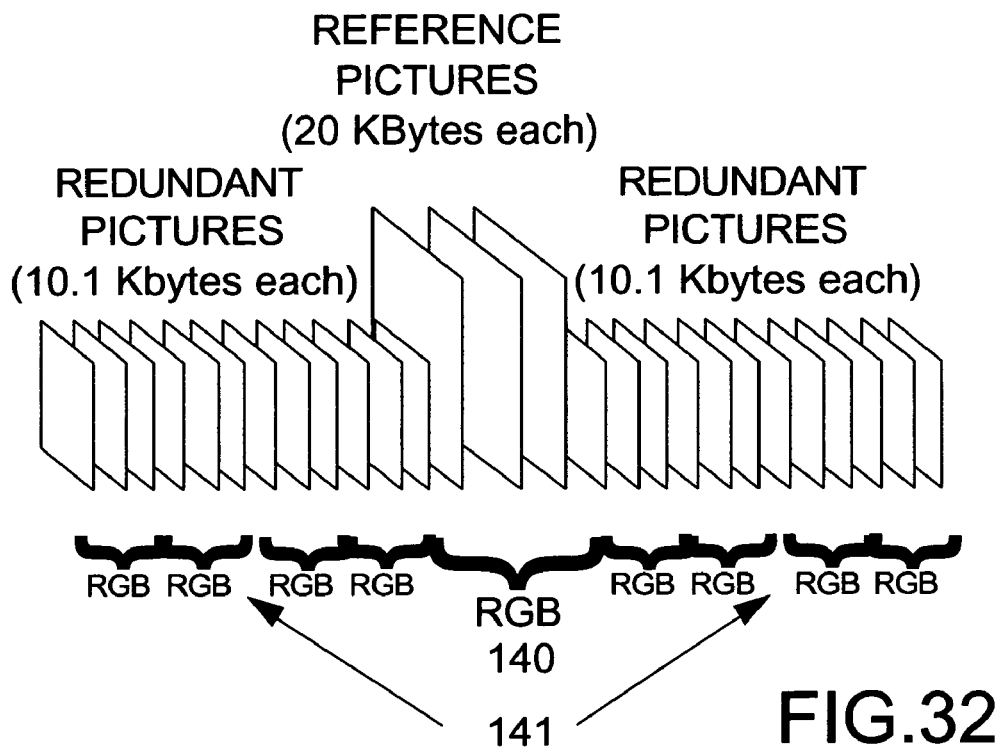
FIG. 32 is a schematic showing a data compression method for elemental pictures of a component group using a central reference.

In the example stated above, each component camera controls 27 elemental pictures. Therefore, using the arithmetic coding algorithm for every elemental picture, all 27 elemental pictures could be stored in 540 Kbytes. However, as previously stated, any monochromatic elemental picture in the 27 picture set is not very different from any other elemental picture of the same color in the set. Consequently, using any three adjacent elemental pictures as reference pictures, it is required to maintain data regarding the other satellite elemental pictures in the set only for those pixels that are different from those in the reference elemental pictures. Using this mode of compression, satellite elemental pictures can each be stored using 10.1 Kbytes. This method significantly reduces the data storage requirements. Ideally, the three central elemental pictures should be used as the reference elemental frames. This method of data compression is shown in FIG. 32. The three reference pictures 140 are in the center of the entire group of twenty-seven elemental pictures, and these reference pictures are comprised of a red, a green, and a blue elemental picture. On either side of the reference triad, are satellite triads 141, each triad being comprised of a red, a green, and a blue elemental picture. In compressed mode, the satellite triads 141 retain only the pixel data that are different from the uncompressed elemental pictures that comprise the reference triad. The reference triad 140 is compressed using an arithmetic coding algorithm.

Figure 33:
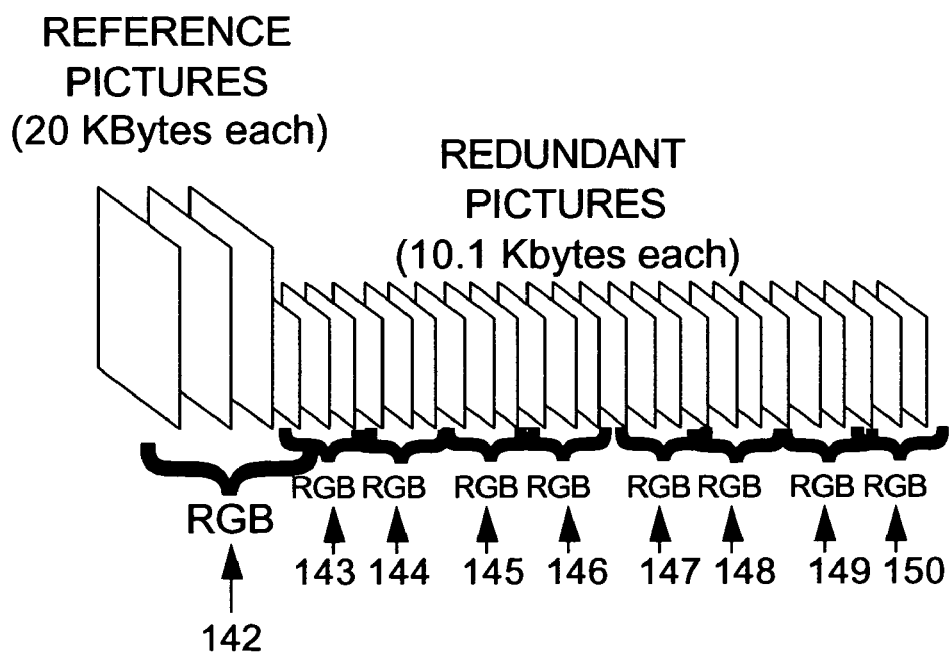
FIG. 33 is a schematic showing an alternate data compression method for elemental pictures of a component group using a left reference.

Alternatively, one can use the leftmost triad of elemental pictures as a reference, then save only the pixel information in the second triad that differs from the first triad. Next, save only the pixel information in the third triad that differs from the second triad, and so on until the last triad is compressed. This method is preferable over the previous method because adjacent triads are more similar to each other than the extreme triads would be to the central reference triad. Of course, the reference triad can be positioned anywhere within the group of component elemental pictures, and it is not required that the red, green, and blue elemental pictures comprising the reference triad be adjacent to each other. However, it is preferable that the reference triad be comprised of three adjacent red, green and blue elemental pictures. This method of data compression is shown in FIG. 33. In the figure, the three reference pictures 142 are shown as the leftmost three elemental pictures of the component group. The reference triad 142 is compressed using an arithmetic coding algorithm. The first satellite triad 143 is compressed by retaining only the pixel data that differs from the uncompressed reference triad 142. The second satellite triad 144 is compressed by retaining only the pixel data that differs from the uncompressed satellite triad 143. This process is repeated for satellite triads 145, 146, 147, 148, 149, and 150, compressing each triad by retaining only the pixel data that differs from the uncompressed satellite triads 144, 145, 146, 147, 148, and 149, respectively.

Using either of the two redundancy compression methods described above, except for the reference frames, each elemental picture can be compressed to approximately 10.1 Kbytes. Therefore, the total storage per frame associated with a component camera would be:

3 REFERENCE ELEMENTAL PICTURES @ 20 Kbytes ea. = 60 Kbytes

24 REDUNDANT ELEMENTAL PICTURES @ 10.1 Kbytes ea. = 242.4 Kbytes

TOTAL                                                302.4 Kbytes

A two-hour motion picture at the NTSC frame rate of 29.97 fps has 215,784 frames. Therefore, each component camera would require approximately 65¼ Gbytes of storage for the entire movie. Although this storage requirement is considerably greater than that for conventional two-dimensional motion pictures (on a DVD ROM for example), such storage could be accomplished using state-of-the-art storage media. For example, firewire hard disk drives capable of storing up to 80 Gbytes of data are relatively inexpensive and commercially available. The data transfer rate using these drives is high, and they are frequently used for storing motion picture video data.

Another method of intra-frame compression exists specifically for the sixth camera embodiment. It is not essential for the component cameras to compute the elemental pictures. The elemental pictures are only required for projection onto the matrix lens array screen described in the 3-D PATENTS. The elemental pictures can be created in the camera stage, or in the projector stage, or in an intermediate processing stage. If the elemental pictures are not created in the camera stage, then each component camera would store an entire motion picture in the same manner as is being used for conventional video today. Using this scenario, the component video camera microprocessors would participate in a local area network with all the other component video camera microprocessors only to provide frame synchronization data. If the elemental pictures are created during intermediate processing, they would occupy the same data storage as previously stated, and would be presented to the projector for playback.

Figure 34:
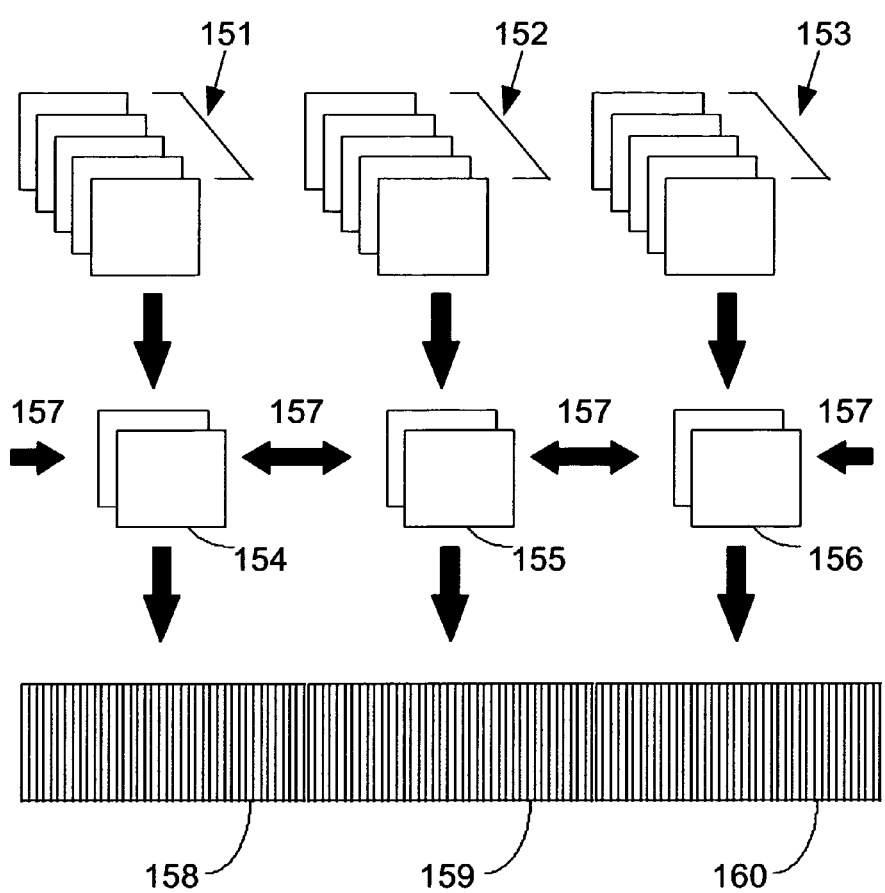
FIG. 34 is a schematic showing how multiple stages in the projector can create elemental pictures for projection from compressed multi-stage camera video frames.

On the other hand, the projector could create the elemental pictures. This can be accomplished in one of two ways. The projector consists of the same number of stages as the camera. The first method allows the projector to create the elemental pictures in the same manner as previously described. The projector component microprocessors accept the component camera frames one-at-a-time, and create the elemental pictures required for the individual frames. Elemental picture compression is not required. The data is placed into a buffer. After projection of a given frame, data for the elemental pictures associated with that frame are discarded. Using this method, storage requirements are minimal, but it is a very intensive computational process. This method is shown in FIG. 34. The figure shows only three component stages of a larger number of component stages of the projector. Ideally, the number of component stages of the projector is equal to the number of component stages of the camera. A series of video images, 151, 152, and 153, from the component camera stages are used as input to their respective component projector stages. The next raw video frames in the series, 154, 155, and 156, are copied from their respective series of frames 151, 152, and 153, and placed into the video streaming buffers of their respective projector stages. A synchronization signal 157 is transmitted across the entire local area network that is comprised within the projector so as to ensure that each component projector stage is operating on the same video frame (i.e., all of the frames being processed in the component projector stages were photographed simultaneously). Along with the synchronization information, the frame from an adjacent camera is also loaded into the video streaming buffer. In the figure, frames 154 with 155 in the video streaming buffer is used by the microprocessor of its component projector stage to create the group of uncompressed elemental pictures 158. Similarly, frames 155 and 156 are used to create the group of elemental pictures 159. In the same manner, the group of elemental pictures 160 is created by combining the information from frame 156 with a video frame from the component projector stage to the right of the figure. This process is performed simultaneously in all component stages of the projector. After projection of the elemental pictures, the video streaming buffer of each component stage of the projector is flushed and made ready for the next frame in the series. A hierarchical HIPO flow chart for this process is shown in FIG. 57.

The second method also allows the projector to create the elemental pictures, but it is less computationally intensive. The method involves some intermediate computer processing. The result of the intermediate processing is that each component projector microprocessor receives two 640×480 three-byte pixel frames for every frame produced by its associated component camera. The first frame is the raw video footage produced by the component video camera. The second frame is produced by an algorithm to be discussed later. Each pixel of the first frame contains red, green, and blue color information for every one of the 307,200 points on the picture. Each pixel of the second frame contains the distance of the photographed point from the camera lens for every one of the 307,200 points on the picture. The purpose for providing this second frame to the component projector microprocessor is to greatly reduce the computation required while only increasing the required storage by a small amount.

5.5 Inter-Frame Compression

This method of compression is also based upon the expectation of pixel redundancy from frame to frame. However, in this case, the frames change with time due to motion of objects in the scene. For those methods where the reference triad of elemental pictures are compressed using arithmetic coding and the satellite frames are compressed by the redundancy method discussed above, additional inter-frame compression of the elemental pictures in the reference triads would conserve considerable data storage. It is not necessary to further compress the satellite elemental pictures. Although a number of algorithms exist that would accomplish inter-frame compression, and are state-of-the-art, the MPEG-2 encoding scheme would probably be preferred. This would result in the conservation of approximately 8½ Gbytes for a two-hour NTSC motion picture running at 29.97 fps. Therefore, the total data storage required per component assembly for a the entire motion picture would be 56¾ Gbytes. Since, there are 67 such component assemblies, the entire motion picture would use approximately 3.8 terabytes of data storage.

Using the method of only storing for a component assembly a single 640×480 color pixel frame using 3-byte pixels and a single 640×480 distance pixel frame using 3-byte pixels as described above, and permitting the projector to create the elemental frames using a video streaming algorithm, the total data storage required for a motion picture per component assembly would be twice that required for a current conventional video motion picture. Our two-hour motion picture would require approximately 9 Gbytes per component assembly or 590 Gbytes across all component assemblies. The storage requirements can be halved if the projector performs all of the computations required to create the elemental pictures.

5.6 Direct Data Storage of Three-Dimensional Objects

An alternate compression scheme would avoid massive storage of elemental pictures. This method would require the projector to perform all of the computations required to create the elemental pictures. Using the elemental pictures created using any of the camera embodiments described herein, the three-dimensional position of any point in the scene can be computed. Therefore, if it were to be known which of these points belong to which objects, the entire three-dimensional scene can be defined virtually. One can define three-dimensional objects as a collection of points. These points always stay together no matter how the objects move or what happens in the scene. Objects can be defined by the positions of their outermost surfaces or boundaries. Therefore, instead of defining a scene as a collection of points in space, it can be defined as a collection of objects in space. Every scene consists of a finite collection of objects. If the scene can be initialized by positioning the objects, then the first frame of the scene is virtually defined. Thereafter, for as long as that specific scene is active, subsequent frames are defined using object trajectories and view points. This greatly reduces the data storage requirements.

This method of storage requires the intervention of a human operator. First, the duration of the scene must be defined by designating the starting and ending frames. Next, for the starting frame, a panoramic two dimensional view is created that the operator can observe. This is done by permitting the operator to scan through the elemental pictures of that frame as though it were a motion picture. The scene is frozen in time, but the operator may observe that scene from any view point. Alternatively, a stereoscopic three-dimensional panoramic scene may also be created for any given frame. Using a pointing device such as a mouse or a light pen, the operator manually defines the borders of the objects in any one of the elemental pictures belonging to the specified frame. If some objects appear in certain elemental pictures but not in others, and other objects appear in different elemental pictures, the operator may need to define multiple objects in different elemental pictures. Once this process is complete, a computer program adds points from all of the other elemental pictures to the defined objects by chasing the borders in those elemental pictures and by using computational methods previously described herein. As a result, an object closer than infinity will be defined by more points than would be visible in any one elemental picture. The entire frame is then defined as a three-dimensional scene consisting of a collection of objects.

In the next frame, some objects may have moved, or the camera may have moved. The principle of relativity does not distinguish between movement of an object or an observer. It is an equivalent consideration to think of a stationary observer looking at moving objects as it is to think of a moving observer looking at stationary objects. Therefore, all motion, whether that of the camera or of the objects, can be thought of as motion of the objects. If new objects enter the scene, their borders will be defined by the operator. If the observer wants new points entering the scene in the new frame to be considered as part of an already existing object, he merely designates them as belonging to the same object. The scene is then recalculated by adding new points to objects, by initializing new objects, and by recording the new positions and viewing angles of already existing objects. This process is repeated for every frame in the scene.

Using the methodology described above, an entire motion picture can be stored as a series of animated three-dimensional scenes. The difference between this type of animated motion picture and a cartoon is two-fold. First, using this process, the objects and background have photographic realism; and, second, the scene is three-dimensional.

The data created with this process occupies far less storage than for any of the other embodiments. However, it is an intense computational process. Producing the virtual three-dimensional motion picture is done using an intermediate computer process. The operator works on each scene with not much more difficulty as is used in creating digital effects in conventional two-dimensional motion pictures. However, once the data is stored in this manner, the data must be prepared for projection. This process is performed by the computer associated with the projector.

During projection, virtual three-dimensional frames are streamed into the projection buffer. Optical ray tracing is used to create the individual elemental pictures. The parameters for producing the elemental pictures are shown in FIGS. 29 and 30. The creation of the elemental pictures for this method uses the same computational process as is used for creating the interpolated elemental pictures for the sixth camera embodiment. Each elemental picture for a given frame is the ray trace projection for every point in the three-dimensional frame to the two-dimensional element defined by its position in the integral photograph. Once all the elemental pictures for a given frame have been created, they are projected onto the screen. The projected frame is purged from memory, and the next frame is taken from the streaming buffer. This process is repeated for every frame in the motion picture.

A hierarchical HIPO flow chart for this process is found in FIG. 58.

6.0 Format Conversion 6.1 Conversion from Film to Digital Format

Now, the conversion of integral photographs produced using any of the three-dimensional film cameras disclosed in the 3-D PATENTS to a digital format will be discussed. Each frame of film contains a still life integral photograph. The process for conversion begins with scanning each film frame into the computer in digital format using a scanner having a high resolution line scan image sensor. As mentioned previously, line scan image sensors are available having 10 μm×10 μm pixel resolution. Once the entire frame has been scanned, software can convert the data format to that which would have been produced by any of the digital video camera embodiments.

6.2 Conversion of Stereoscopic 3-D Pictures to Integral Photographic Format

Using the computational methods discussed above, it is also feasible to use software to convert any stereoscopic 3-D picture to the appropriate integral photographic format. Therefore, stereoscopic 3-D movies can be converted to this new process and can be viewed without special glasses. A stereoscopic 3-D photograph is normally made as two separate photographs of the same scene but taken by two lenses separated by the interoccular distance. If the two photographs are scanned and converted to digital images, the three-dimensional position of every point in the photograph may be computed. From this computation, software can synthesize all of the elemental pictures necessary to create a digital integral photograph from each frame of film.

6.3 Conversion of Conventional Motion Pictures for Display with Disclosed Process Conventional two-dimensional motion pictures can be converted to be displayed using this process with the same equipment and in the same theater. In this case, each frame of film is scanned into a computer and placed in digital format. The photographic frames are then duplicated into the appropriate number of elemental pictures to form the integral photograph. This can be done either before projection of the film or at the time of projection by appropriate software. If all of the elemental pictures of an integral photograph are identical, then the reconstructed image will be two-dimensional.

6.4 Three-Dimensional Animation

Three-dimensional animation is feasible using computers. Using the computational methods described above, software may be used to synthesize the elemental pictures of any cartoon. Similarly, special effects and editing is performed in the individual elemental pictures. Using appropriate software, it is feasible to edit a single elemental picture in an integral photographic frame thereby affecting and editing all of the elemental pictures in the frame.

6.5 Conversion of Conventional Two-Dimensional Motion Pictures to Three-Dimensional Motion Pictures Finally, it is possible to convert any conventional two-dimensional motion picture to a three-dimensional motion picture that will be projected using this process. To do this one must work with a software system, and the process requires much manual operator intervention. To accomplish the conversion, an operator must view each frame of the motion picture individually. The operator then groups together areas on the frame that can logically be considered as individual objects. This can be done using a process known as lassoing. He or she then works with the individual objects defining central and extreme points. Once these points are defined, the operator assigns three-dimensional distance locations to them. In this way, the three-dimensional information for all of the objects in a single frame is calculated. Since information concerning all of the objects in the frame is stored, for subsequent frames, the computation is much simpler even if the object moves, since all the points that define the object generally move together. Therefore, unless there is a change in scene, the operator needs to merely define the new three-dimensional location of the entire object, and the position of every point on that object can be calculated. Although this represents a rather arduous conversion process, current CGI and digital compositing processes used in creating special effects for current conventional motion pictures utilize much manual operator intervention. In addition, older cartoon animation technology required animators to create an entire drawing for each frame to be used in the final film. Accordingly, the digital conversion process disclosed herein would not involve so much work as to make the effort unfeasible.

7.0 Editing Motion Pictures Produced Using this System and Process

The final discussion must turn to the editing of the three-dimensional motion pictures produced using this system and process. Clearly, editing must take place on the elemental picture level. However, when working with individual frames, the editor need not make the same changes to all the elemental pictures that comprise the frame. In the preferred embodiment, the elemental picture data consist of two items: the color pixel frame and the distance frame. Since the distance frame provides information concerning all of the object points in the scene, software can be created that would permit one elemental picture to be edited, and then all of the changes would be propagated across all of the elemental pictures that comprise the integral photographic frame. The editor can view the scene in three-dimensions using computer gear designed for virtual reality. Although this viewing is stereoscopic, enough information is available regarding the photographed scene that the editor should be able to look around objects or to move his head from side to side and see different aspects of the scene.

DEFINITION OF TERMS USED IN THE PRESENT APPLICATION

Within the Present Application, the Applicant intends to use his own definitions of many special terms. Insofar as these special terms are used herein, the definitions provided below supersede the plain and ordinary meanings of the words. The definitions follow:

SCENE—an object or collection of objects positioned in space. A scene is two-dimensional if all object points lie in a single plane that is perpendicular to the line of sight. Otherwise, it is three-dimensional.

DIGITAL REPRESENTATION (of an image)—a computerized representation of the image using pixels, each pixel representing a red, green, and blue color intensity value for a single point on the image. Normally, a pixel is represented by three-bytes, but this may vary.

MONOCHROMATIC PIXELS—a pixel that has an intensity value for only one color (e.g., red, green, or blue for a color monitor—white for a black-and-white monitor).

ELEMENTAL IMAGE—a single two-dimensional image of a scene as observed from a single viewpoint and which plainly shows that scene.

INTEGRAL FRAME—a two-dimensional arrangement of a coordinated collection of elemental images from a single scene.

SUB-INTEGRAL FRAME—an integral frame that is a portion of an integral frame that may be treated separately from its parent.

INTEGRAL PHOTOGRAPH—a two-dimensional photograph or drawing of an INTEGRAL FRAME.

MATRIX LENS ARRAY—an arrangement of a coordinated collection of imaging elements each capable of producing an in-focus elemental image from electromagnetic radiation (preferably light rays), thereby forming an integral frame. Synonymous with IMAGING ARRAY.

IMAGING ELEMENT—that part of a matrix lens array which is capable of producing a single in-focus elemental image of an integral frame from electromagnetic radiation (preferably light rays).

SEPARATION DISTANCE—The distance between the centers of two elemental images of an integral frame.

SEPARATION CHARACTERISTIC—a array of separation distances for all of the elemental images of an integral frame or a matrix lens array.

FOCAL CHARACTERISTIC—an array of focal lengths for all of the imaging elements of a matrix lens array.

IMAGE CHARACTERISTIC—a function which when applied to the elemental images of an integral frame yields the focal characteristic of the matrix lens array that produced or would have produced the integral frame.

LOGICAL ALIGNMENT (for two related images)—Two images are LOGICALLY ALIGNED with each other optically if each and every point on one image has a single fixed spatial relationship to a single corresponding point on the other image. They are LOGICALLY ALIGNED with each other electromagnetically if all light (or other electromagnetic) rays from any point on one image will always impinge only on a single corresponding point on the other image. Optical and electromagnetic LOGICAL ALIGNMENT are equivalent since in both there remains a fixed relationship between all points on both images.

TRANSMIGRATOR—a collection of optics or other means to transfer an input image from an input end to an output image at an output end wherein all of the parts of the input image remain logically aligned with all of the corresponding parts of the output image.

MODULAR INTEGRAL MAGNIFIER is a rigid apparatus having a small input end and a large output end and internal enlarging means. A matrix lens array is mounted to the output end or to both ends. The Modular Integral Magnifier either creates or accepts an unmagnified integral frame, and produces a uniformly magnified three-dimensional image of the object or scene.

COMPOSITE INTEGRAL FRAME MAGNIFYING ARRAY (or MODULAR INTEGRAL MAGNIFYING SCREEN) is a matrix array of Modular Integral Magnifiers. Each Modular Integral Magnifier magnifies a single component integral frame. The effect produced is a single magnified three-dimensional image of an object or scene.

COMPONENT INTEGRAL FRAMES—integral frames obtained from separating a single input integral frame to form a plurality of integral frames all representing the same three-dimensional scene.

EVERSION or EVERTING (or TO EVERT)—a process that transforms a pseudoscopic three-dimensional image into an orthoscopic three-dimensional image.

UNIFORM MAGNIFICATION—(for a three-dimensional image) is essentially equal magnification in all spatial dimensions.

UNIFORM ENLARGEMENT—(for a two-dimensional image) is essentially equal magnification in all planar (or surface) dimensions.

MAGNIFICATION FACTOR—the ratio of essential dimensions of that which is magnified or enlarged to those of that which is unmagnified or not enlarged.

GEOMETRICALLY SIMILAR IN ARRANGEMENT—two arrays of imaging elements or of elemental images are similar if the ratio of separation characteristics of both arrays is a constant.

PROJECTING (PROJECTION)—causing electromagnetic radiation (or light rays) to travel from one location to another.

ANALOG PROJECTION—simultaneous projection of all of the radiation (or rays) of an image from one location to another.

DIGITAL PROJECTION—projection of radiation (or rays) from a discrete location of an image to another discrete location.

PROJECTION BY SCANNING—forming an image on a surface whereby a discrete light or electromagnetic beam controllably travels to various points on the surface while varying in intensity.

PROJECTION IS ACCOMPLISHED OPTICALLY—projection wherein light rays travel through optical elements from one location to another.

PROJECTION IS ACCOMPLISHED ELECTROMAGNETICALLY—projection wherein electromagnetic radiation (other than light) is transmitted from one location to another using electronic devices.

DIGITAL LIGHT PROCESSOR CHIP—comprises a Digital Micromirror Device, or DMD chip (of the type invented by Dr. Larry Hornbeck of Texas Instruments in 1987), that further comprises a rectangular array of hinge-mounted microscopic mirrors. Current implementations of this array contain up to 1.3 million micromirrors. The micromirrors are mounted on tiny hinges that enable them to tilt either toward a light source (ON) or away from it (OFF) thereby creating a light or dark pixel on a projection surface. Texas Instruments currently markets a DIGITAL LIGHT PROCESSOR CHIP under the trade name DLP™.

What is claimed is:

1. A method to reconstruct an image representing a scene from a digital representation of that scene comprising:
   a) forming a digital representation of a first integral frame that represents the scene, wherein said digital representation is capable of being stored and transmitted, and wherein said first integral frame comprises a first separation characteristic and a first image characteristic;
   b) transmitting the digital representation to a device capable of receiving the digital representation and transforming the digital representation into a visual presentation;

c) forming the visual representation from the transmitted digital representation as a second integral frame having a second separation characteristic and a second image characteristic wherein:
  i) the second integral frame is geometrically similar to the first integral frame, and
  ii) the ratios of the image characteristic to the separation characteristic for both first and second integral frames are equal;
d) from the image characteristic of the second integral frame, determining the focal characteristic of a set of imaging arrays adapted to optically produce the second integral frame, wherein every imaging array in the set has a focal characteristic and a separation characteristic, said separation characteristic of each imaging array in the set being identical to the separation characteristic of the second integral frame:
e) selecting an imaging array from the set of imaging arrays; and,
f) reconstructing an image from said second integral frame using the selected imaging,
whereby the ratio of every dimension of the reconstructed image to every dimension of the scene is equal in all directions.

2. The method of claim 1 further comprising:
a) forming an intermediate integral frame having an intermediate separation characteristic and an intermediate image characteristic, wherein:
  i) the intermediate integral frame is geometrically similar to the first integral frame, and
  ii) the ratios of the image characteristic to the separation characteristic for both first and intermediate integral frames are equal; and,
b) transmitting the intermediate integral frame to form the second integral frame, wherein:
  i) the second integral frame is geometrically similar to the first integral frame, and
  ii) the ratios of the image characteristic to the separation characteristic for both first and second integral frames are equal.

3. The method of 2 wherein the second integral frame is transmitted onto a screen that is an imaging array adapted to reconstruct the image therefrom.

4. The method of claim 1 wherein the scene is two-dimensional.

5. The method of claim 1 wherein the scene is three-dimensional.

6. The method of claim 5 further comprising everting the reconstructed image.

7. The method of claim 6 wherein eversion is accomplished by using an everting imaging array to reconstruct an orthoscopic image.

8. The method of claim 6 wherein eversion is accomplished by modifying the second integral frame prior to reconstruction.

9. The method of claim 6 wherein eversion is accomplished by modifying the digital representation of the first integral frame.

10. The method of claim 6 wherein eversion is accomplished by modifying the first integral frame prior to forming the digital representation.

11. The method of claim 1 wherein the digital representation comprises monochromatic pixels, and color is restored to the reconstructed image.

12. The method of claim 11 wherein the monochromatic pixels are represented by 8-bits.

13. The method of claim 12 wherein the monochromatic pixels are formed by discarding bits from 12-bit or 24-bit pixels.

14. The method of claim 1 further comprising forming the first integral frame as a composite of a plurality of sub-integral frames, wherein each of the sub-integral frames is representative of the same scene from a different viewpoint.

15. The method of claim 14 further comprising forming the digital representation of the first integral frame or a sub-integral frame from an initial pair of digital images, each being an elemental image representing the scene from a different viewpoint, wherein said forming operation comprises:
a) for each pixel on one digital image, finding the corresponding pixel on the other digital image;
b) repeating step (a) until all of the pixels on one image uniquely determine corresponding pixels on the other image;
c) calculating three-dimensional coordinates for all points in space represented by the pairs of pixels; and,
d) synthesizing other elemental images each representing the same scene from a viewpoint other than the viewpoints of the initial digital images.

16. The method of claim 15 further comprising forming the first integral frame from a plurality of adjacent pairs of digital images.

17. The method of claim 1 further comprising forming the second integral frame as a composite of a plurality of sub-integral frames, wherein each sub-integral frame represents the scene from a different viewpoint.

18. The method of claim 1 further comprising compressing the digital representation of the first integral frame to reduce storage space on a digital medium.

19. The method of claim 18 further comprising compressing the digital information from elemental images on the first integral frame by intra-frame compression.

20. The method of claim 19 further comprising compressing the digital information from a plurality of integral frames by inter-frame compression.

21. The method of claim 17 further comprising video streaming the second integral frame and discarding it once transmission has occurred.

22. The method of claim 17 further comprising:
a) transmitting each of the sub-integral frames representing the second integral frame to the input face of a modular integral magnifier of a modular screen wherein:
  i) the modular screen comprises a plurality of modular integral magnifiers;
  ii) each modular integral magnifier has an input face and an output face, the input face being smaller than the output face, and the output face has edges;
  iii) the input faces of adjacent modular integral magnifiers do not touch each other;
  iv) the output faces of adjacent modular integral magnifiers are organized into an essentially planar array such that they touch each other at their edges; and,
  v) at least one imaging array is attached in fixed alignment to the output faces of the modular integral magnifiers; and,
b) enlarging each of the sub-integral frames so that it fills the output face of its corresponding modular integral magnifier.

23. A system that reconstructs an image representing a scene from a digital representation of that scene comprising:
a) a means for forming a digital representation of a first integral frame that represents the scene, wherein said digital representation is capable of being stored and transmitted, and wherein said first integral frame comprises a first separation characteristic and a first image characteristic;

b) a means for transmitting the digital representation to a means capable of receiving said digital representation and transforming the digital representation into a visual presentation;

c) a means for forming the visual representation from the transmitted digital representation as a second integral frame having a second separation characteristic and a second image characteristic wherein:
   i) the second integral frame is geometrically similar to the first integral frame, and
   ii) the ratios of the Image characteristic to the separation characteristic for both first and second integral frames are equal; and, d) a means for reconstructing an image from the second integral frame, said means having a separation characteristic equal to that of the second integral frame and a focal characteristic determined from the image characteristic of the second integral frame, as that required to enable said means to optically form the second integral frame whereby the ratio of every dimension of the reconstructed image to every dimension of the scene is equal in all directions.

24. The system of claim 23 further comprising:
a) a means for forming an intermediate integral frame having an intermediate separation characteristic and an intermediate image characteristic, wherein:
   i) the intermediate integral frame is geometrically similar to the first integral frame, and
   ii) the ratios of the image characteristic to the separation characteristic for both first and intermediate integral frames are equal; and,
b) a means for transmitting the intermediate integral frame to form the second integral frame, wherein:
   i) the second integral frame is geometrically similar to the first integral frame, and
   ii) the ratios of the image characteristic to the separation characteristic for both first and second integral frames are equal.

25. The system of claim 24 wherein the second integral frame is transmitted to a means for reconstructing the image therefrom.

26. The system of claim 23 wherein the scene is three-dimensional.

27. The system of claim 26 further comprising a means for everting the reconstructed three-dimensional image.

28. The system of claim 26 further the means for everting comprises a means for modifying the second integral frame prior to reconstruction.

29. The system of claim 26 wherein the means for everting comprises a means for modifying the digital representation of the first integral frame.

30. The system of claim 26 wherein the means for everting comprises a means for modifying the first integral frame prior to forming the digital representation.

31. The system of claim 23 further comprising a means for restoring color to the reconstructed image where the digital representation comprises monochromatic pixels.

32. The system of claim 31 wherein the monochromatic pixels are represented by 8-bits.

33. The system of claim 32 wherein the monochromatic pixels are formed by discarding bits from 12-bit or 24-bit pixels.

34. The system of claim 23 further comprising a means for forming the first integral frame as a composite of a plurality of sub-integral frames, wherein each sub-integral frame represents the scene from a different viewpoint.

35. The system of claim 34 further comprising a means for synthesizing the first integral frame or a sub-integral frame from an initial pair of digital images, each being an elemental image representing the scene from a different viewpoint.

36. The system of claim 35 further comprising a means for forming the first integral frame from a plurality of adjacent pairs of digital images.

37. The system of claim 23 further comprising a means for forming the second integral frame as a composite of a plurality of sub-integral frames, wherein each sub-integral frame represents the scene from a different viewpoint.

38. The system of claim 23 further comprising a means for compressing the digital representation of the first integral frame to reduce storage space on a digital medium.

39. The system of claim 38 further comprising a means for compressing the digital information from elemental images on the first integral frame by intra-frame compression.

40. The system of claim 39 further comprising a means for compressing the digital information from a plurality of integral frames by inter-frame compression.

41. The system of claim 37 further comprising a means for video streaming the second integral frame and a means for discarding it once transmission has occurred.

42. The system of claim 37 further comprising a modular screen comprised of modular integral magnifiers wherein:
a) the modular screen comprises a plurality of modular integral magnifiers;
b) each modular integral magnifier has an input face and an output face, the input face being smaller than the output face;
c) the input faces of adjacent modular integral magnifiers do not touch each other;
d) the output faces of adjacent modular integral magnifiers essentially touch each other;
e) at least one imaging array is attached in fixed alignment to the output faces of the modular integral magnifiers.

43. The system of claim 42 further comprising:
a) a means for transmitting each of the sub-integral frames representing the second integral frame to the input face of a modular integral magnifier of the modular screen; and,
b) a means for enlarging each of the sub-integral frames so that it fills the output face of its corresponding modular integral magnifier.

44. A system and apparatus for reconstructing a three-dimensional image representing a scene from a digital representation of that scene comprising:
a) a device that produces a digital representation of a first integral frame that represents the scene, wherein said digital representation is capable of being stored and transmitted, and wherein said first integral frame comprises a first separation characteristic and a first image characteristic;
b) a device that stores the digital representation of the first integral frame.
c) a transmitter that transmits the digital representation to a device capable of receiving the digital representation and transforming the digital representation into a visual presentation;
d) a device capable of forming a visual representation from the transmitted digital representation as a second integral frame having a second separation characteristic and a second image characteristic wherein i) the second integral frame is geometrically similar to the first integral frame, and ii) the ratios of the image characteristic to the separation characteristic for both first and second integral frames are equal; and, e) a screen that is an imaging array that reconstructs an image from the second integral frame, the screen imaging array having a separation characteristic and a focal characteristic, wherein said separation characteristic is the same as the separation characteristic of the second integral frame and said focal characteristic is determined from the image characteristic of the second integral frame, as that required to enable such an array to optically form the second integral frame, whereby the ratio of every dimension of the reconstructed image to every dimension of the scene is equal in all directions.

45. The system of claim 44 wherein the device that produces the digital representation is a computer.

46. The system of claim 44 wherein the device that produces the digital representation is a camera.

47. The system of claim 44 wherein the device that stores the digital representation is a computer.

48. The system of claim 44 wherein the device that stores the digital restoration is a video recording device taken from the group consisting of:
    a videocassette recorder,
    a DVD recorder,
    a laser disc recorder,
    a video tape recorder, and
    a device that records directly to a disk or memory stick.

49. The system of claim 44 wherein the device capable of forming the visual representation is a video monitor device taken from the group consisting of:
    a cathode ray tube (CRT),
    a liquid crystal display (LCD), and
    a plasma display.

50. The system of claim 44 wherein the device capable of forming the visual representation is a video projection device taken from the group consisting of:
    an optical analog projector;
    a computer digital projector, and
    a projector comprising at least one digital light processor chip.

51. The system of claim 44 wherein the means for transmitting is a means for forming the second integral frame by optical projection.

52. The system of claim 44 wherein the scene is three-dimensional.

53. The system of claim 52 further comprising an optical system for everting the reconstructed three-dimensional image.

54. The system of claim 52 further comprising a computer and software to accomplish eversion is by modifying the second integral frame prior to reconstruction.

55. The system of claim 52 further comprising a computer and software to accomplish eversion by modifying the digital representation of the first integral frame.

56. The system of claim 52 further comprising an optical system to accomplish eversion by modifying the first integral frame prior to forming the digital representation.

57. The system of claim 44 further comprising a color filters for restoring color to the reconstructed image where the digital representation comprises monochromatic pixels.

58. The system of claim 57 further comprising a computer and software, wherein the monochromatic pixels are represented by 3-bits, said computer and software forming the pixels by discarding bits from 12-bit or 24-bit pixels.

59. The system of claim 44 further comprising a device that forms the first integral frame as a composite of a plurality of sub-integral frames, wherein each sub-integral frame represents the same scene from a different viewpoint.

60. The system of claim 59 wherein the device that forms the first integral frame is a computer with software.

61. The system of claim 59 wherein the device that forms the first integral frame is a camera system.

62. The system of claim 61 wherein the first integral frame is formed from a plurality of adjacent pairs of digital images.

63. The system of claim 44 further comprising a computer and software that compresses the digital representation of the first integral frame to reduce storage space on a digital medium.

64. The system of claim 63 further comprising a computer and software that compresses the digital information from elemental images on the first integral frame by intra-frame compression.

65. The system of claim 64 further comprising a computer and software that compresses the digital information from a plurality of integral frames by inter-frame compression.

66. The system of claim 63 further comprising a computer and software that video streams the second integral frame and discards it once transmission has occurred.

67. The system of claim 44 further comprising a modular screen comprised of modular integral magnifiers wherein:
    a) the modular screen comprises a plurality of modular integral magnifiers;
    b) each modular integral magnifier has an input face and an output face, the input face being smaller than the output face;
    c) the input faces of adjacent modular integral magnifiers do not touch each other;
    d) the output faces of adjacent modular integral magnifiers essentially touch each other.
    e) at least one imaging array is attached in fixed alignment to the output faces of the modular integral magnifiers.

68. The system of claim 67 further comprising video monitors that transmit the sub-integral frames representing the second integral frame to the input faces of the modular integral magnifiers of the modular screen.

* * * * *